(12) United States Patent
Petersen et al.

(10) Patent No.: US 11,811,752 B1
(45) Date of Patent: Nov. 7, 2023

(54) SYSTEMS, METHODS, AND COMPUTING PLATFORMS FOR EXECUTING CREDENTIAL-LESS NETWORK-BASED COMMUNICATION EXCHANGES

(71) Applicant: 1080 Network, Inc., Lakeway, TX (US)

(72) Inventors: Christopher Michael Petersen, Lakeway, TX (US); Tim Kuchlein, Lakeway, TX (US)

(73) Assignee: 1080 Network, Inc., Lakeway, TX (US)

( * ) Notice: Subject to any disclaimer, the term of this patent is extended or adjusted under 35 U.S.C. 154(b) by 0 days.

(21) Appl. No.: 18/329,101

(22) Filed: Jun. 5, 2023

Related U.S. Application Data

(60) Provisional application No. 63/370,280, filed on Aug. 3, 2022, provisional application No. 63/370,279, filed on Aug. 3, 2022.

(51) Int. Cl.
*H04L 9/40* (2022.01)
(52) U.S. Cl.
CPC .................. *H04L 63/083* (2013.01)
(58) Field of Classification Search
CPC .................................................... H04L 63/083
See application file for complete search history.

(56) References Cited

U.S. PATENT DOCUMENTS

| | | | | |
|---|---|---|---|---|
| 6,754,820 B1 * | 6/2004 | Scheidt | ............... | H04L 63/105 713/184 |
| 7,136,514 B1 * | 11/2006 | Wong | ............... | G06V 40/1347 340/5.83 |
| 8,456,278 B1 * | 6/2013 | Bergman | ............... | H04L 69/18 340/539.22 |
| 8,499,359 B1 * | 7/2013 | Blanke | ............... | G06F 21/6209 726/32 |
| 8,840,016 B1 * | 9/2014 | Schott | ............... | G06Q 20/3278 235/379 |
| 9,047,728 B1 * | 6/2015 | Irudayam | ............... | G06Q 20/3221 |
| 9,846,899 B1 * | 12/2017 | Stickle | ............... | G06F 21/10 |
| 10,142,303 B2 * | 11/2018 | Avanzi | ............... | G06F 11/3037 |

(Continued)

OTHER PUBLICATIONS

Christopher Michael Petersen et al., U.S. Appl. No. 18/329,107 for "Systems, Methods, and Computing Platforms for Executing Credential-Less Network-Based Communication Exchanges", filed Jun. 5, 2023.

*Primary Examiner* — Aravind K Moorthy
(74) *Attorney, Agent, or Firm* — Alston & Bird LLP

(57) ABSTRACT

Various embodiments of the present disclosure provide techniques for facilitating a credential-less exchange over a network using a plurality of identifier mapping and member interfaces. The techniques may include initiating the presentation of an enrollment user interface via a client device of a user and receiving selection data indicative of a selection of a service provider instrument from the enrollment user interface. The techniques include generating a matching code for authenticating the user, providing the matching code to a service provider platform, and receiving the matching code from a partner platform. In response to an authentication of the user based on the matching code, the techniques may include generating an UUEK for the user that may be used to replace persistent credentials.

20 Claims, 18 Drawing Sheets

(56) References Cited

U.S. PATENT DOCUMENTS

| | | | | |
|---|---|---|---|---|
| 10,411,886 B1* | 9/2019 | Vermeulen | | H04L 63/08 |
| 10,630,682 B1* | 4/2020 | Bhattacharyya | | H04L 63/0869 |
| 10,826,875 B1* | 11/2020 | Kim | | H04L 63/0428 |
| 10,855,440 B1* | 12/2020 | Alwen | | H04L 9/0894 |
| 10,868,672 B1* | 12/2020 | Farrugia | | H04L 9/0861 |
| 10,909,230 B2* | 2/2021 | Vilke | | H04L 9/3226 |
| 11,057,210 B1* | 7/2021 | Sierra | | H04L 9/3226 |
| 11,153,087 B1* | 10/2021 | Vermeulen | | H04L 9/0841 |
| 11,210,412 B1* | 12/2021 | Ghetti | | H04L 63/083 |
| 11,409,865 B1* | 8/2022 | Kliger | | H04L 9/3247 |
| 11,409,953 B1* | 8/2022 | Edmonds | | G06F 40/58 |
| 2002/0029341 A1* | 3/2002 | Juels | | H04L 63/083 |
| | | | | 713/184 |
| 2002/0031225 A1* | 3/2002 | Hines | | H04L 47/10 |
| | | | | 713/168 |
| 2004/0268142 A1* | 12/2004 | Karjala | | H04L 63/0823 |
| | | | | 726/15 |
| 2004/0268148 A1* | 12/2004 | Karjala | | H04L 63/166 |
| | | | | 713/150 |
| 2005/0071677 A1* | 3/2005 | Khanna | | H04L 9/3236 |
| | | | | 726/4 |
| 2007/0061590 A1* | 3/2007 | Boye | | G06F 21/305 |
| | | | | 713/186 |
| 2007/0266257 A1* | 11/2007 | Camaisa | | H04L 63/1483 |
| | | | | 713/182 |
| 2008/0015995 A1* | 1/2008 | Chen | | G06F 21/32 |
| | | | | 705/50 |
| 2010/0268557 A1* | 10/2010 | Faith | | G06Q 20/4016 |
| | | | | 705/7.29 |
| 2011/0161721 A1* | 6/2011 | Fulginiti | | G06Q 10/10 |
| | | | | 714/E11.029 |
| 2011/0197259 A1* | 8/2011 | Thibadeau | | H04L 9/3226 |
| | | | | 726/2 |
| 2013/0046972 A1* | 2/2013 | Campagna | | H04L 9/3263 |
| | | | | 713/156 |
| 2013/0225128 A1* | 8/2013 | Gomar | | H04L 63/0861 |
| | | | | 455/411 |
| 2014/0215590 A1* | 7/2014 | Brand | | G06F 9/5072 |
| | | | | 726/6 |
| 2014/0281539 A1* | 9/2014 | Faltyn | | H04L 9/0863 |
| | | | | 713/168 |
| 2015/0088755 A1* | 3/2015 | Sobel | | G06Q 20/20 |
| | | | | 705/71 |
| 2015/0100793 A1* | 4/2015 | Newell | | H04L 9/3263 |
| | | | | 713/189 |
| 2015/0195399 A1* | 7/2015 | Way | | H04L 43/045 |
| | | | | 455/26.1 |
| 2015/0288694 A1* | 10/2015 | Liebl, III | | H04L 9/3247 |
| | | | | 713/182 |
| 2015/0304110 A1* | 10/2015 | Oberheide | | H04L 63/0823 |
| | | | | 713/155 |
| 2016/0094559 A1* | 3/2016 | Frenette | | H04L 63/101 |
| | | | | 726/4 |
| 2016/0140335 A1* | 5/2016 | Proulx | | H04L 9/0863 |
| | | | | 726/6 |
| 2016/0164682 A1* | 6/2016 | Hartloff | | G06V 40/50 |
| | | | | 713/186 |
| 2016/0337332 A1* | 11/2016 | Ghosh | | G06Q 10/06393 |
| 2017/0085540 A1* | 3/2017 | Avanzi | | H04L 63/0428 |
| 2017/0085542 A1* | 3/2017 | Avanzi | | G06F 11/0727 |
| 2017/0134937 A1* | 5/2017 | Miller | | G06Q 20/3829 |
| 2017/0201380 A1* | 7/2017 | Schaap | | H04L 63/083 |
| 2017/0201382 A1* | 7/2017 | Lindteigen | | H04L 63/0823 |
| 2017/0279788 A1* | 9/2017 | Rosenblum | | H04L 63/083 |
| 2017/0329997 A1* | 11/2017 | Skudlarek | | G06F 21/10 |
| 2017/0359717 A1* | 12/2017 | Adler | | H04W 12/42 |
| 2018/0063117 A1* | 3/2018 | Tseng | | H04L 63/10 |
| 2018/0083771 A1* | 3/2018 | Bonnell | | H04L 9/3268 |
| 2018/0173951 A1* | 6/2018 | Andorko | | G06T 7/11 |
| 2018/0241728 A1* | 8/2018 | Burgess | | H04L 9/3215 |
| 2018/0276519 A1* | 9/2018 | Benkley, III | | G06F 21/45 |
| 2018/0295109 A1* | 10/2018 | Wang | | H04L 63/0471 |
| 2018/0367540 A1* | 12/2018 | Miranda | | H04L 9/0822 |
| 2019/0026448 A1* | 1/2019 | Bhamidipaty | | G06F 21/6218 |
| 2019/0158654 A1* | 5/2019 | Way | | H04W 52/0254 |
| 2019/0199715 A1* | 6/2019 | May | | G16H 20/30 |
| 2019/0236259 A1* | 8/2019 | Remillet | | G06F 3/0482 |
| 2019/0258882 A1* | 8/2019 | Juncker | | G06V 40/67 |
| 2019/0286853 A1* | 9/2019 | Belenky | | H04L 9/0643 |
| 2019/0334921 A1* | 10/2019 | Pattar | | H04L 9/3271 |
| 2019/0347750 A1* | 11/2019 | Edmonds | | G06Q 50/22 |
| 2019/0349349 A1* | 11/2019 | Layouni | | H04L 9/0643 |
| 2020/0213099 A1* | 7/2020 | Wright | | H04L 9/0637 |
| 2020/0259640 A1* | 8/2020 | Leavy | | H04L 9/0841 |
| 2020/0285726 A1* | 9/2020 | Kalous | | G06F 21/35 |
| 2020/0295924 A1* | 9/2020 | Velikevitch | | H04L 9/0822 |
| 2020/0311509 A1* | 10/2020 | Benkley, III | | G06F 21/32 |
| 2020/0380139 A1* | 12/2020 | Kashani | | G06F 21/602 |
| 2021/0105577 A1* | 4/2021 | Baughman | | H04W 4/80 |
| 2021/0111895 A1* | 4/2021 | Doyon | | H04W 12/06 |
| 2021/0192516 A1* | 6/2021 | DeRosa-Grund | | H04L 9/3231 |
| 2021/0250189 A1* | 8/2021 | Ahn | | H04L 9/0866 |
| 2021/0350938 A1* | 11/2021 | Teissonniere | | G06F 21/6254 |
| 2022/0006652 A1* | 1/2022 | Mishra | | H04L 9/3263 |
| 2022/0012731 A1* | 1/2022 | DeRosa-Grund | | G06F 16/2365 |
| 2022/0086169 A1* | 3/2022 | Kumar | | H04W 12/77 |
| 2022/0258695 A1* | 8/2022 | Van Wiemeersch | | |
| | | | | B60R 25/257 |
| 2022/0270725 A1* | 8/2022 | DeRosa-Grund | | G06F 21/602 |
| 2023/0048912 A1* | 2/2023 | Gasti | | H04L 9/14 |
| 2023/0065059 A1* | 3/2023 | Santhana Krishnan | | |
| | | | | H04W 12/0433 |
| 2023/0091318 A1* | 3/2023 | Lindemann | | H04L 63/0442 |
| | | | | 726/4 |
| 2023/0112606 A1* | 4/2023 | Verma | | G06K 19/06037 |
| | | | | 726/6 |

\* cited by examiner

SYSTEMS, METHODS, AND COMPUTING PLATFORMS FOR EXECUTING CREDENTIAL-LESS NETWORK-BASED COMMUNICATION EXCHANGES

CROSS-REFERENCE TO RELATED APPLICATIONS

This application claims the benefit of U.S. Provisional Patent Application Ser. No. 63/370,280 filed on Aug. 3, 2022, and U.S. Provisional Patent Application Ser. No. 63/370,279 filed on Aug. 3, 2022, both of which are incorporated herein by reference in their entireties, including any figures, tables, drawings, and appendices.

TECHNOLOGICAL FIELD

Embodiments of the present disclosure generally relate to credential-less exchanges of value between multiple entities in a value system.

BACKGROUND

Various embodiments of the present disclosure address technical challenges related to network-based value transactions given limitations of existing transaction processing techniques and architectures. Existing processes for executing a transaction over a computing network rely on the use of persistent credentials, such as payment credentials (e.g., card numbers, usernames, passwords, bank routing numbers, account numbers, etc.) and their proxies, which expose recipients of the credentials to fraud, regulatory and compliance costs, and reputational risk. Moreover, due to the static nature of traditional credentials, users must accept risk of financial loss, damaged credit scores, identity theft, and other outcomes each time the user provides their credentials to enable a transaction. The inherent insecurity of persistent credentials is conventionally addressed using strict communication protocols, data governance procedures, and authentication schemes, each of which introduce additional technical problems by adding overhead and complicating network-based transactions without solving the root technical problem of data security.

For example, traditional service providers that manage user accounts may limit their exposure using disclaimers that prevent users from providing their credentials to certain third parties. This leads to network congestion as a limited number of approved parties are overloaded by requests across a population. Moreover, approved parties are required to enroll a user by obtaining sensitive, persistent credentials (e.g., username, passwords, routing/transit credentials, etc.) from the user and then subsequently manage a robust number of persistent credentials across a number of enrolled users. This presents a single attack vector for malicious parties to obtain sensitive user information for a population of users. To counter such attacks, traditional transaction processing entities are required to adopt costly, resource intensive, and robust data governance procedures and authentication schemes that are imperfect and still subject to infiltration.

Other techniques for addressing data security include limiting exchange communications, such as those for financial transactions, to strict messaging standards, such as ISO messaging standards, which are inflexible and, by design, unable to provide contextual data for transactions. Thus, such communication standards increase the network security at the cost of transaction functionality.

Various embodiments of the present disclosure make important contributions to various existing network-based value transaction processing techniques by addressing each of these technical challenges.

BRIEF SUMMARY

Various embodiments of the present disclosure disclose a secure intermediary computing platform and computing services that facilitate the credential-less execution of a value-based exchange that leverages UUEK (Universally Unique Ephemeral Key) to eliminate the use of persistent credentials. To do so, the intermediary computing platform may facilitate interactions between one or more member platforms to enroll a user instrument in a value exchange system that is powered by a new, ephemeral data structure referred to herein as an UUEK. Unlike conventional enrollment systems, the intermediary computing platform does not receive or rely upon persistent user or instrument credentials to enroll a user's instrument. The elimination of such credentials enables the use of new, more flexible, interfaces, such as application programming interfaces (APIs) described herein, that are leveraged by the intermediary computing platform to communicate with different network members to enroll a user's instrument, without exposing user credentials at any step in the process. Once enrolled, the intermediary computing platform may issue UUEKs to a member platform that may replace traditional, persistent credentials. The issued UUEKs are not reflective of persistent credentials or any other sensitive user or instrument information. Interfaces between a member platforms and the intermediary platform may allow (i) a user to present the issued UUEK (without explicit reference to a persistent credential) from a member platform to an intermediate platform, and (ii) the intermediary platform to map the issued UUEK to instrument keys for the same or another member platform and provide the instrument keys to the member platform to authorize a value-based exchange. In this way, network-based transactions may be authorized in a seamless process without exposing sensitive user or instrument information that may be susceptible to network attacks. Ultimately, this enables additional flexibility (e.g., through the use of new interfaces, etc.) and security (e.g., through the elimination of persistent credentials, etc.), while reducing computing power requirements and enabling significantly greater network throughput for exchange processing relative to traditional techniques.

In some embodiments, a method includes initiating, by one or more processors and using a partner interface, the presentation of an enrollment user interface via a client device of a user, wherein the enrollment user interface comprises an instrument enrollment screen that is indicative of one or more service provider instruments associated with the user; receiving, by the one or more processors and using the partner interface, selection data indicative of a selection of a service provider instrument from the enrollment user interface; generating, by the one or more processors, a matching code for authenticating the user; providing, by the one or more processors and using a service provider interface, an enrollment request to a service provider platform corresponding to the service provider instrument, wherein the enrollment request comprises service provider enrollment data indicative of the matching code, a user identifier for the user, and an instrument identifier for the service provider instrument; receiving, by the one or more processors and using the partner interface, an authentication message comprising the matching code; and in response to an authentication of the user based on the matching code, (i) generating, by the one or more processors, an UUEK for the user, wherein the UUEK corresponds to the user, the service provider instrument, and a partner platform; and (ii) providing, by the one or more processors and using the partner interface, the UUEK to the partner platform.

In some embodiments, a computing system includes a memory and one or more processors communicatively coupled to the memory, the one or more processors configured to initiate, using a partner interface, the presentation of an enrollment user interface via a client device of a user, wherein the enrollment user interface comprises an instrument enrollment screen that is indicative of one or more service provider instruments associated with the user; receive, using the partner interface, selection data indicative of a selection of a service provider instrument from the enrollment user interface; generate a matching code for authenticating the user; provide, using a service provider interface, an enrollment request to a service provider platform corresponding to the service provider instrument, wherein the enrollment request comprises service provider enrollment data indicative of the matching code, a user identifier for the user, and an instrument identifier for the service provider instrument; receive, using the partner interface, an authentication message comprising the matching code; and in response to an authentication of the user based on the matching code, (i) generate an UUEK for the user, wherein the UUEK corresponds to the user, the service provider instrument, and a partner platform; and (ii) provide, using the partner interface, the UUEK to the partner platform.

One or more non-transitory computer-readable storage media including instructions that, when executed by one or more processors, cause the one or more processors to initiate, using a partner interface, the presentation of an enrollment user interface via a client device of a user, wherein the enrollment user interface comprises an instrument enrollment screen that is indicative of one or more service provider instruments associated with the user; receive, using the partner interface, selection data indicative of a selection of a service provider instrument from the enrollment user interface; generate a matching code for authenticating the user; provide, using a service provider interface, an enrollment request to a service provider platform corresponding to the service provider instrument, wherein the enrollment request comprises service provider enrollment data indicative of the matching code, a user identifier for the user, and an instrument identifier for the service provider instrument; receive, using the partner interface, an authentication message comprising the matching code; and in response to an authentication of the user based on the matching code, (i) generate an UUEK for the user, wherein the UUEK corresponds to the user, the service provider instrument, and a partner platform; and (ii) provide, using the partner interface, the UUEK to the partner platform.

BRIEF DESCRIPTION THE DRAWINGS

Having thus described the disclosure in general terms, reference will now be made to the accompanying drawings, which are not necessarily drawn to scale, and wherein:

Figure 6A:
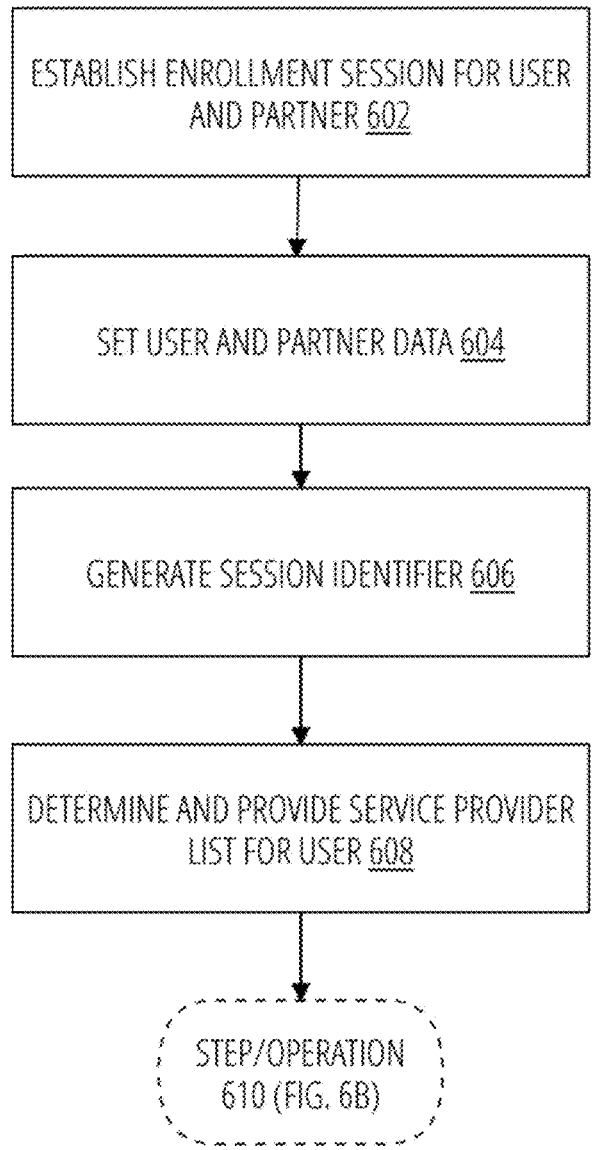
Figure 6B:
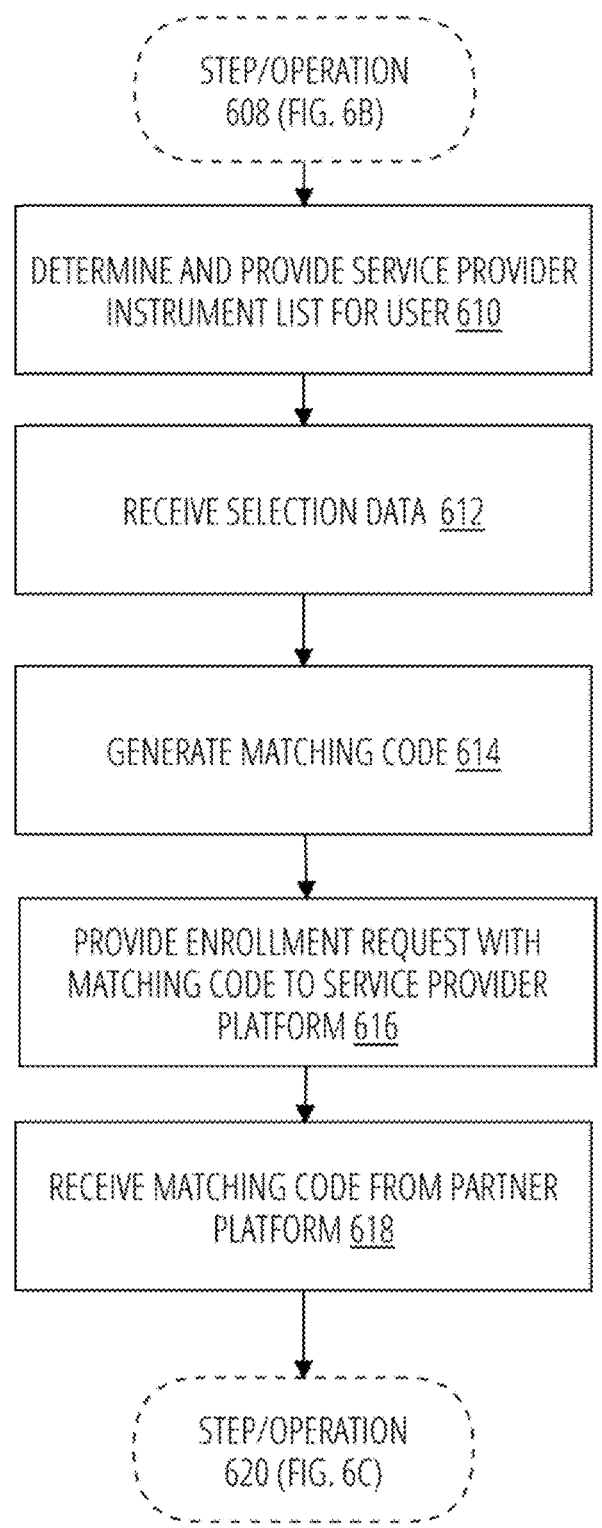
Figure 6C:
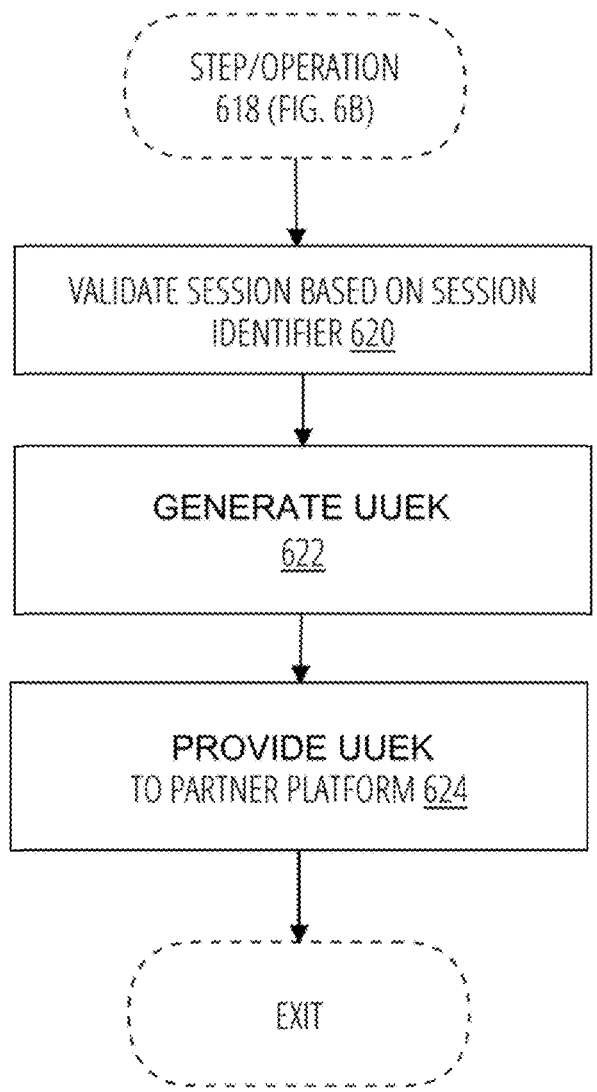
Figure 9:
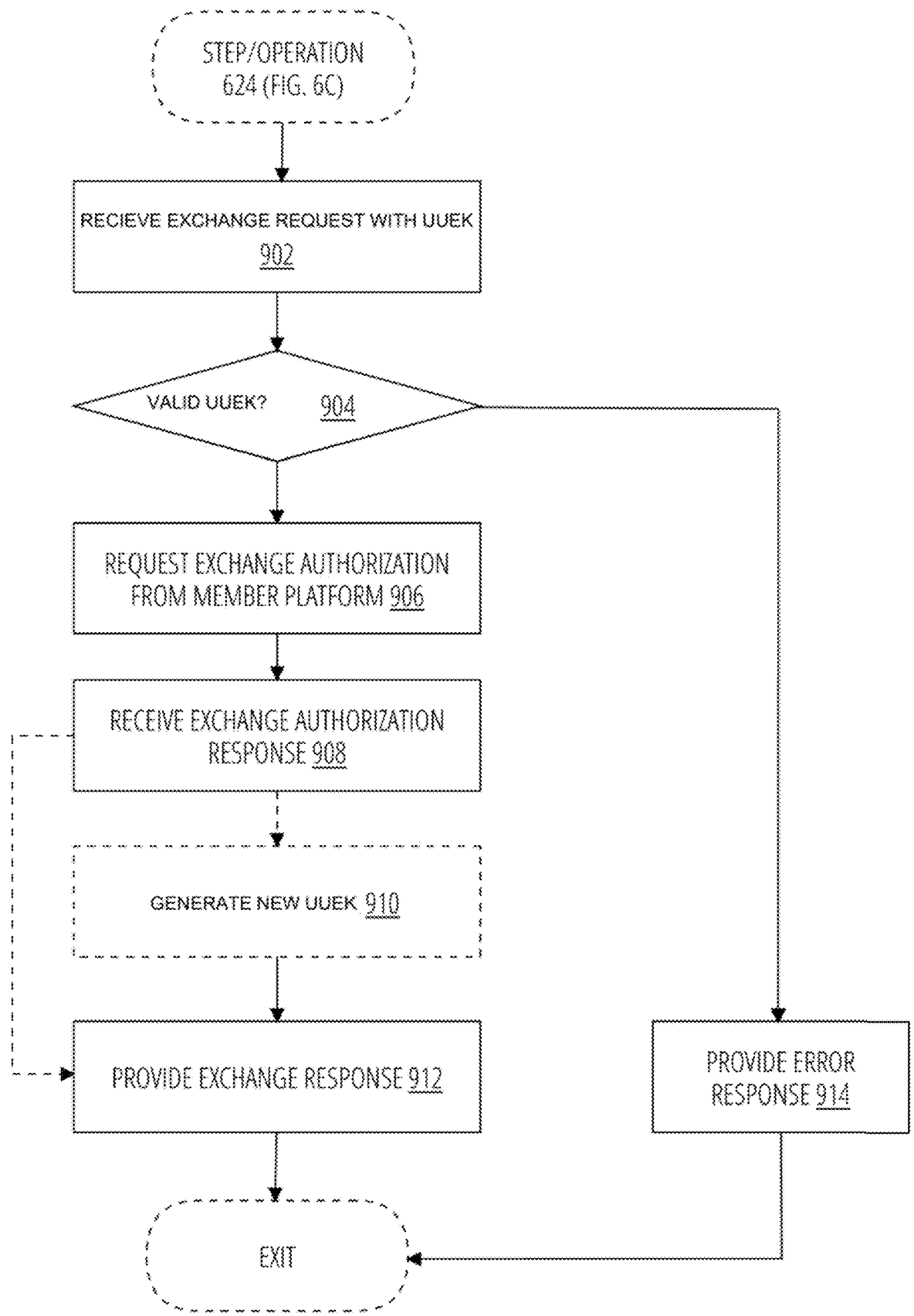
Figure 10:
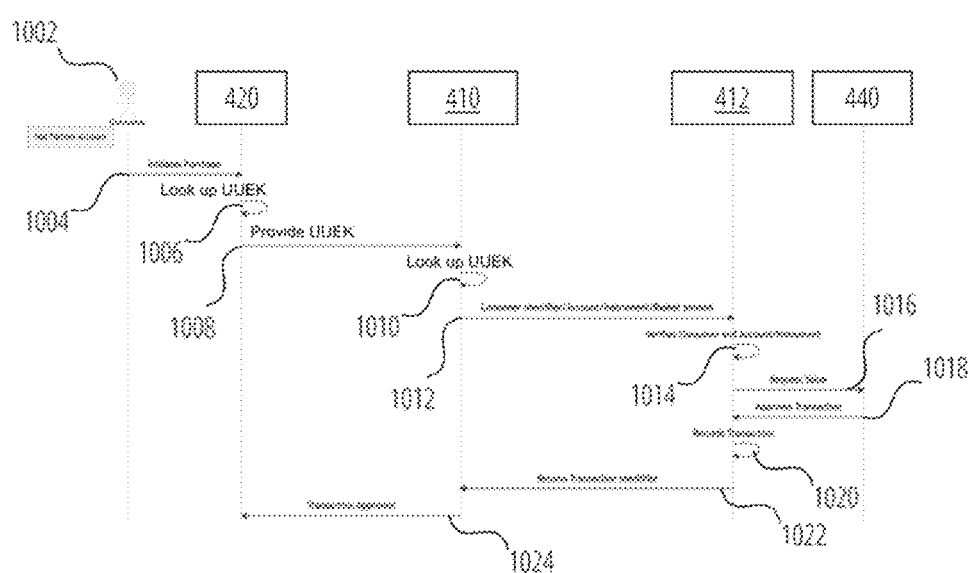
Figure 11:
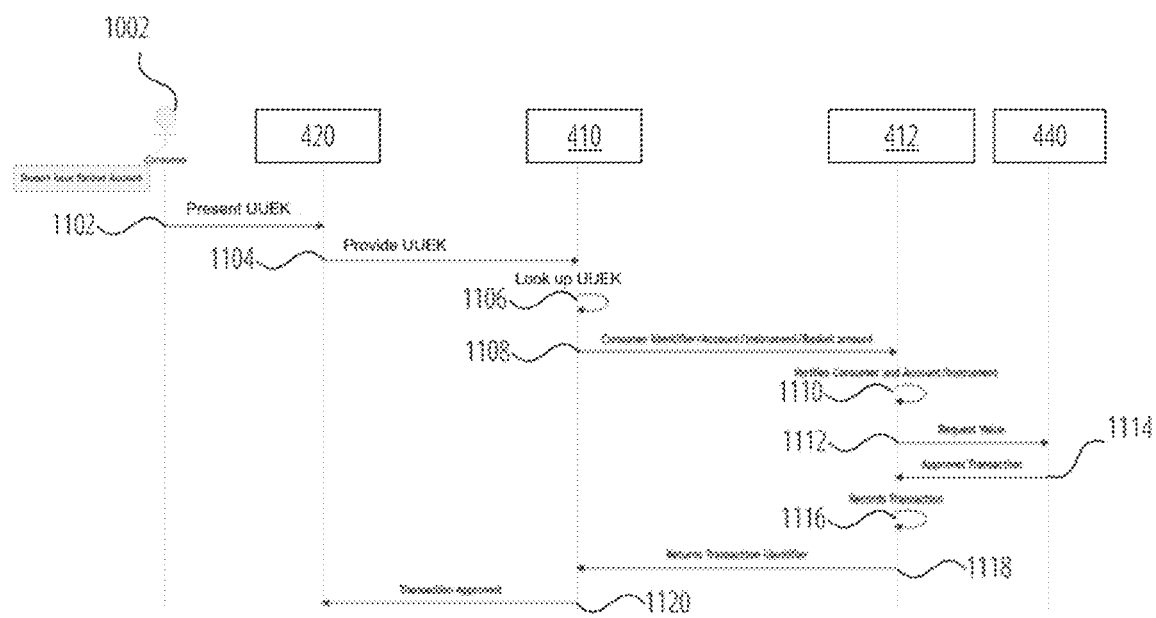

FIGS. 6A-C provide process flows for establishing a cross-entity relationship in accordance with one or more embodiments of the present disclosure;

FIGS. 7A-D provide messaging flows for establishing a cross-entity relationship in accordance with one or more embodiments of the present disclosure;

FIG. 8A-F provides example interfaces for establishing a cross-entity relationship in accordance with one or more embodiments of the present disclosure;

FIG. 9 provides a process flow for facilitating a credential-less exchange of value in accordance with one or more embodiments of the present disclosure;

FIG. 10 provides a first messaging flow for facilitating a credential-less exchange of value in accordance with one or more embodiments of the present disclosure;

FIG. 11 provides a second messaging flow for facilitating a credential-less exchange of value in accordance with one or more embodiments of the present disclosure;

FIGS. 12A-D provide example interfaces for facilitating a credential-less exchange of value in accordance with one or more embodiments of the present disclosure.

DETAILED DESCRIPTION OF SOME EXAMPLE EMBODIMENTS

Various embodiments of the present disclosure are described more fully hereinafter with reference to the accompanying drawings, in which some, but not all embodiments of the present disclosure are shown. Indeed, the present disclosure may be embodied in many different forms and should not be construed as limited to the embodiments set forth herein; rather, these embodiments are provided so that the present disclosure will satisfy applicable legal requirements. The term "or" is used herein in both the alternative and conjunctive sense, unless otherwise indicated. The terms "illustrative" and "example" are used to be examples with no indication of quality level. Terms such as "computing," "determining," "generating," and/or similar words are used herein interchangeably to refer to the creation, modification, or identification of data. Further, "based at least in part on," "based at least on," "based upon," and/or similar words are used herein interchangeably in an open-ended manner such that they do not necessarily indicate being based at least in part only on or based solely on the referenced element or elements unless so indicated. Like numbers refer to like elements throughout.

I. GENERAL OVERVIEW AND TECHNICAL ADVANTAGES

Various embodiments of the present disclosure provide technical solutions for managing network-based exchanges. In various embodiments, an exchange platform may be configured to facilitate a credential-less exchange of value between one or more member platforms. These exchanges may be facilitated in real time, without persistent credentials that may expose members to financial, legal, reputational, or other risks. Accordingly, in various embodiments, client devices may purchase, sell, and/or execute a value-based exchange, in real-time, over any network, without exposing sensitive information susceptible to network-based attacks.

Embodiments of the present disclosure provide improved instrument enrollment and exchange processing techniques that leverage interfaces and data transformation and encryption techniques to increase data security, while reducing computing resource expenditure requirements for safeguarding sensitive data through network communications. Some techniques of the present disclosure, for example, retrieve and transform data objects into unique data keys recognizable only to approved entities. The data keys may be provided and/or established by leveraging exchange interfaces between an exchange platform and other member platforms. Once established, the data keys may be mapped to sensitive credentials stored within a source platform (e.g., a service provider platform), without requiring the network transmission of the sensitive credentials. Future communications to facilitate a value-based exchange may replace traditional, persistent credentials with data keys to enable a source platform to identify persistent credentials and/or perform one or more actions for a particular instrument associated therewith. In this manner, the exchange platform may facilitate an exchange using keys (and/or other identifiers) that are not, by themselves, traceable to underlying sensitive information. This, in turn, allows the exchange platform to holistically track, facilitate, and distribute network-based communications without exposing a member to network attacks. In this way, the enrollment techniques of the present disclosure provide improved data and network security techniques that may be practically applied for a network-based exchange to securely enroll an instrument with an exchange platform.

In addition to the above, embodiments of the present disclosure present network-based exchange processing techniques for facilitating credential-less exchanges. To do so, some of the techniques of the present disclosure leverage new data structures, UUEKs, that may replace persistent credentials traditionally used to authorize a value-based exchange. Using the techniques of the present disclosure, a UUEK may be securely issued across member platforms to allow a user to execute a value-based exchange using an identifier that is recognizable to a single party, the exchange platform. The UUEK may be mapped to unique identifiers that may reference sensitive information without directly identifying the sensitive information. A unique identifier, for example, may reference a mapping only interpretable by a source platform, such that the identifiers are unusable by malicious parties unaffiliated with the exchange platform. In this manner, the exchange platform may distribute, track, and facilitate exchanges without exposing member platforms to data security risks. Moreover, the exchange platform may continuously update, modify, and/or redistribute UUEKs to the member platforms to continuously adapt UUEKs in real time. In this manner, the exchange platform may provide technical improvements to data and network security, while reducing the computing resource requirements (e.g., for securely encrypting persistent credentials) for facilitating value-based exchanges.

Example inventive and technologically advantageous embodiments of the present disclosure include (i) data transformation, mapping, and processing schemes for facilitating the network-based credential-less enrollment of users, (ii) exchange interfaces and network-based communication schemes for improving network security for cross-platform communications, and (iii) ephemeral data structures and data management techniques for distributing the ephemeral data structures to facilitate real-time, secure, and dynamic value-based exchanges.

II. EXAMPLE DEFINITIONS

In some embodiments, the term "exchange platform" refers to a computing entity that is configured to facilitate credential-less exchanges of value for one or more members in a network. The exchange platform may include one or more processing devices, memory devices, and/or the like that are physically and/or wirelessly coupled and configured to collectively (and/or individually) perform the one or more computing tasks for facilitating a value system agnostic exchange. In some examples, the exchange platform may include, define, and/or otherwise leverage one or more application programming interfaces (APIs) for facilitating communications (e.g., requests and responses, etc.) between a plurality of members. As described herein, the APIs may be leveraged to facilitate a secure exchange between one or more members in any value system.

In some embodiments, the term "member" refers to an entity that collaborates with the exchange platform to take part in an exchange of value. As examples, a member may include (i) a partner that utilizes the exchange platform to receive value, (ii) a service provider that utilizes the exchange platform to provide value, and/or (iii) both a partner and a service provider. As used herein, a member may refer to as a partner when it receives value through a value exchange and/or a service provider when it provides value through a value exchange. Thus, the same member may be a partner or a service provider depending on the role of the member in a value exchange. For example, a member may be a partner that receives value for a value exchange. The same member may be a service provider that provides value in another value exchange. In some examples, the same member may be both the partner and the service provider in the same value exchange, such that the member utilizes the exchange platform to provide and then receive value in a sole member value exchange.

In some embodiments, a member is a partner when it utilizes a service provided by a service provider. A partner may include any value seeking entity in any value system. As an example, in a financial value system, a partner may include a merchant (e.g., retailer, brick-and-mortar establishment, etc.) that may utilize a service provider, such as a financial institution, to access funds for a financial transaction. In addition, or alternatively, in an information value system, a partner may include a news publisher (e.g., a newspaper, media organization, etc.) that may utilize a service provider, such as a news agency (e.g., wire service, news service, etc.) to access information for an information transaction. As will be understood, the techniques of the present disclosure may be applied to any value system and the partner may include any value seeker for any respective value system.

In some embodiments, a member is a service provider when it provides a service for a partner. A service provider may include a source of value in any value system. As an example, in a financial value system, a service provider may include a financial institution (e.g., bank, currency exchange platform, credit union, etc.) that may provide access to funds for a financial transaction between one or more entities. In addition, or alternatively, in an information value system, a service provider may include a news agency (e.g., wire service, news service, etc.) that may source information for publication by a news publisher. As will be understood, the techniques of the present disclosure may be applied to any value system and the service provider may include any source of value for any respective value system.

In some embodiments, the term "member platform" refers to a computing entity corresponding to a member. The member platform entity may include a partner computing platform acting on behalf of a partner, a service provider computing platform acting on behalf of a service provider, and/or both. In some examples, a member platform may be both a partner platform and the service provider platform. For example, the same member platform may be configured to operate on behalf of a partner for one value exchange and a service provider for another value exchange. In some examples, the same member platform may be configured to operate on behalf of both a partner and service provider in a single value exchange. It is noted that the term member platform may refer to a partner platform, a service provider platform, or both and, in some examples, may depend on the role of the member platform in a value exchange (e.g., and/or one or more APIs utilized by the member platform in the value exchange).

In some embodiments, a partner platform is a computing entity that is configured to perform one or more operations on behalf of a partner. A partner platform, for example, may include one or more processing devices, memory devices, and/or the like that are physically and/or wirelessly coupled and configured to collectively (and/or individually) perform the one or more computing tasks for requesting value in a value system agnostic exchange. In some examples, a partner platform may include, define, and/or otherwise leverage one or more APIs for facilitating communications (e.g., requests and responses, etc.) with the exchange platform. In some examples, a partner platform may be configured to host one or more user-facing applications (e.g., a partner application, etc.) for interacting with one or more users.

In some embodiments, a service provider platform is a computing entity that is configured to perform one or more operations on behalf of a service provider. A service provider platform, for example, may include one or more processing devices, memory devices, and/or the like that are physically and/or wirelessly coupled and configured to collectively (and/or individually) perform the one or more computing tasks for providing value in a value system agnostic exchange. In some examples, a service provider platform may include, define, and/or otherwise leverage one or more APIs for facilitating communications (e.g., requests and responses, etc.) with the exchange platform. In some examples, a service provider platform may be configured to facilitate one or more service provider instruments. In some examples, the service provider platform may be configured to host one or more user-facing applications (e.g., a service provider application, etc.) for managing the one or more service provider instruments.

In some embodiments, the term "exchange interfaces" refers to a set of instructions for facilitating communications between the exchange platform and one or more member platforms and/or internal services. An exchange interface may include an API, file based interface, a message queue based interface, and/or the like. For instance, an exchange interface may include an API including, as examples, one or more simple object access protocol (SOAP) APIs, one or more remote procedure call (RPC) APIs, one or more websocket APIs, one or more representational state transfer (REST) APIs, and/or the like. In some embodiments, an exchange interface may include one or more RPC APIs, such as one or more gRPC APIs.

The exchange platform may include, define, and/or otherwise leverage one or more different exchange interfaces for facilitating communication with one or more external platforms, such as one or more member platforms (e.g., a partner platform, service provider platform, etc.). Each API may include a plurality of communication instructions, message definitions, and/or the like for exchanging requests and/or responses between the exchange platform and an entity that is taking part in a value exchange. By way of example, an exchange interface may include a partner API for facilitating communication with a partner platform and/or a service provider API for facilitating communication with a service provider platform.

In some embodiments, the term "partner interface" refers to an exchange interface for facilitating one or more communications between a partner platform and the exchange platform. The partner interface may define one or more communication instructions, message definitions, and/or the like for facilitating one or more request messages and/or response messages between a partner platform and the exchange platform. The partner interface, for example, may include an API that defines (i) requests to the exchange platform from a computing entity acting as a partner platform and/or (ii) requests from the exchange platform to the partner platform. For example, the partner interface may define one or more registration messages, session messages, transaction messages, and/or the like for facilitating an exchange of value for the partner. In some embodiments, the partner interface defines one or more identifiers for securely identifying one or more portions of a value exchange.

In some embodiments, the term "service provider interface" refers to an exchange interface for facilitating one or more communications between a service provider platform and the exchange platform. The service provider interface may define one or more communication instructions, message definitions, and/or the like for facilitating one or more request messages and/or response messages between a service provider platform and the exchange platform. The service provider interface, for example, may include an API that defines (i) requests to the exchange platform from a computing entity acting as a service provider platform and/or (ii) requests from the exchange platform to the service provider platform. The service provider interface, for example, may define one or more registration messages, session messages, transaction messages, and/or the like for facilitating an exchange of value using a service provider instrument. In some embodiments, the service provider interface defines one or more identifiers for securely identifying one or more portions of a value exchange.

In some embodiments, the term "entity partition" refers to a unique identifier for a computing entity. An entity partition may include a unique number, alpha-numeric, and/or the like that represents a particular computing entity. An entity partition, for example, may include a member partition that represents a member platform, a service provider partition that represents a service provider platform, a partner partition that represents a partner platform, and/or the like.

In some embodiments, the term "service provider partition" refers to a unique identifier for a service provider and/or service provider platform of a service provider. The service provider partition may include a sequence of numeric, alpha-numeric, any/or any other characters or symbols that are representative of a service provider that is associated (e.g., onboarded, registered, etc.) with the exchange platform. The exchange platform, for example, may include a plurality of service provider partitions that respectively identify a service provider platform that is affiliated with (e.g., onboarded with, registered with, etc.) the exchange platform. Each service provider partition may represent a service provider platform that has configured one or more exchange platform software development kits (SDKs), and/or like for implementing a service provider interface of the exchange platform.

In some embodiments, a "partner partition" refers to a unique identifier for a partner and/or a partner platform of a partner. The partner partition may include a sequence of numeric, alpha-numeric, any/or any other characters or symbols that are representative of a partner that is associated with the exchange platform. The exchange platform, for example, may include a plurality of partner partitions that respectively identify a partner platform that is affiliated with (e.g., onboarded with, registered with, etc.) the exchange platform. Each partner partition may represent a partner platform that has configured one or more exchange SDKs, and/or the like for implementing a partner interface of the exchange platform.

In some embodiments, the term "user-facing application" refers to a computer program hosted by a computing entity for facilitating one or more user interactions. A user-facing application may include software (e.g., computer readable instructions, etc.) designed to perform one or more computing tasks for a computing entity, such as a member platform. For instance, a user-facing application may facilitate communication between a member and a user. As examples, the user-facing application may be configured to present one or more user interfaces for interacting with a user on behalf of a member. In some examples, the user-facing application may be configured to receive user input (e.g., via one or more user interfaces) to receive information from a user.

In some embodiments, a user-facing application is a partner application that is hosted by the partner platform (e.g., a member platform acting as a partner for a particular exchange, etc.) to facilitate functions for a partner. A partner application may include software (e.g., computer readable instructions, etc.) designed to perform one or more computing tasks for a partner. For instance, a partner application may be configured to present one or more user interfaces for interacting (e.g., browsing, purchasing, reviewing, etc.) with one or more products offered by a retail-based partner, one or more units of information offered by an information-based partner, and/or the like. In some examples, the partner application may be configured to receive user input (e.g., via one or more user interfaces) to receive information from a user.

In some embodiments, a user-facing application is a service provider application that is hosted by the service provider platform (e.g., a member platform acting as a service provider for a particular exchange, etc.) to facilitate functions for the service provider. A service provider application may include software (e.g., computer readable instructions, etc.) designed to perform one or more computing tasks for a service provider. For instance, a service provider application may be configured to present one or more user interfaces for interacting (e.g., reviewing, managing, auditing, enrolling, etc.) with one or more service provider instruments facilitated by the service provider. By way of example, in a financial value system, the service provider application may enable access to a bank account, brokerage account, line of credit, and/or the like, to manage funds, assets, and/or the like, handled by the respective accounts. In some examples, the service provider application may be configured to receive user input (e.g., via the one or more user interfaces) to receive information, authorizations, and/or the like from a user.

In some embodiments, the term "service provider instrument" refers to a mechanism leveraged by a service provider for providing value on behalf of a particular user. The service provider instrument may depend on the value system and/or service provider. In some examples, the service provider instrument may include an account with the service provider. For example, in a financial value system, a service provider instrument may include a bank account (e.g., checking, saving, etc.), brokerage account, line of credit, and/or the like. In an information value system, the service provider instrument may include a subscriber account, and/or the like. In some examples, a service provider instrument may include a virtual instrument hosted by a service provider platform.

In some embodiments, the term "instrument data object" refers to a data entity that represents a service provider instrument. The instrument data object may include one or more instrument identifiers and/or one or more instrument attributes. In some examples, the one or more instrument identifiers and/or one or more instrument attributes may be based on a type of instrument data object. By way of example, a service provider instrument may be represented in a member platform as a member instrument data object. In addition, or alternatively, the service provider instrument may be independently represented by a system instrument data object in an exchange platform. In some examples, the member instrument data object and the system instrument data object may include one or more of the same one or more instrument identifiers and/or one or more instrument attributes. By way of example, a member platform may register a plurality of service provider instruments with an exchange platform. During registration, the member platform may provide one or more of the instrument identifiers and/or instrument attributes and, in some examples, the exchange platform may return another identifier.

In some embodiments, the member instrument data object is an internal representation of a service provider instrument within a member platform. The member instrument data object may include one or more instrument identifiers, such as a member instrument identifier, an instrument key from the exchange platform, and/or a user identifier. The user identifier, for example, may include a member user identifier. In addition, or alternatively, the member instrument data object may include one or more instrument attributes, such as an instrument type (e.g., credit-based instrument, debit-based instrument, information-based instrument, etc.), an instrument representation, and/or one or more contextual attributes. In some examples, the contextual attributes may depend on the value system. For instance, in a financial value system, the one or more contextual attributes may be indicative of a (i) currency associated with the service provider instrument, (ii) an asset availability (e.g., a balance, coverage, etc.) of the service provider instrument, (iii) one or more previous transactions with the service provider instrument, and/or the like.

In some embodiments, the system instrument data object is an external representation of a service provider instrument within the exchange platform. The system instrument data object may include one or more instrument identifiers, such as an instrument reference for a member platform, a system instrument identifier, and/or a user identifier. The user identifier, for example, may include a system user identifier. In addition, or alternatively, the system instrument data object may include one or more instrument attributes, such as an instrument type (e.g., credit-based instrument, debit-based instrument, information-based instrument, etc.), an instrument representation, and/or one or more contextual attributes. In some examples, the contextual attributes may depend on the value system. For instance, in a financial value system, the one or more contextual attributes may be indicative of a currency associated with the service provider instrument.

In some embodiments, the term "instrument identifier" refers to any representation of a service provider instrument. The instrument identifier may include an instrument identifier, instrument reference, instrument key, and/or the like, as described herein.

In some embodiments, the term "member instrument identifier" refers to a unique identifier for representing a service provider instrument within a member platform. The member instrument identifier, for example, may include a sequence of numeric, alpha-numeric, any/or any other characters or symbols that represent a service provider instrument to a service provider platform.

In some embodiments, the term "instrument reference" refers to a unique identifier for referencing a member instrument identifier. The instrument reference, for example, may be generated and/or provided by a member platform to an exchange platform to allow the exchange platform to reference an instrument maintained at the member platform. In some examples, the instrument reference is the same value as the member instrument identifier. In some examples, the instrument reference is a different value that is mapped to the member instrument identifier.

In some embodiments, the term "system instrument identifier" refers to a unique identifier for representing a service provider instrument within an exchange platform. The system instrument identifier, for example, may include a sequence of numeric, alpha-numeric, any/or any other characters or symbols that represent a service provider instrument to an exchange platform. In some examples, the system instrument identifier may include a UUID.

In some embodiments, the term "instrument key" refers to a unique identifier for referencing a system instrument identifier. The instrument key, for example, may be generated and/or provided by the exchange platform during a registration process of an instrument with the exchange platform. In some examples, the instrument key may include a wrapped system instrument identifier. For example, the instrument key may include a string of alpha-numeric characters that are formatted according to a key format established by the exchange platform (and/or one or more APIs thereof). The key format may include any number of characters, such as fifty characters or more. In some examples, the characters may be case sensitive. A first portion of the characters (e.g., the first six characters) may be reserved as a partition for identifying an entity associated with the key. For an instrument key, the partition may include a service provider partition. A second portion of the characters may identify the system instrument identifier. The key formats described herein may include one or more different portions, each of which may be arranged in any order.

In some embodiments, the term "instrument representation" refers to a unique identifier for representing a service provider instrument to a user. The instrument representation, for example, may include a sequence of numeric, alpha-numeric, any/or any other characters or symbols that are outwardly representative of a service provider instrument. The format and/or value of an instrument representation may be based at least in part on the type of service provider and/or service provider instrument. For instance, in a financial value system, an instrument reference may include a portion (e.g., the last four digits, etc.) of persistent credentials, such as an account number (e.g., debit account, credit account, etc.), a financial account name, and/or the like. As another example, in an information value system, an instrument reference may include a portion (e.g., one or more digits, alpha-numeric characters, etc.) of persistent credentials, such as a subscription account, and/or the like. For instance, the instrument representation may include a derivative of persistent credentials that may only allow entities with prior knowledge of the persistent credentials to identify the persistent credentials using the instrument representation. As another example, the instrument representation may include an instrument nickname that is assigned and thereafter recognized by a user.

In some embodiments, the term "user data object" refers to a data entity that represents a user that interacts with a member platform and/or the exchange platform. A user, for example, may include an entity (e.g., person, organization, group, etc.) that engages in an exchange of value governed by the exchange platform. In some examples, the user may indirectly cooperate with the exchange platform by creating a user account with a registered service provider, registering (and/or giving permission to register) a service provider instrument, and/or the like. In some examples, the exchange platform may act on the user's behalf without the user directly engaging with the exchange platform. For example, the exchange platform may act as a hidden intermediary between a user-facing application and a user's service provider instrument.

In some embodiments, a user data object includes one or more user identifiers and/or one or more user attributes. In some examples, the one or more user identifiers and/or one or more user attributes may be based on a type of user data object. By way of example, a user may be represented in a member platform as a member user data object. In addition, or alternatively, the user may be independently represented by a system user data object in an exchange platform. In some examples, the member user data object and the system user data object may include one or more of the same one or more user identifiers and/or user attributes. By way of example, a member platform may register a plurality of users with an exchange platform. During registration, the member platform may provide one or more of the user identifiers and/or user attributes and, in some examples, the exchange platform may return another identifier.

In some embodiments, the member user data object is an internal representation of a user within a member platform. The member instrument data object may include one or more user identifiers, such as a member user identifier, a user key from the exchange platform, and/or the like. In addition, or alternatively, the member user data object may include one or more user attributes. The one or more user attributes may be indicative of one or more contextual characteristics for a user. In some examples, the user attributes may be indicative of one or more identifiable characteristics for a user. By way of example, the user attributes may be indicative of a user's first name, last name, email, physical address (e.g., one or more of a street, locality, region, postal code, country, etc.), birthday (e.g., a birth date, an age band, etc.), phone number, and/or the like. In some examples, the user attributes may include encrypted, hashed, and/or otherwise secured representations of the identifiable characteristics for a user. For instance, the user attributes may include one or more hashed identifiers for the user and/or the like.

In some embodiments, the system user data object is an external representation of a member's user within the exchange platform. The system user data object may include one or more user identifiers, such as an user reference for a member platform, a system user identifier, and/or the like. In addition, or alternatively, the system user data object may include one or more user attributes, such as those described herein. By way of example, a member platform may register a user with the exchange platform. During registration, the member platform may provide the user reference for the user and/or the one or more user attributes. In some examples, the user attributes may include hashed and/or encrypted identifiers for the user.

In some embodiments, the term "user identifier" refers to a unique identifier for a user involved in a value-based exchange. A user identifier may include a sequence of numeric, alpha-numeric, any/or any other characters or symbols that are representative of a user of the exchange platform and/or member platform. In some examples, a user identifier may include a user reference, a user key, a system user identifier, a member user identifier, and/or the like.

In some embodiments, the term "system user identifier" refers to a unique identifier for representing a user within an exchange platform. The system user identifier, for example, may include a sequence of numeric, alpha-numeric, any/or any other characters or symbols that represent a user to an exchange platform. In some examples, the system user identifier may include a UUID specific to a particular user.

In some embodiments, the term "member user identifier" refers to a unique identifier for representing a user within a member platform. The member user identifier, for example, may include a sequence of numeric, alpha-numeric, any/or any other characters or symbols that represent a user to a service provider platform.

In some embodiments, the term "user reference" refers to a unique identifier for referencing a member user identifier. The user reference, for example, may be generated and/or provided by a member platform to an exchange platform to allow the exchange platform to reference a user associated with the member platform. In some examples, the user reference is the same value as the member user identifier. In some examples, the user reference is a different value that is mapped to the member user identifier.

In some embodiments, the term "user key" refers to a unique identifier for referencing a system user identifier. The user key, for example, may be generated and/or provided by the exchange platform during a registration process of a user with the exchange platform. In some examples, the user key may include a wrapped system user identifier. For example, the user key may include a string of alpha-numeric characters that are formatted according to a key format established by the exchange platform (and/or one or more APIs thereof). The key format, for example, may include a first portion of the characters (e.g., the first six characters) that may be reserved as a partition for identifying an entity (e.g., a member, etc.) associated with the key. For example, for a user key, the partition may include a service provider partition and/or a partner partition. A second portion of the characters may identify the system user identifier.

In some embodiments, the term "exchange data object" refers to a data entity that represents an authorized value exchange between one or more members associated with the exchange platform. In some examples, the exchange data object may include one or more identifiers and/or one or more exchange attributes. For example, the one or more identifiers and/or one or more exchange attributes may be based on a type of exchange data object. By way of example, an exchange may be represented in a member platform as a member exchange data object. In addition, or alternatively, the exchange may be independently represented by a system exchange data object in an exchange platform. In some examples, the member exchange data object and the system exchange data object may include one or more of the same one or more identifiers and/or exchange attributes. By way of example, using some of the techniques of the present disclosure, the exchange platform may issue one or more unique identifiers to a member platform that may be used to authorize a value exchange.

In some embodiments, the system exchange data object is an internal representation of a value exchange that is intermediated using the exchange platform. In some examples, the system exchange data object may include one or more different identifiers and/or exchange attributes depending on the role of the system exchange data object in a value-based exchange.

For example, a system exchange data object may include a service provider-specific exchange data object that corresponds to a service provider platform. The service provider-specific exchange data object may include one or more identifiers, such as an exchange identifier, a system user identifier, a system instrument identifier, an UUEK, and/or the like. In addition, or alternatively, the service provider-specific exchange data object may include one or more exchange attributes, such as an expiration date, a currency (e.g., for a financial value system, etc.), and/or the like.

In addition, or alternatively, the system exchange data object may include a partner-specific exchange data object that corresponds to a partner platform. The partner-specific exchange data object may include one or more identifiers, such as an exchange identifier, an instrument key, an UUEK, a member instrument reference (e.g., a partner-specific instrument reference, etc.), and/or the like. In addition, or alternatively, the partner-specific exchange data object may include one or more exchange attributes, such as an expiration date, a currency (e.g., for a financial value system, etc.), an instrument type, a previous UUEK identifier, and/or the like. In some embodiments, the member exchange data object is an external representation of a value exchange that is intermediated using the exchange platform. The member exchange data object may include one or more identifiers, such as a member exchange identifier, a member instrument identifier, an UUEK from the exchange platform, and/or the like.

In some embodiments, the term "exchange identifier" refers to a unique identifier for an exchange of value using the exchange platform. The exchange identifier may include a sequence of numeric, alpha-numeric, any/or any other characters or symbols that are representative of at least a user and/or a service provider instrument. In some examples, the unique exchange identifier may include a universally unique identifier (UUID) that may be mapped (e.g., through a series of identifiers, etc.) to a user, a service provider instrument, and/or a member registered with the exchange platform. In some examples, the exchange identifier may be randomly generated using one or more UUID generators. For instance, the exchange identifier may include a randomized sixteen bytes of information generated in accordance with one or more UUID formatting standards, such as UUID v4, and/or the like. Therefore, while the exchange identifier may be leveraged by the exchange platform and/or a member platform for one or more functions, the same exchange identifier will be useless to external parties without a prior association between the exchange identifier and one or more other identifiers. In some examples, the exchange identifier may be externally represented by a UUEK.

In some embodiments, an "universally unique ephemeral key" or "UUEK" refers to an external representation of an exchange identifier that may be issued (e.g., in place of the service provider exchange identifier and/or a partner exchange identifier) to an external entity, such as a user, partner, and/or service provider, to initiate a transaction using the exchange platform. To do so, the UUEK may be generated and issued by the exchange platform to the external entity. Each UUEK may include a plurality of values (e.g., up to fifty characters and/or more that may be case sensitive) that represent one or more aspects of a transaction. For example, the plurality of values may be indicative of an exchange identifier, a partition (e.g., identifying the recipient of the UUEK, etc.), an identifier type, and/or one or more flags. By way of example, an UUEK may include a partner-specific UUEK and/or a service provider-specific UUEK. The partner-specific UUEK may be correlated to a partner-specific exchange data object, whereas a service provider-specific UUEK may be correlated to a service provider-specific exchange data object, as described herein.

By way of example, an UUEK may be generated in accordance with a key format. The key format may include a plurality of characters including, for example, fifty characters or more that may be case sensitive. A first portion of the characters (e.g., the first six characters) may be reserved as a partition for identifying a recipient of the UUEK. The partition, for example, may include a partner partition, a service provider partition, and/or any other member partition. By way of example, an UUEK may be issued in response to a request from an authorized member, such as an affiliated partner and/or service provider.

In addition, or alternatively, at least one character (e.g., a seventh character) of the key format may identify a format of the UUEK. At least another character (e.g., an eighth character) may identify a type of UUEK. In some examples, a second portion of the characters may identify an exchange identifier (e.g., a group of twenty-two characters following the eighth character). A third portion of characters may be reserved (e.g., a group of twenty characters following the first portion of characters). An example representation is provided below:

pppppppFiGGGGGGGGGGGGGGGGGGGGGG-Grrrrrrrrrrrrrrrrrrrr where p represents a partition character, F represents a format character, i represents an identifier type character, G represents an exchange identifier, and r represents a reserved character. The key format allows for 9.8×10 to the 84 unique permutations, which is more than the number of atoms in the known observable universe. This enables the generation and distribution of new UUEKs on-demand without compromising the security of underlying data to which the UUEKs may be mapped, such as identifiers for a user, an instrument, and/or any other potentially sensitive information. The key formats described herein may include one or more different portions, each of which may be arranged in any order.

In some embodiments, the term "session identifier" refers to a unique identifier for identifying a series of related message exchanges between the exchange platform and an external platform.

In some embodiments, the term "matching code" refers to a session-unique identifier for authorizing an enrollment session between one or more entities. The matching code, for example, may include a sequence of numeric, alphanumeric, and/or the like characters that may be provided to multiple entities to ensure that each of the entities is involved in the same communication sequence. By way of example, a matching code may include a sequence of eight characters that may be generated by the exchange platform, provided to a service provider platform, and then received from a partner platform to ensure that the exchange platform, the service provider platform, and the partner platform are each interacting with the same end user (e.g., by comparing a received matching code to a generated matching code as described herein).

III. COMPUTER PROGRAM PRODUCTS, METHODS, AND COMPUTING ENTITIES

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of a data structure, apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams, flowchart illustrations, messaging flows, and other representations of data, operations, and messaging schemes. It should be understood that each block of the block, arrow, and/or the like of the diagrams, flowchart illustrations, etc. may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments may produce specifically-configured machines performing the steps or operations specified in the representations of the present disclosure. Accordingly, the representations of the present disclosure support various combinations of embodiments for performing the specified instructions, operations, or steps.

IV. EXAMPLE SYSTEM ARCHITECTURE

Figure 1:
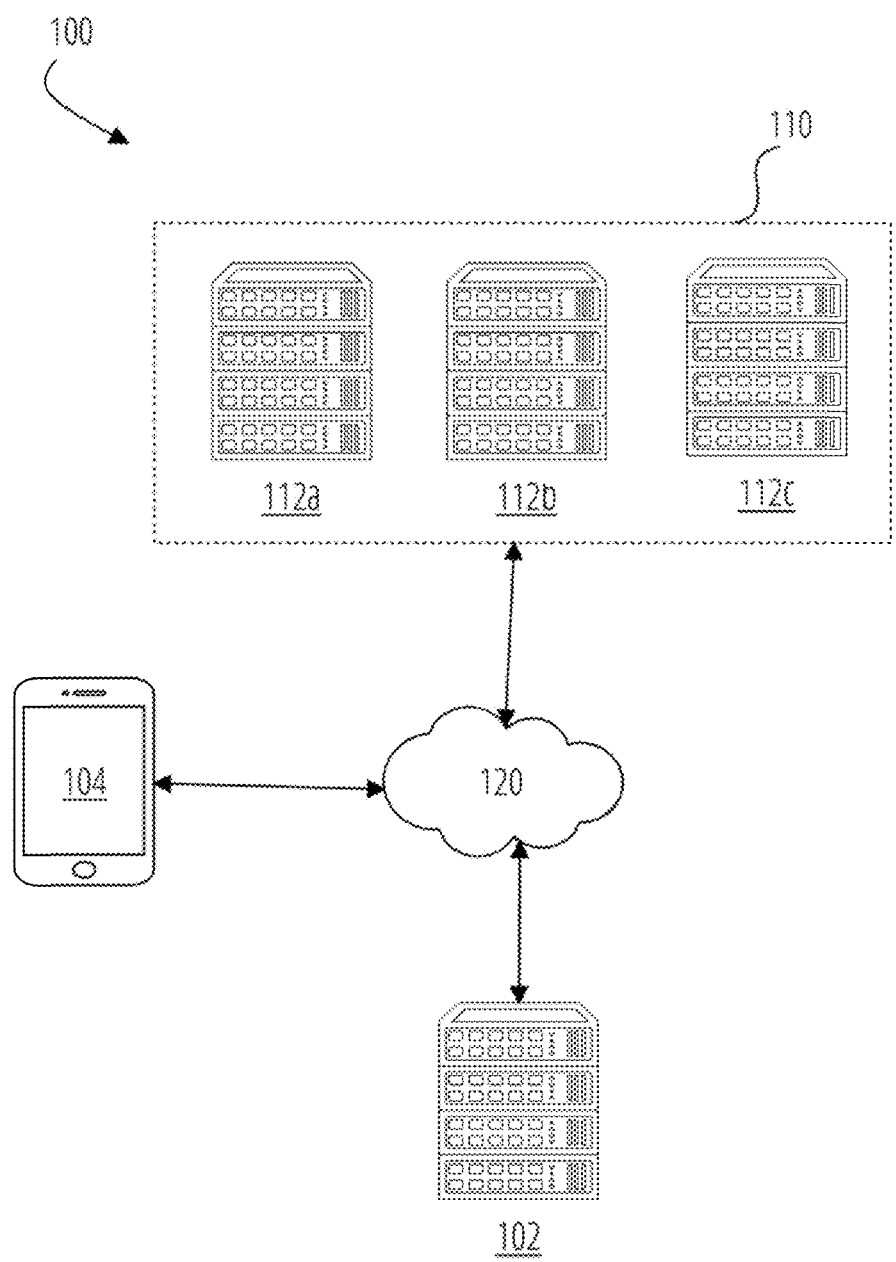
FIG. 1 is an example diagram of a computing ecosystem in accordance with one or more embodiments of the present disclosure.

FIG. 1 provides an illustration of a computing ecosystem 100 that may be used in conjunction with various embodiments of the present disclosure. As shown in FIG. 1, the architecture may include an exchange platform 102, one or more client devices 104, a network of member platforms 110, one or more networks 120, and/or the like. The network of member platforms 110 may include a first member platform 112a, a second member platform 112b, a third member platform 112c, and/or the like that are affiliated (e.g., registered, etc.) with the exchange platform 102. For example, as described herein, the network of member platforms 110 may include a partner platform and/or a service provider platform. In some examples, the partner platform may include a first member platform 112a and the service provider platform may include a second member platform 112b that is different from the first member platform 112a. In some examples, the partner platform and/or the service provider platform may include a single member platform (e.g., third member platform 112c). In some examples, the network of member platforms 110 may be configured for one or more different services.

Each of the components of the computing ecosystem 100 may be in electronic communication with, for example, one another over the same or different wireless or wired networks 120 including, for example, a wired or wireless Personal Area Network (PAN), Local Area Network (LAN), Metropolitan Area Network (MAN), Wide Area Network (WAN), or the like. The network 120, for example, may include any network connection including any type of network and/or across any geographic boundary (e.g., inter-country connections involving one or more sovereign entities, etc.). Additionally, while FIG. 1 illustrates certain systems as separate, standalone entities, the various embodiments are not limited to this particular architecture.

Although not explicitly illustrated, the exchange platform 102 may be a client device 104 and/or may be a part of the network of member platforms 110. In addition, or alternatively, the member platforms 112a-c may be a client device 104 and/or a part of the exchange platform 102. In some embodiments, each of the exchange platform 102 and/or the member platforms 112a-c may include the same computing platform.

a. Example Computing Platform

Figure 2:
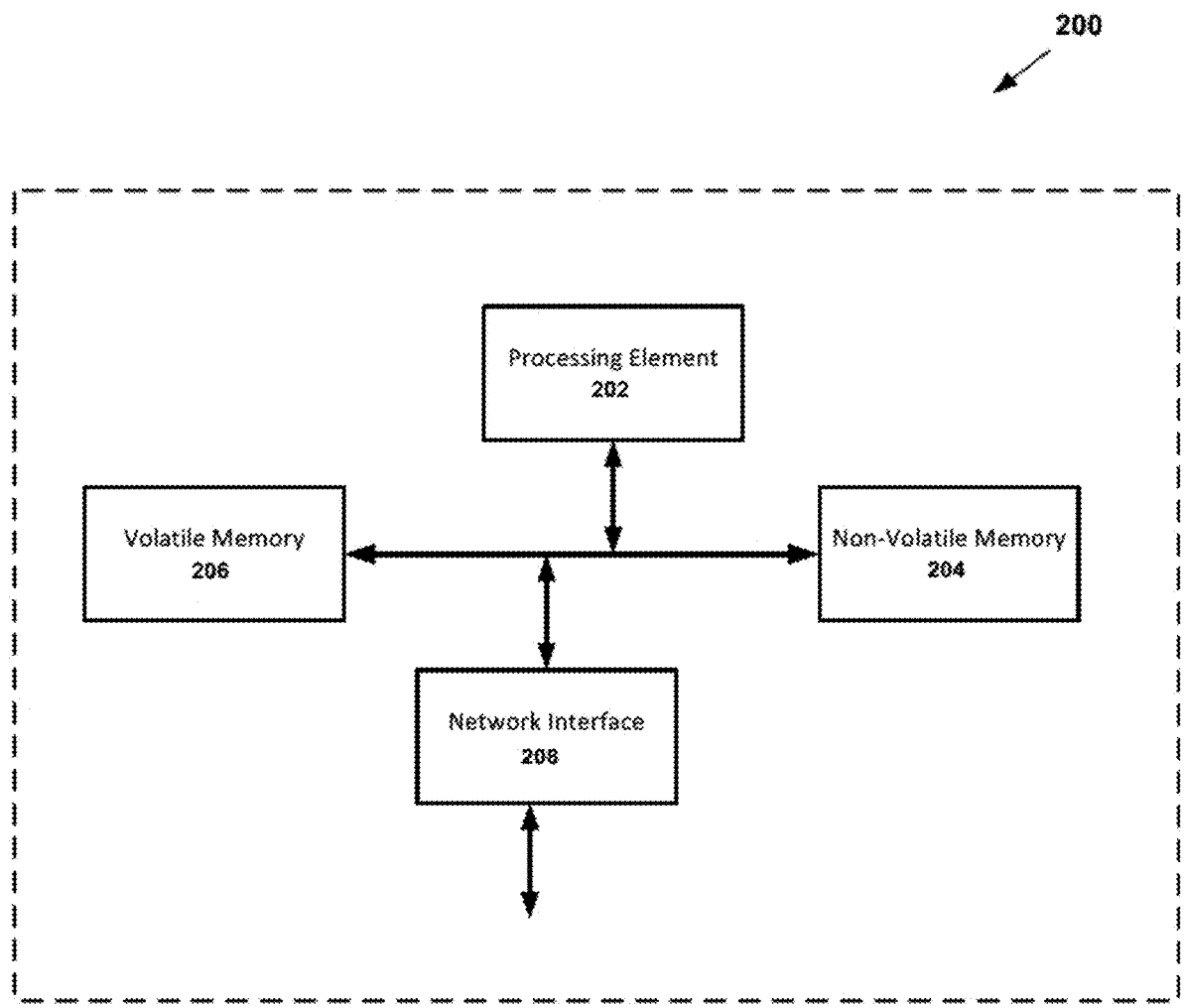
FIG. 2 is an example schematic of a computing platform in accordance with one or more embodiments of the present disclosure.

FIG. 2 is an example schematic of a computing platform 200 in accordance with one or more embodiments of the present disclosure. A computing platform 200, such as the exchange platform 102, the member platforms 112a-c, and/ or the like of FIG. 1, may include, or be in communication with, one or more processing elements 202 (also referred to as processors, processing circuitry, and/or similar terms used herein interchangeably) that communicate with other elements within the computing platform 200 via a bus, for example. As will be understood, the processing element 202 may be embodied in a number of different ways.

For example, the processing element 202 may be embodied as one or more complex programmable logic devices (CPLDs), microprocessors, multi-core processors, co-processing entities, application-specific instruction-set processors (ASIPs), microcontrollers, and/or controllers. Further, the processing element 202 may be embodied as one or more other processing devices or circuitry. The term circuitry may refer to an entirely hardware embodiment or a combination of hardware and computer program products. Thus, the processing element 202 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 202 may be configured for a particular use or configured to execute instructions stored in volatile or non-volatile media or otherwise accessible to the processing element 202. As such, whether configured by hardware or computer program products, or by a combination thereof, the processing element 202 may be capable of performing steps or operations according to embodiments of the present disclosure when configured accordingly.

In some embodiments, the computing platform 200 includes, or is in communication with, non-volatile memory 204 (also referred to as non-volatile storage, media, memory storage, memory circuitry, and/or similar terms used herein interchangeably). In some examples, the non-volatile memory 204 may include one or more non-volatile storage or memory media, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile memory 204 may store data, databases, database instances, database management systems, files, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity—relationship model, object model, document model, semantic model, graph model, and/or the like.

In some embodiments, the computing platform 200 includes, or is in communication with, volatile memory 206 (also referred to as volatile storage, media, memory storage, memory circuitry, and/or similar terms used herein interchangeably). In some examples, the volatile memory 206 may also include one or more volatile storage or memory media, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile memory 206 may be used to store at least portions of the databases, database instances, database management systems, data, applications, programs, program modules, scripts, source code, object code, byte code, compiled code, interpreted code, machine code, executable instructions, and/or the like being executed by, for example, the processing element 202. Thus, the databases, database instances, database management systems, data, applications, programs, program modules, scripts, source code, object code, byte code, compiled code, interpreted code, machine code, executable instructions, and/or the like may be used to control certain aspects of the step/operation of the computing platform 200 with the assistance of the processing element 202 and operating system.

As indicated, in one embodiment, the computing platform 200 may also include one or more network interfaces 208 for communicating with various computing entities (e.g., one or more components of FIG. 1), such as by communicating data, content, information, and/or similar terms used herein interchangeably that may be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing platform 200 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the computing platform 200 may include, or be in communication with, one or more input elements, such as a keyboard input, a mouse input, a touch screen/display input, motion input, movement input, audio input, pointing device input, joystick input, keypad input, and/or the like. The computing platform 200 may also include, or be in communication with, one or more output elements (not shown), such as audio output, video output, screen/display output, motion output, movement output, and/or the like.

As indicated, the computing platform 200 may be an example of one or more of the components of FIG. 1, such as the exchange platform 102 and/or the member platforms 112a-c.

b. Example Client Device

Figure 3:
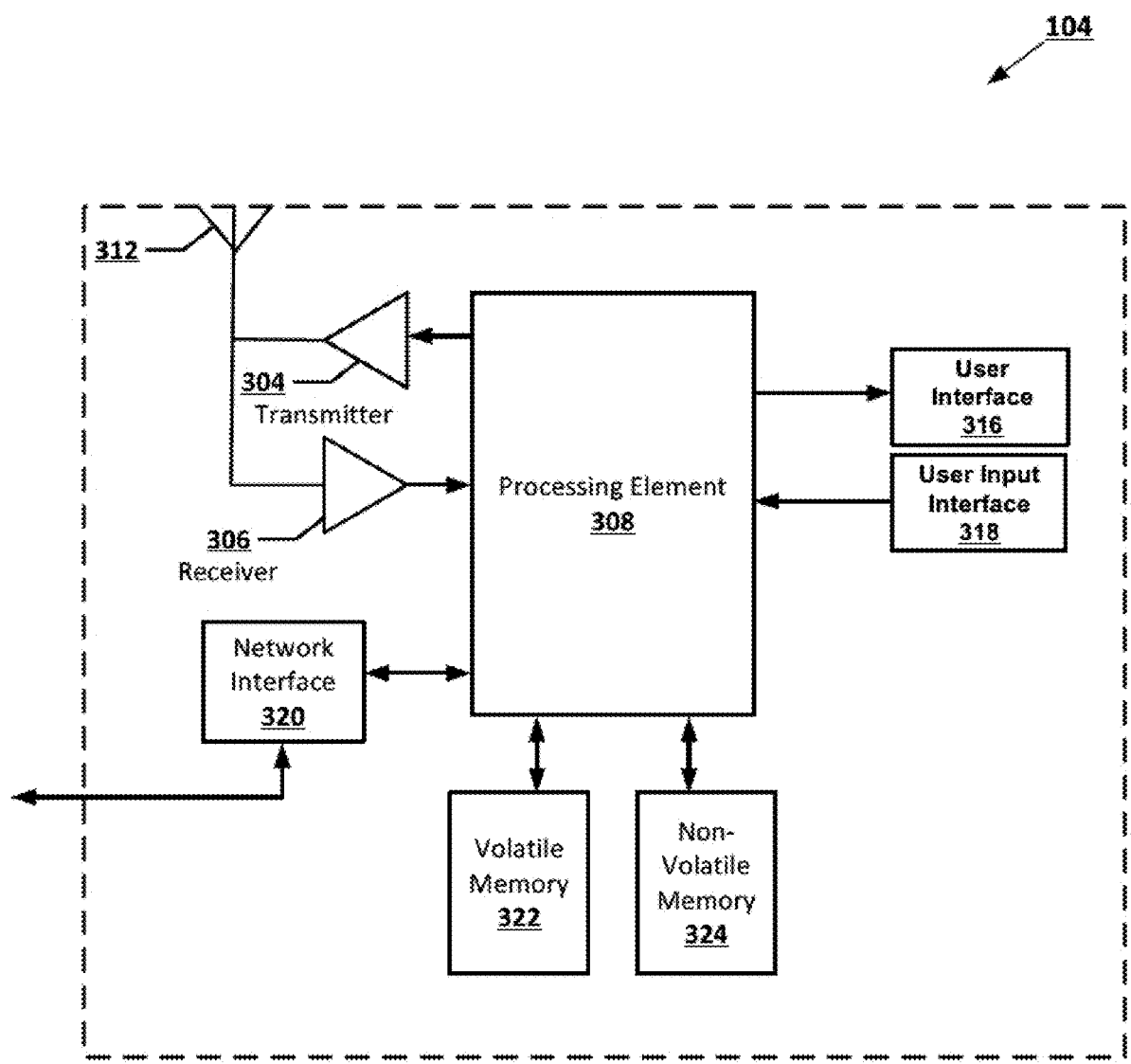
FIG. 3 is an example schematic of a client device in accordance with one or more embodiments of the present disclosure.

FIG. 3 is an example schematic of a client device 104 in accordance with one or more embodiments of the present disclosure. Client devices 104 may be operated by various entities, and an example computing ecosystem may include one or more client devices 104. For example, a client device 104 may be associated with, owned by, operated by, and/or the like by one or more end users. In various embodiments, an end user of a client device 104 may wish to engage in a value exchange between a partner and a service provider. As described herein, the user may do so by interacting leverage one or functionalities provided by an exchange platform through user input with the client device 104.

For example, a client device 104 may be a personal computing device, smartphone, tablet, laptop, personal digital assistant, and/or the like. In various embodiments, the computing platform 200 may communicate with and manage value exchanges for one or more client devices 104. As shown in FIG. 3, the client device 104 may include an antenna 312, a transmitter 304 (e.g., radio), a receiver 306 (e.g., radio), and a processing element 308 (e.g., CPLDs, microprocessors, multi-core processors, co-processing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information/data in accordance with air interface standards of applicable wireless systems. In this regard, the client device 104 may be capable of operating with one or more air interface standards, communication protocols, modulation types, and access types. More particularly, the client device 104 may operate in accordance with any of a number of wireless communication standards and protocols, such as those described above with regard to the computing platform 200. In a particular embodiment, the client device 104 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client device 104 may operate in accordance with multiple wired communication standards and protocols, such as those described above with regard to the computing platform 200 via a network interface 320.

Via these communication standards and protocols, the client device 104 may communicate with a computing platform 200 using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client device 104 may also download changes, add-ons, and updates, for instance, to its firmware, software (e.g., including executable instructions, applications, program modules), and operating system.

In some embodiments, the client device 104 includes location determining aspects, devices, modules, functionalities, and/or similar words used herein interchangeably. For example, the client device 104 may include outdoor positioning aspects, such as a location module adapted to acquire, for example, latitude, longitude, altitude, geocode, course, direction, heading, speed, universal time (UTC), date, and/or various other information/data. In one embodiment, the location module may acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data may be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data may be determined by triangulating the position of the client device 104 in connection with a variety of other systems, including cellular towers, Wi-Fi access points, and/or the like. Similarly, the client device 104 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects may be used in a variety of settings to determine the location of someone or something to within inches or centimeters.

In some embodiments, the client device 104 may include a user interface 316 (e.g., a display screen, a speaker, a tactile mechanization, etc. coupled to a processing element 308) and/or a user input interface 318 (e.g., a touch screen, a microphone, etc. coupled to a processing element 308). For example, the user interface 316 may be a present one or more application screens presented by one or more computing platforms described herein. The user input interface 318 may include any of a number of devices or interfaces allowing the client device 104 to receive data, such as a keypad (hard or soft), a touch display, voice/speech or motion interfaces, or other input device. In examples including a keypad, the keypad may include (or cause display of) the conventional numeric (0-9) and related keys (#, *), and other keys used for operating the client device 104 and may include a full set of alphabetic keys or set of keys that may be activated to provide a full set of alphanumeric keys. In addition to providing input, the user input interface may be used, for example, to activate or deactivate certain functions, such as screen savers and/or sleep modes.

The client device 104 may also include volatile memory 322 and/or non-volatile memory 324, which may be embedded and/or may be removable. For example, the non-volatile memory 324 may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory 322 may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory may store databases, database instances, database management systems, data, applications, programs, program modules, scripts, source code, object code, byte code, compiled code, interpreted code, machine code, executable instructions, and/or the like to implement the functions of the client device 104. As indicated, this may include a partner application, service provider application, and/or the like that is resident on the client device 104 and/or accessible through a browser or other user interface for communicating with a computing platform 200.

In some embodiments, the client device 104 may include one or more components or functionality that are the same or similar to those of a computing platform 200, as described in greater detail above. As will be recognized, these architectures and descriptions are provided for example purposes only and are not limited to the various embodiments.

In various embodiments, the client device 104 may be embodied as an artificial intelligence (AI) computing entity, such as an Amazon Echo, Amazon Echo Dot, Amazon Show, Google Home, and/or the like. Accordingly, the client device 104 may be configured to provide and/or receive information/data from an end user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

c. Example Networks

In some embodiments, any two or more of the illustrative components of the computing ecosystem 100 of FIG. 1 may be configured to communicate with one another via respective communicative couplings to one or more networks 120. The networks 120 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 120 may have any suitable communication range associated therewith and may include, for example, global networks (e.g., the Internet), MANs, WANs, LANs, or PANs. In addition, the networks 120 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

d. Example Value Exchange System

Figure 4:
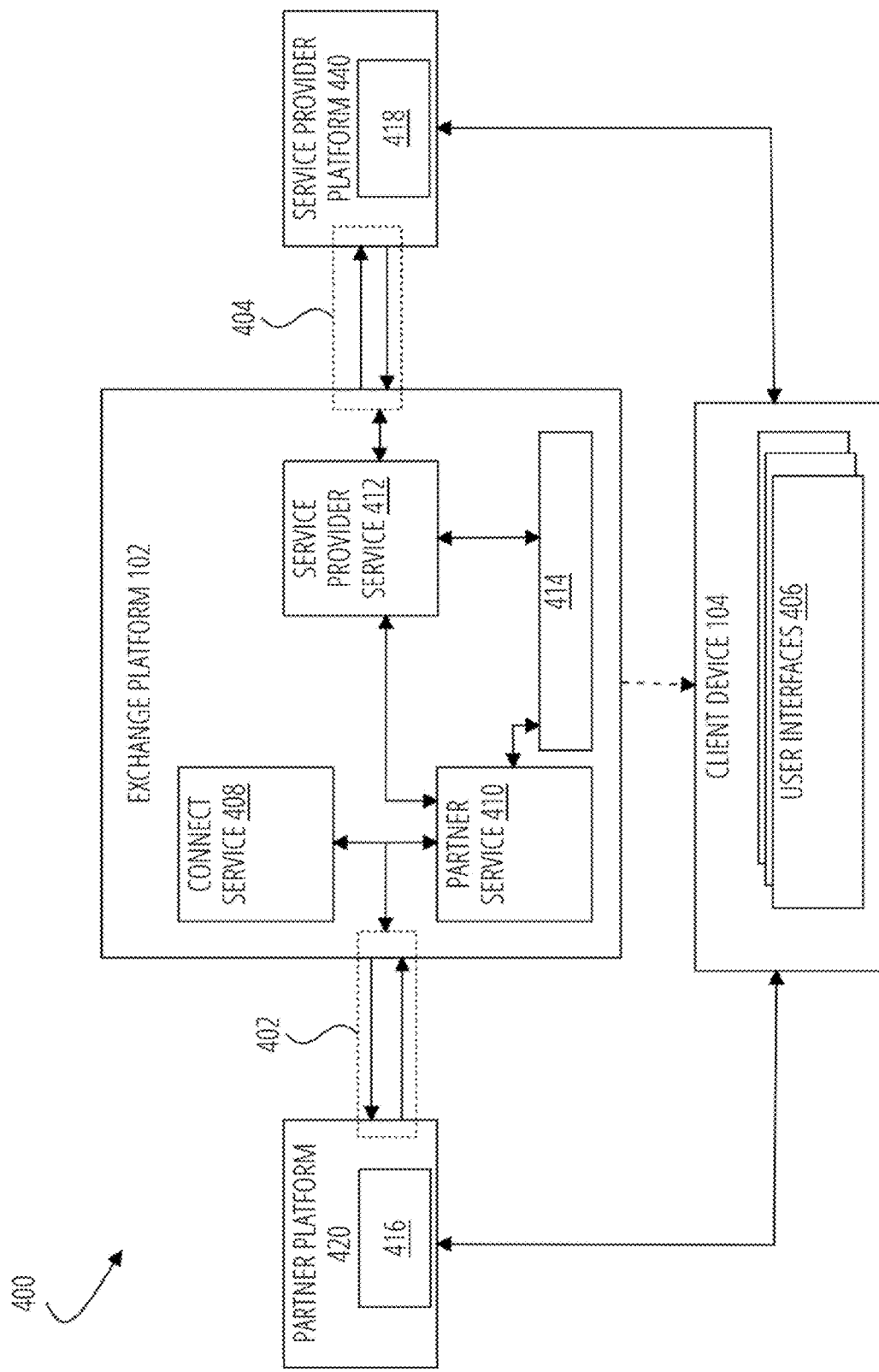
FIG. 4 is an example block diagram of an example credential-less value exchange system in accordance with one or more embodiments of the present disclosure.

FIG. 4 is an example block diagram of an example network-based exchange system 400 in accordance with one or more embodiments of the present disclosure. The network-based exchange system 400 includes a new computing ecosystem and computing platforms that provide an end-to-end value exchange solution to replace traditional exchange processing systems. As described herein, the network-based exchange system 400 may be value system agnostic and may be applied to any value-based exchange including, as examples, information-based exchanges, financial-based exchanges, reputation-based exchanges, healthcare-based exchanges, benefit-based exchanges, and/or the like. In any value system, the network-based exchange system 400 may leverage an intermediary entity and one or more defined communication interfaces to facilitate a network-based exchange between a value seeking entity (e.g., a partner) and a value providing entity (e.g., a service provider) that may be associated with one or more member platforms of the network-based exchange system 400.

As depicted, the network-based exchange system 400 may include an exchange platform 102, a partner platform 420, and/or a service provider platform 440 that may be configured to communicate through one or more exchange interfaces. The partner platform 420 and/or service provider platform 440 may include one or more member platforms 112a-c from the network of member platforms 110. For instance, the partner platform 420 and the service provider platform 440 may include a single member platform (e.g., member platform 112c). In addition, or alternatively, the partner platform 420 and the service provider platform 440 may include one or more different member platforms (e.g., member platforms 112a and 112b). In some examples, a user may interact with one or more of the platforms through a client device 104.

In some embodiments, the exchange platform 102 is a computing entity that is configured to facilitate a credential-less exchange of value for one or more members in a network. The exchange platform 102 may include one or more processing devices, memory devices, and/or the like that are physically and/or wirelessly coupled and configured to collectively (and/or individually) perform the one or more computing tasks for facilitating a value system agnostic exchange. In some examples, the exchange platform 102 may include, define, and/or otherwise leverage one or more exchange interfaces for facilitating communications (e.g., requests, responses, etc.) between a plurality of members. As described herein, the interfaces may be leveraged to facilitate a secure exchange between one or more members in any value system.

In some embodiments, the member is an entity that collaborates with the exchange platform 102 to take part in an exchange of value. As examples, a member may include (i) a partner that utilizes the exchange platform 102 to receive value, (ii) a service provider that utilizes the exchange platform 102 to provide value, and/or (iii) both a partner and a service provider. As used herein, a member may be referred to as a partner when it receives value through a value exchange and/or a service provider when it provides value through a value exchange. Thus, the same member may be a partner or a service provider depending on the role of the member in a value exchange. For example, a member may be a partner that receives value for a value exchange. The same member may be a service provider that provides value in another value exchange. In some examples, the same member may be both the partner and the service provider in the same value exchange, such that the member utilizes the exchange platform 102 to provide and then receive value in a sole member value exchange.

In some embodiments, a member is a partner when it utilizes a service provided by a service provider. A partner may include any value seeking entity in any value system. As an example, in a financial value system, a partner may include a merchant (e.g., retailer, brick-and-mortar establishment, etc.) that may utilize a service provider, such as a financial institution, to access funds for a financial transaction. In addition, or alternatively, in an information value system, a partner may include a news publisher (e.g., a newspaper, media organization, etc.) that may utilize a service provider, such as a news agency (e.g., wire service, news service, etc.) to access information for an information transaction. As will be understood, the techniques of the present disclosure may be applied to any value system and the partner may include any value seeker for any respective value system.

In some embodiments, a member is a service provider when it provides a service for a partner. A service provider may include a source of value in any value system. As an example, in a financial value system, a service provider may include a financial institution (e.g., bank, currency exchange, credit union, etc.) that may provide access to funds for a financial transaction between one or more entities. In addition, or alternatively, in an information value system, a service provider may include a news agency (e.g., wire service, news service, etc.) that may source information for publication by a news publisher. As will be understood, the techniques of the present disclosure may be applied to any value system and the service provider may include any source of value for any respective value system.

A service provider and a partner may communicate through one or more respective member platforms that are respectively associated with the entities. As one example, a service provider may be associated with a service provider platform 440 and a partner may be associated with a partner platform 420.

In some embodiments, a member platform is a computing entity corresponding to a member associated with the exchange platform 102. The member platform may include a partner platform 420 acting on behalf of a partner, a service provider platform 440 acting on behalf of a service provider, and/or both. In some examples, a member platform may be both a partner platform 420 and a service provider platform 440. For example, the same member platform may be configured to operate on behalf of a partner for one value exchange and a service provider for another value exchange. In some examples, the same member platform may be configured to operate on behalf of both a partner and service provider in a single value exchange. It is noted that the term member platform may refer to a partner platform 420, a service provider platform 440, or both and, in some examples, may depend on the role of the member platform in a value exchange (e.g., and/or one or more interfaces utilized by the member platform in the value exchange).

In some embodiments, the partner platform 420 is a computing entity that is configured to perform one or more operations on behalf of a partner. The partner platform 420, for example, may include one or more processing devices, memory devices, and/or the like that are physically and/or wirelessly coupled and configured to collectively (and/or individually) perform the one or more computing tasks for requesting value in a value system agnostic exchange. In some examples, the partner platform 420 may include, define, and/or otherwise leverage one or more exchange interfaces for facilitating communications (e.g., requests, responses, etc.) with the exchange platform 102. In some examples, the partner platform 420 may be configured to host one or more user-facing applications (e.g., a partner application, etc.) for interacting with one or more users.

The partner platform 420, for example in a financial value system, may host an online marketplace for the partner that allows a user to interact (e.g., search, browse, purchase, return, etc.) with one or more products or services offered by the partner. In the event of a product purchase, the partner platform 420 may cooperate with one or more service providers to access funds for the purchase. Traditionally, access to funds from a service provider is facilitated using a card number, account number, and/or another financial credential that may expose a user to malicious parties. To address network security and data privacy concerns with traditional financial systems (and/or other value-based systems), the partner platform 420 may register with the exchange platform 102 by configuring one or more software development kits (SDKs), APIs, and/or the like for facilitating communications with the exchange platform 102. For example, the partner platform 420 may include, define, and/or otherwise leverage one or more partner interface 402 for facilitating communications (e.g., requests, responses, etc.) with the exchange platform 102.

In some embodiments, the service provider platform 440 is a computing entity that is configured to perform one or more operations on behalf of a service provider. A service provider platform 440, for example, may include one or more processing devices, memory devices, and/or the like that are physically and/or wirelessly coupled and configured to collectively (and/or individually) perform the one or more computing tasks for providing value in a value system agnostic exchange. In some examples, a service provider platform 440 may include, implement, and/or otherwise leverage one or more interfaces for facilitating communications (e.g., requests, responses, etc.) with the exchange platform 102. In some examples, a service provider platform 440 may be configured to facilitate one or more service provider instruments. In some examples, the service provider platform 440 may be configured to host one or more user-facing applications (e.g., a service provider applications, etc.) for managing the one or more service provider instruments.

In some examples, the service provider platform 440, for example in a financial value system, may maintain one or more financial assets (e.g., lines of credit, bank accounts, etc.) that allow a user to fund a transaction for purchasing a product from a partner. In the event of a product purchase, the service provider platform 440 may cooperate with partner platform 420 to authorize a transaction and/or otherwise provide access to funds for the purchase. Traditionally, access to funds from the service provider is facilitated by presenting a card number, account number, and/or another financial credential to the service provider platform 440 which may expose a user, service provider, or partner to malicious parties, especially when provided over an unsecure network (e.g., public network, and/or the like). To address network security and data privacy concerns with traditional financial systems (and/or other value-based systems), the service provider platform 440 may register with the exchange platform 102 by configuring one or more software development kits (SDKs), APIs, and/or the like for facilitating communications with the exchange platform 102. For example, the service provider platform 440 may include, implement, and/or otherwise leverage one or more service provider interfaces 404 for facilitating communications (e.g., requests, responses, etc.) with the exchange platform 102.

As described herein, a service provider interface 404 may enable the exchange platform 102 to identify and request the use of a service provider instrument for facilitating a transaction. For example, the service provider platform 440 may be configured to facilitate one or more service provider instruments.

In some embodiments, a service provider instrument is a mechanism leveraged by a service provider for providing value (e.g., on behalf of a particular user, organization, etc.). The service provider instrument may depend on the value system and/or service provider. In some examples, the service provider instrument may include an account with the service provider. For example, in a financial value system, a service provider instrument may include a bank account (e.g., a checking, saving, etc.), brokerage account, line of credit, and/or the like. In an information value system, a benefits value system and/or the like, the service provider instrument may include a member account, and/or the like. In some examples, a service provider instrument may include a virtual instrument (e.g., virtual account, line of credit, etc.) hosted by a service provider platform 440. For instance, the service provider platform 440 may be configured to maintain a plurality of member instrument data objects indicative of a plurality of service provider instruments for a plurality of affiliated entities.

In some embodiments, the instrument data object is a data entity that represents a service provider instrument. The instrument data object may include one or more instrument identifiers and/or one or more instrument attributes. In some examples, the one or more instrument identifiers and/or one or more instrument attributes may be based on a type of instrument data object. By way of example, a service provider instrument may be represented in a member platform (e.g., the service provider platform 440) as a member instrument data object. In addition, or alternatively, the service provider instrument may be independently represented by a system instrument data object in an exchange platform 102. In some examples, the member instrument data object and the system instrument data object may include one or more of the same one or more instrument identifiers and/or one or more instrument attributes. By way of example, a member platform may register a plurality of service provider instruments with the exchange platform 102 (e.g., using a service provider interface 404). During registration, the member platform (e.g., service provider platform 440) may provide one or more of the instrument identifiers and/or instrument attributes and, in some examples, the exchange platform 102 may return another identifier.

In some embodiments, the member instrument data object is an internal representation of a service provider instrument within a member platform, such as the service provider platform 440. The member instrument data object may include one or more instrument identifiers, such as a member instrument identifier, an instrument key from the exchange platform 102, and/or a user identifier. The user identifier, for example, may include a member user identifier, as described herein. In addition, or alternatively, the member instrument data object may include one or more instrument attributes, such as an instrument type (e.g., credit-based instrument, debit-based instrument, information-based instrument, etc.), an instrument representation, and/or one or more contextual attributes. In some examples, the contextual attributes may depend on the value system. For instance, in a financial value system, the one or more contextual attributes may be indicative of a (i) currency associated with the service provider instrument, (ii) an asset availability (e.g., a balance, coverage, etc.) of the service provider instrument, (iii) one or more previous transactions with the service provider instrument, and/or the like.

In some embodiments, the system instrument data object is an external representation of a service provider instrument within the exchange platform 102. The system instrument data object may include one or more instrument identifiers, such as an instrument reference for a member platform, a system instrument identifier, and/or a user identifier. The user identifier, for example, may include a system user identifier, as described herein. In addition, or alternatively, the system instrument data object may include one or more instrument attributes, such as an instrument type (e.g., credit-based instrument, debit-based instrument, information-based instrument, etc.), an instrument representation, and/or one or more contextual attributes. In some examples, the contextual attributes may depend on the value system. For instance, in a financial value system, the one or more contextual attributes may be indicative of a currency associated with the service provider instrument.

In some examples, a member platform, such as the partner platform 420 and/or service provider platform 440, may be associated with a user-facing application for facilitating one or more interactions with a user and/or other affiliated entity (e.g., through the client device 104).

In some embodiments, the user-facing application is a computer program hosted by a computing entity for facilitating one or more user interactions. A user-facing application may include software (e.g., computer readable instructions, etc.) designed to perform one or more computing tasks for a computing entity, such as a member platform. For instance, a user-facing application may facilitate communication between a member and a user. As examples, the user-facing application may be configured to present one or more user interfaces 406 (e.g., via a client device 104) for interacting with a user on behalf of a member. In some examples, the user-facing application may be configured to receive user input (e.g., via the one or more user interfaces 406) to receive information from a user.

In some embodiments, a user-facing application is a partner application 416 that is hosted by the partner platform (e.g., a member platform acting as a partner for a particular exchange, etc.) to facilitate functions for a partner. A partner application may include software (e.g., computer readable instructions, etc.) designed to perform one or more computing tasks for a partner. In some examples, the partner application 416 may be configured with one or more devices (e.g., point of sale terminals, etc.) from a standalone partner establishment (e.g., a brick and mortar bank, etc.). For instance, a partner application 416 may be configured to present one or more user interfaces 406 for interacting (e.g., browsing, purchasing, reviewing, etc.) with one or more products offered by a retail-based partner, one or more units of information offered by an information-based partner, and/or the like. In some examples, the partner application 418 may be configured to receive user input (e.g., via one or more user interfaces 406) to receive information from a user.

In some embodiments, the service provider platform 440 is configured to host one or more service provider applications 418 for managing one or more service provider instruments. For example, a user-facing application may be a service provider application 418 that is hosted by the service provider platform 440 (e.g., a member platform acting as a service provider for a particular exchange, etc.) to facilitate functions for the service provider. In some examples, the service provider application 418 may be configured with one or more devices from a standalone service provider establishment (e.g., a brick and mortar bank, etc.). A service provider application 418 may include software (e.g., computer readable instructions, etc.) designed to perform one or more computing tasks for a service provider. For instance, a service provider application 418 may be configured to present one or more user interfaces for interacting (e.g., reviewing, managing, auditing, enrolling, etc.) with one or more service provider instruments facilitated by the service provider. By way of example, in a financial value system, the service provider application 418 may enable access to a bank account, brokerage account, line of credit, and/or the like, to manage funds, assets, and/or the like, handled by the respective accounts. In some examples, the service provider application 418 may be configured to receive user input (e.g., via the one or more user interfaces 406) to receive information, authorizations, and/or the like from a user.

In some embodiments, the exchange platform 102 facilitates communication between the partner platform 420 and the service provider platform 440 using one or more exchange interfaces.

In some embodiments, an exchange interface is a set of instructions for facilitating communications between the exchange platform 102 and one or more member platforms and/or internal services. An exchange interface may include an API, file based interface, a message queue based interface, and/or the like. For instance, an exchange interface may include an API including, as examples, one or more simple object access protocol (SOAP) APIs, one or more remote procedure call (RPC) APIs, one or more websocket APIs, one or more representational state transfer (REST) APIs, and/or the like. In some embodiments, an exchange interface may include one or more RPC APIs, such as one or more gRPC APIs.

The exchange platform 102 may include, define, and/or otherwise leverage one or more different exchange interfaces for facilitating communication with one or more external platforms, such as one or more member platforms (e.g., a partner platform 420, service provider platform 440, etc.). Each interface may include a plurality of communication instructions, message definitions, and/or the like for exchanging requests and/or responses between the exchange platform 102 and an entity that is taking part in a value exchange. By way of example, an exchange interface may include a partner interface 402 for facilitating communication with a partner platform 420 and/or a service provider interface 404 for facilitating communication with a service provider platform 440.

In some embodiments, the partner interface 402 is an exchange interface for facilitating one or more communications between a partner platform 420 and the exchange platform 102. The partner interface 402 may define one or more communication instructions, message definitions, and/or the like for facilitating one or more request messages and/or response messages between a partner platform 420 and the exchange platform 102. The partner interface 402, for example, may include an API that defines (i) requests to the exchange platform 102 from a computing entity acting as a partner platform 420 and/or (ii) requests from the exchange platform 102 to the partner platform 420. For example, the partner interface 402 may define one or more registration messages, session messages, transaction messages, and/or the like for facilitating an exchange of value for the partner. In some embodiments, the partner interface 402 defines one or more identifiers for securely identifying one or more portions of a value exchange.

In some embodiments, the service provider interface 404 is an exchange interface for facilitating one or more communications between a service provider platform 440 and the exchange platform 102. The service provider interface 404 may define one or more communication instructions, message definitions, and/or the like for facilitating one or more request messages and/or response messages between a service provider platform 440 and the exchange platform 102. The service provider interface 404, for example, may include an API that defines (i) requests to the exchange platform 102 from a computing entity acting as a service provider platform 440 and/or (ii) requests from the exchange platform 102 to the service provider platform 44-. The service provider interface 404, for example, may define one or more registration messages, session messages, transaction messages, and/or the like for facilitating an exchange of value using a service provider instrument. In some embodiments, the service provider interface 404 defines one or more identifiers for securely identifying one or more portions of a value exchange.

The exchange platform 102 may facilitate communications between a network of member platforms. The network of members, for example, may include a plurality of entities that have been onboarded with the exchange platform 102 by, for example, registering with the exchange platform 102, configuring a respective interface for communicating with the exchange platform 102, and/or the like. In some examples, the exchange platform 102 may execute one or more individual services for interacting with each onboarded entity. The individual services, for example, may include one or more partner services 410 and/or service provider services 412.

In some embodiments, the exchange platform 102 instantiates a separate partner-specific service, the partner service 410, for each of the network of members. In addition, or alternatively, for example in a multi-tenant environment, the partner service 410 may be instantiated for one or more partners from the network or members. The partner service 410 may be configured to execute one or more exchange operations for resolving exchange requests from a partner platform 420. In some embodiments, the exchange platform 102 instantiates a separate service provider-specific service, the service provider service 412, for each of the network of members. In addition, or alternatively, for example in a multi-tenant environment, the service provider service 412 may be instantiated for one or more service providers from the network or members. The service provider service 412 may be configured to execute one or more exchange operations for acquiring and resolving an exchange request from a partner platform 420. The exchange operations may include any of the steps and/or operations described herein.

In some embodiments, the partner service 410 and/or the service provider service 412 interact, through one or more local communication mechanisms, with each other and/or one or more other components of the exchange platform 102 to perform an exchange operation. For example, the exchange platform 102 may include a connect service 408 that is configured to establish, maintain, and verify a secure network session with a member platform, such as the partner platform 420. In some examples, the connect service 408 and/or partner service 410 may collaboratively operate to enroll a user (and/or a user's service provider instrument) with the exchange platform 102. In addition, or alternatively, the partner service 410 and/or service provider service 412 may collaboratively operate to enroll a user (and/or a user's service provider instrument) and/or facilitate a value exchange between the partner platform 420 and the service provider platform 440. In some examples, the connect service 408 may be a portion of the partner service 410.

Through the performance of one or more exchange operations, the partner service 410 and/or service provider service 412 may generate and leverage a plurality of non-traditional identifiers for referencing one or more aspects of a user, a service provider instrument, and/or a value exchange. At least some of these identifiers may include universally unique identifiers, such as a UUEK, that may be leveraged to provide a credential-less value exchange. Each identifier may be at least temporarily stored in a platform data vault 414. The platform data vault 414 may include any type of memory device as described herein. In some examples, each service and/or one or more sets of services may be associated with an individual portion of the platform data vault 414.

As described herein, one or more identifiers may by stored in associated with each other to form identifier mappings that may be leveraged by the exchange platform 102 (and/or one or more services thereof) to reference a user, service provider instrument, and/or any other aspect of a value exchange from communications between the partner platform 420, the service provider platform 440, and/or any other member platform without including user credentials.

An example of the non-traditional identifiers will now further be described with reference to FIG. 5.

e. Example Data Structures

Figure 5:
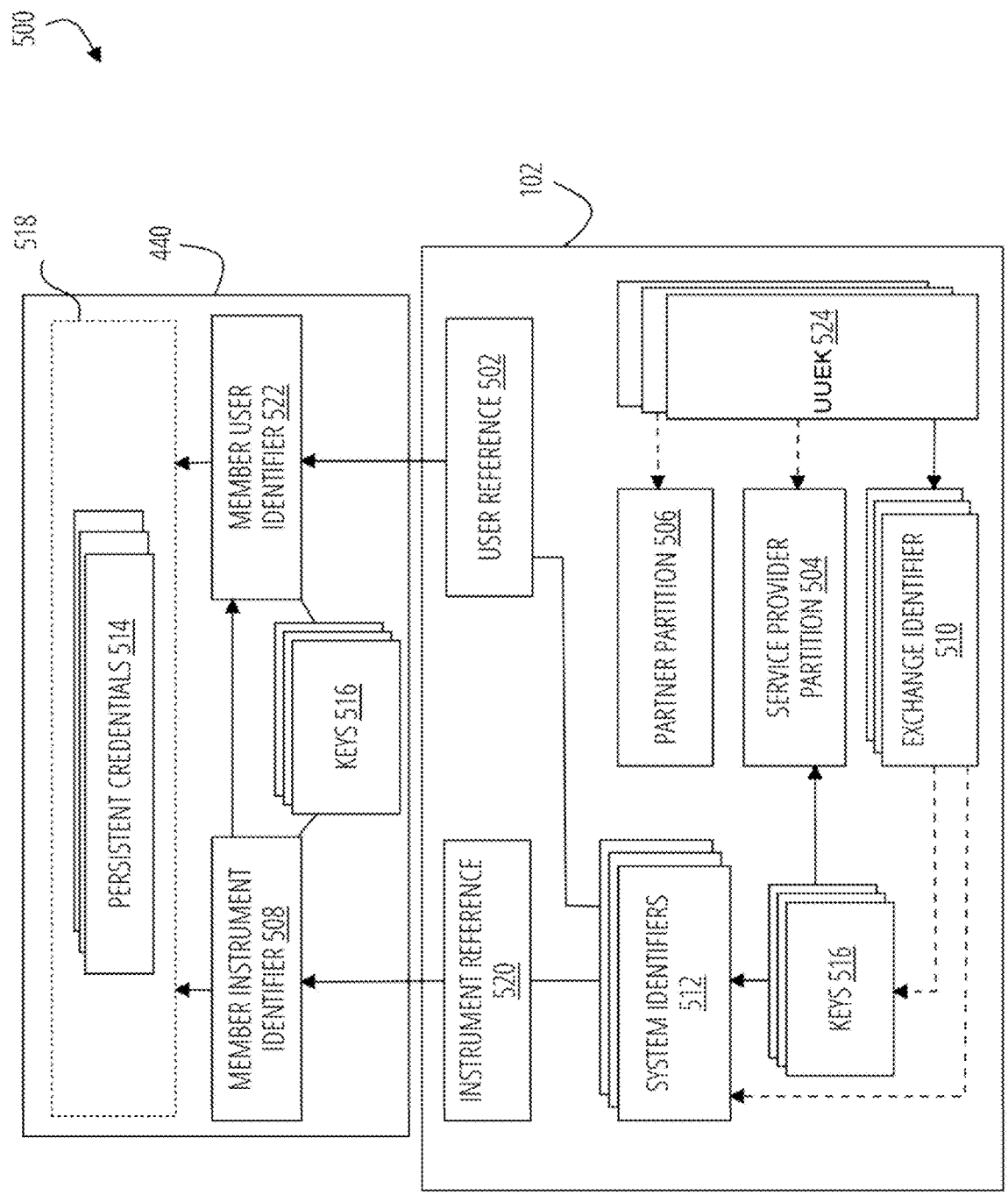
FIG. 5 is an example data diagram for facilitating a credential-less exchange of value in accordance with one or more embodiments of the present disclosure.

FIG. 5 is an example data diagram 500 for facilitating a credential-less exchange of value in accordance with one or more embodiments of the present disclosure. The data diagram 500 illustrates a plurality of related identifiers of different types. As depicted, each identifier may be associated with at least one related identifier to form identifier mappings within one or more platforms, such as the exchange platform 102 and/or a service provider platform 440. The identifier mappings empower communications between the exchange platform 102 and the service provider platform 440 that reference a service provider instrument 518 without exposing persistent credentials 514 (e.g., username, password, card number, etc.) associated with the service provider instrument 518 that are susceptible to fraud, misuse, and exploitation by malicious parties. As illustrated, using some of the techniques of the present disclosure, the persistent credentials 514 may never have to be communicated outside of a service provider platform 440. The data diagram 500 illustrates just some of the plurality of identifiers that may be generated, stored, and/or leveraged by the various embodiments of the present disclosure. It will be understood that the illustrated identifiers are not an exhaustive list and may include other, non-illustrated identifiers. Each of the identifiers may be labeled as an identifier, reference, key, and/or other similar terms. These terms are used herein interchangeably to refer to a unit of information for identifying data structures, entities, and/or any other component described herein.

As illustrated, some of the plurality of related identifiers in various embodiments of the present disclosure may include, as examples, (i) one or more user references 502 that may be mapped to member user identifiers 522 of the service provider platform 440, (ii) one or more service provider partitions 504 corresponding to a network of onboarded service provider platforms, such the service provider platform 440, (iii) one or more partner partitions 506 corresponding to a network of onboarded partner platforms, (iv) one or more instrument references 520 that may be mapped to member instrument identifiers 508 of the service provider platform 440, (v) one or more keys 516 and/or system identifiers 512 that may be associated with the user references 502 and/or instrument references 520, (vi) one or more exchange identifiers 510 that may be mapped to either the system identifiers 512 and/or the keys 516, and/or (vii) one or more UUEKs 524 that may be mapped to the exchange identifiers 510 and/or at least one of a partner partition 506 and/or the service provider partition 504.

In some examples, the service provider platform 440 may store one or more identifiers that may be mapped to a service provider instrument 518 and/or one or more identifier of the exchange platform 102 to enable the service provider platform 440 to reference a service provider instrument 518 based at least in part on identifiers that, by themselves, are not indicative of any aspect of the service provider instrument 518, including the persistent credentials 514 thereof.

By way of example, the service provider platform 440 may store, maintain, and/or otherwise access one or more keys 516 that map to (e.g., is a duplicate of, derivative of, etc.) one or more system identifiers 512 of the exchange platform 102. The keys 516, for example, may include the system identifiers 512 as a portion of the keys 516. The keys 516 may be mapped to member instrument identifiers 508 and/or member user identifiers 522 that may internally reference a user and/or service provider instrument 518 of the service provider platform. The keys 516, for example, may be provided during a registration process between the service provider platform 440 and/or the exchange platform 102.

As another example, the exchange platform 102 may store, maintain, and/or otherwise access one or more references, such as the instrument reference 520 and/or the user reference 502 that map to (e.g., is a duplicate of, derivative of, etc.) one or more member identifiers, such as the member instrument identifier 508 and/or the member user identifier 522 of the service provider platform 440. The references, for example, may be provided during a registration process between the service provider platform 440 and/or the exchange platform 102.

In some embodiments, the exchange platform 102 references each member platform of a network of member platforms using one or more entity partitions. In some embodiments, an entity partition is a unique identifier for a computing entity. An entity partition may include a unique number, alpha-numeric, and/or the like that represents a particular computing entity. An entity partition, for example, may include a member partition that represents a member platform, a service provider partition 504 that represents the service provider platform 440, a partner partition 506 that represents a partner platform 420, and/or the like.

In some embodiments, the service provider partition 504 is a unique identifier for a service provider and/or service provider platform 440 of a service provider. The service provider partition 504 may include a sequence of numeric, alpha-numeric, any/or any other characters or symbols that are representative of a service provider that is associated (e.g., onboarded, registered, etc.) with the exchange platform 102. The exchange platform 102, for example, may include a plurality of service provider partitions that respectively identify a service provider platform 440 that is affiliated with (e.g., onboarded with, registered with, etc.) the exchange platform 102. Each service provider partition 504 may represent a service provider platform 440 that has configured one or more exchange platform software development kits (SDKs), and/or like for implementing a service provider interface of the exchange platform 102.

In some embodiments, the partner partition 506 is a unique identifier for a partner and/or a partner platform of a partner. The partner partition 506 may include a sequence of numeric, alpha-numeric, any/or any other characters or symbols that are representative of a partner that is associated with the exchange platform 102. The exchange platform 102, for example, may include a plurality of partner partitions that respectively identify a partner platform that is affiliated with (e.g., onboarded with, registered with, etc.) the exchange platform 102. Each partner partition 506 may represent a partner platform that has configured one or more exchange SDKs, and/or the like for implementing a partner interface of the exchange platform 102.

In some embodiments, the entity partitions are generated to identify a member when the member platform is onboarded with the exchange platform 102. In some examples, after onboarding with the exchange platform, the member platforms may leverage one or more exchange interfaces to register one or more service provider instruments with the exchange platform 102. A service provider instrument 518 may be registered with the exchange platform 102 by exchanging one or more instrument identifiers with the exchange platform 102.

In some embodiments, an instrument identifier includes any representation of the service provider instrument 518 that identifies the service provider instrument without the exposing persistent credentials 514 of the service provider instrument 518. The instrument identifier may include a member instrument identifier 508, a system instrument identifier, an instrument reference 520, instrument key, and/or the like, as described herein.

In some embodiments, a member instrument identifier 508 is a unique identifier for representing a service provider instrument 518 within a member platform, such as the service provider platform 440. The member instrument identifier 508, for example, may include a sequence of numeric, alpha-numeric, any/or any other characters or symbols that represent a service provider instrument 518 to the service provider platform 440. In some examples, the member instrument identifier 508 may include a table identifier for a member instrument data object.

In some embodiments, the instrument reference 520 is a unique identifier for referencing a member instrument identifier 508. The instrument reference 520, for example, may be generated and/or provided by a member platform to the exchange platform 102 to allow the exchange platform 102 to reference the service provider instrument 518 maintained at the member platform. In some examples, the instrument reference 520 is the same value as the member instrument identifier 508. In some examples, the instrument reference 520 is a different value that is mapped to the member instrument identifier 508.

In some embodiments, a system instrument identifier is a unique identifier for representing a service provider instrument 518 within the exchange platform 102. The system instrument identifier, for example, may include a sequence of numeric, alpha-numeric, any/or any other characters or symbols that represent the service provider instrument 518 to the exchange platform 102 without exposing the persistent credentials 514 of the service provider instrument 518. In some examples, the system instrument identifier may include a UUID. In some examples, the system instrument identifier may include at least one of the system identifiers 512.

In some embodiments, the instrument key is a unique identifier for referencing a system instrument identifier. The instrument key, for example, may be generated and/or provided by the exchange platform 102 during a registration process of the service provider instrument 518 with the exchange platform 102. In some examples, the instrument key may include a wrapped system instrument identifier. For example, the instrument key may include a string of alpha-numeric characters that are formatted according to a key format established by the exchange platform 102 (and/or one or more APIs thereof). The key format may include any number of characters, such as fifty characters or more. In some examples, the characters may be case sensitive. A first portion of the characters (e.g., the first six characters) may be reserved as a partition for identifying an entity associated with the key. For an instrument key, for example, the partition may include the service provider partition 504. A second portion of the characters may identify the system instrument identifier. In some examples, the instrument key may include at least one of the keys 516. The key formats described herein may include one or more different portions, each of which may be arranged in any order.

In some embodiments, after onboarding with the exchange platform 102, a member platform may leverage one or more exchange interfaces to register one or more users with the exchange platform 102. A user may be registered with the exchange platform 102 by exchanging one or more user identifiers with the exchange platform 102. The user identifiers, for example, may be leveraged to generate, maintain, and/or update one or more user data objects reflective of a user of a member platform and/or the exchange platform 102.

In some embodiments, a user data object is a data entity that represents a user that interacts with a member platform and/or the exchange platform 102. A user, for example, may include an entity (e.g., person, organization, group, etc.) that engages in an exchange of value governed by the exchange platform 102. In some examples, the user may indirectly cooperate with the exchange platform 102 by creating a user account with a registered service provider, registering (and/or giving permission to register) a service provider instrument 518, and/or the like. In some examples, the exchange platform 102 may act on the user's behalf without the user directly engaging with the exchange platform 102. For example, the exchange platform 102 may act as a hidden intermediary between a user-facing application and a user's service provider instrument 518.

In some embodiments, a user data object includes one or more user identifiers and/or one or more user attributes. In some examples, the one or more user identifiers and/or one or more user attributes may be based on a type of user data object. By way of example, a user may be represented in a member platform as a member user data object. In addition, or alternatively, the user may be independently represented by a system user data object in an exchange platform. In some examples, the member user data object and the system user data object may include one or more of the same one or more user identifiers and/or user attributes. By way of example, a member platform may register a plurality of users with the exchange platform 102. During registration, the member platform may provide one or more of the user identifiers and/or user attributes and, in some examples, the exchange platform 102 may return another identifier.

In some embodiments, a member user data object is an internal representation of a user within a member platform, such as the service provider platform 440. The member instrument data object may include one or more user identifiers, such as a member user identifier 522, a user key from the exchange platform 102, and/or the like. In addition, or alternatively, the member user data object may include one or more user attributes. The one or more user attributes may be indicative of one or more contextual characteristics for a user. In some examples, the user attributes may be indicative of one or more identifiable characteristics for a user. By way of example, the user attributes may be indicative of a user's first name, last name, email, physical address (e.g., one or more of a street, locality, region, postal code, country, etc.), birthday (e.g., a birth date, an age band, etc.), phone number, and/or the like. In some examples, the user attributes may include encrypted, hashed, and/or otherwise secured representations of the identifiable characteristics for a user. For instance, the user attributes may include one or more hashed identifiers for the user and/or the like.

In some embodiments, the system user data object is an external representation of a member's user within the exchange platform 102. The system user data object may include one or more user identifiers, such as an user reference 502 for a member platform, a system user identifier, and/or the like. In addition, or alternatively, the system user data object may include one or more user attributes, such as those described herein. By way of example, a member platform may register a user with the exchange platform 102. During registration, the member platform may provide the user reference 502 for the user and/or the one or more user attributes. In some examples, the user attributes may include hashed and/or encrypted identifiers for the user.

In some embodiments, a user identifier includes a unique identifier for a user involved in a value-based exchange. A user identifier may include a sequence of numeric, alpha-numeric, any/or any other characters or symbols that are representative of a user of the exchange platform 102 and/or a member platform. In some examples, a user identifier may include a user reference 502, a user key, a system user identifier, a member user identifier, and/or the like.

In some embodiments, a system user identifier is a unique identifier for representing a user within the exchange platform 102. The system user identifier, for example, may include a sequence of numeric, alpha-numeric, any/or any other characters or symbols that represent a user to the exchange platform 102. In some examples, the system user identifier may include a UUID specific to a particular user. In some examples, the system user identifier may include at least one of the system identifiers 512.

In some embodiments, a member user identifier 522 is a unique identifier for representing a user within a member platform. The member user identifier, for example, may include a sequence of numeric, alpha-numeric, any/or any other characters or symbols that represent a user to the service provider platform 440.

In some embodiments, a user reference 502 may be a unique identifier for referencing a member user identifier 522. The user reference 502, for example, may be generated and/or provided by a member platform to an exchange platform 102 to allow the exchange platform 102 to reference a user associated with the member platform. In some examples, the user reference 502 is the same value as the member user identifier 522. In some examples, the user reference 502 is a different value that is mapped to the member user identifier 522.

In some embodiments, a user key is a unique identifier for referencing a system user identifier. The user key, for example, may be generated and/or provided by the exchange platform 102 during a registration process of a user with the exchange platform 102. In some examples, the user key may include a wrapped system user identifier. For example, the user key may include a string of alpha-numeric characters that are formatted according to a key format established by the exchange platform (and/or one or more APIs thereof). The key format, for example, may include a first portion of the characters (e.g., the first six characters) that may be reserved as a partition for identifying an entity (e.g., a member, etc.) associated with the key. For example, for a user key, the partition may include a service provider partition 504 and/or a partner partition. A second portion of the characters may identify the system user identifier.

As illustrated by FIG. 5, the keys 516, such as the user and instrument keys described herein, may be shared across the exchange platform 102 and the service provider platform 440. In addition, in some examples, references, such as the instrument reference 520 and user reference 502, may be shared across entities. These identifiers, and the mapping schemes described herein, allow the exchange platform 102 to reference a service provider instrument 518 without knowledge of persistent credentials 514 (e.g., card numbers, etc.) of the service provider instrument 518. As described herein, one or more of the keys 516 and/or references may be provided to the service provider platform 440 individually, or in any combination. In some examples, each of the keys 516 and the references may be provided to the service provider platform 440 in a redundant process that allows the service provider platform to verify that a communication is provided by the exchange platform 102 (e.g., an entity with access to the specific set of keys and references, etc.).

In some embodiments, persistent credentials 514 for a service provider instrument 518 include sensitive user and/or instrument credentials, such as a card number, account number, subscription number, and/or the like, that may expose a user, member, and/or intermediary entity to risk. The persistent credentials 514 may be generated, accessed, and/or otherwise provided by a service provider platform 440 to a user when a user applies for, is authorized for, and/or otherwise is enabled to open a new service provider instrument 518. Traditionally, persistent credentials 514 are then used by the user to initiate value exchanges using the service provider instrument. By doing so, the user is forced to expose sensitive credentials that are tied directly to the service provider instrument 518 each time the service provider instrument 518 is used. The keys 516, references, and identifier mapping scheme of the present disclosure overcome these technical deficiencies.

In some examples, each of the identifiers are interpretable to a computing platform, such as the exchange platform 102 and/or service provider platform 440, but not the user. To enable the user to select a service provider instrument 518 while maintaining the enhanced security features of the present disclosure, in some examples, the identifiers of FIG. 5 may be further enhanced with instrument representations.

In some embodiments, an instrument representation (not depicted by FIG. 5) is a unique identifier for representing a service provider instrument 518 to a user, without exposing the persistent credentials 514 of the service provider instrument 518. The instrument representation, for example, may include a sequence of numeric, alpha-numeric, any/or any other characters or symbols that are outwardly representative of a service provider instrument 518 only to entities with previous knowledge of service provider instrument 518. The format and/or value of an instrument representation may be based at least in part on the type of service provider and/or service provider instrument 518. For instance, in a financial value system, an instrument representation may include a portion (e.g., the last four digits, etc.) of the persistent credentials 514, such as a card number (e.g., debit card, credit card, etc.), a financial account number, and/or the like. As another example, in an information value system, an instrument representation may include a portion (e.g., one or more digits, alpha-numeric characters, etc.) of persistent credentials 514, such as a subscription account, and/or the like. For instance, the instrument representation may include a derivative of persistent credentials 514 that may only allow entities with prior knowledge of the persistent credentials 514 to identify the persistent credentials 514 using the instrument representation. As another example, the instrument representation may include an instrument nickname that is assigned by and thereafter recognized by a user.

In some embodiments, the instrument representation may be provided (e.g., during a registration process) the exchange platform 102 in place of the persistent credentials 514. In this manner, the exchange platform 102 may represent the service provider instrument 518 using the instrument representation without knowledge of the persistent credentials 514 from which the instrument representation may be derived. For example, unlike traditional network-based exchange platforms, the exchange platform 102 may not require the persistent credentials 514 corresponding to a service provider instrument 518 to implement various computing tasks of the present disclosure. This, in turn, allows the exchange platform 102 to operate more flexibly, while storing previously unrecorded contextual data, lowering operational computing costs, and improving user and platform safeguards from infiltration attacks by malicious computing entities.

In some embodiments, the identifier mapping scheme is supplemented by unique ephemeral keys that are issued to member platforms to facilitate secure, real time value exchanges. For example, the exchange platform 102 may facilitate additional layers of network and data security by implementing exchange identifiers 510 for representing aspects of a value-based exchange. Some examples of exchange identifiers 510 may include a service provider-specific exchange identifier and/or the partner-specific exchange identifier. A service provider-specific exchange identifier may include an ephemeral, unique exchange identifier that temporarily represents the service provider instrument 518 and the service provider platform 440. The service provider-specific exchange identifier, for example, may be mapped to the system identifiers 512 for the service provider instrument 518. A partner-specific exchange identifier may include an ephemeral, unique exchange identifier that temporarily represents the service provider instrument 518 and a partner platform. The partner-specific exchange identifier, for example, may be mapped to the keys 516 for the service provider instrument 518 which may be used to identify the service provider platform 440. In some examples, such mapping may be defined by exchange data objects.

In some embodiments, an exchange data object is a data entity that represents an authorized value exchange between one or more members associated with the exchange platform 102. In some examples, the exchange data object may include one or more identifiers and/or one or more exchange attributes. For example, the one or more identifiers and/or one or more exchange attributes may be based on a type of exchange data object. By way of example, an exchange may be represented in a member platform as a member exchange data object. In addition, or alternatively, the exchange may be independently represented by a system exchange data object in the exchange platform 102. In some examples, the member exchange data object and the system exchange data object may include one or more of the same one or more identifiers and/or exchange attributes. By way of example, using some of the techniques of the present disclosure, the exchange platform 102 may issue one or more unique identifiers to a member platform that may be used to authorize a value exchange.

In some embodiments, the system exchange data object is an internal representation of a value exchange that is intermediated using the exchange platform 102. In some examples, the system exchange data object may include one or more different identifiers and/or exchange attributes depending on the role of the system exchange data object in a value-based exchange.

For example, a system exchange data object may include a service provider-specific exchange data object that corresponds to the service provider platform 440. The service provider-specific exchange data object may include one or more identifiers, such as an exchange identifier 510, system identifiers 512, such as the system user identifier and/or the system instrument identifier, an UUEK 524, and/or the like. In addition, or alternatively, the service provider-specific exchange data object may include one or more exchange attributes, such as an expiration date, a currency (e.g., for a financial value system, etc.), and/or the like.

In addition, or alternatively, the system exchange data object may include a partner-specific exchange data object that corresponds to a partner platform. The partner-specific exchange data object may include one or more identifiers, such as an exchange identifier 510, one or more keys 516, such as an instrument key, an UUEK 524, a member instrument reference (e.g., a partner-specific instrument reference, etc.), and/or the like. In addition, or alternatively, the partner-specific exchange data object may include one or more exchange attributes, such as an expiration date, a currency (e.g., for a financial value system, etc.), an instrument type, and/or the like.

In some embodiments, a member exchange data object is an external representation of a value exchange that is intermediated using the exchange platform 102. The member exchange data object may include one or more identifiers, such as a member exchange identifier, a member instrument identifier 508, an UUEK 524 from the exchange platform 102, and/or the like.

In some embodiments, an exchange identifier 510 is a unique identifier for an exchange of value using the exchange platform 102. The exchange identifier 510 may include a sequence of numeric, alpha-numeric, any/or any other characters or symbols that are representative of at least a user and/or a service provider instrument 518. In some examples, the exchange identifier 510 may include a universally unique identifier (UUID) that may be mapped (e.g., through a series of identifiers, etc.) to a user, a service provider instrument 518, and/or a member registered with the exchange platform 102. In some examples, the exchange identifier 510 may be generated using one or more UUID generators. For instance, the exchange identifier 510 may include sixteen bytes of information generated in accordance with one or more UUID formatting standards, such as UUID v4, and/or the like. Therefore, while the exchange identifier 510 may be leveraged by the exchange platform 102 and/or a member platform for one or more functions, the same exchange identifier 510 will be useless to external parties without a prior association between the exchange identifier 510 and one or more other identifiers. In addition to the prior identifier associations, the exchange identifier 510 may be associated with the exchange platform 102. Thus, even if the exchange identifier 510 is identified by an adverse party, the adverse party would still be required to impersonate the exchange platform 102 in order to use the exchange identifier 510. Moreover, the adverse party would need to update settlement accounts to accounts owned by the adverse party, among a number of other tasks before the exchange identifier 510 may be used adversely. Each of these tasks increase the amount of work necessary to overcome the layers of enhanced security added by the exchange identifier 510. When paired with the ephemeral nature of the exchange identifier 510, these tasks may become prohibitively expensive.

In some examples, the exchange identifier 510 may be externally represented by a UUEK 524. By way of example, to facilitate credential-less exchanges, the exchange platform 102 may issue one or more UUEKs 524 to one or more member platforms. As described herein, the UUEKs 524 may eliminate the reliance on traditional, persistent credentials 514 by identifying aspects of a value exchange through previously mapped data entities.

In some embodiments, a UUEK 524 is an external representation of an exchange identifier 510 that may be issued (e.g., in place of the exchange identifier 510) to an external entity, such as a user, partner platform, and/or service provider platform, and/or the like, to initiate a value-based exchange using the exchange platform 102. To do so, the UUEK 524 may be generated and issued by the exchange platform 102 to the external entity. Each UUEK 524 may include a plurality of values (e.g., up to fifty characters and/or more that may or may not be case sensitive) that represent one or more aspects of a value-based exchange. For example, the plurality of values may be indicative of an exchange identifier 510, a partition (e.g., identifying the recipient of the UUEK 524, etc.), an identifier type, and/or one or more flags. By way of example, an UUEK 524 may include a partner-specific UUEK and/or a service provider-specific UUEK. The partner-specific UUEK may be correlated to a partner-specific exchange data object and may include a partner partition 506, whereas a service provider-specific UUEK may be correlated to a service provider-specific exchange data object and may include a service provider partition 504, as described herein By way of example, an UUEK 524 may be generated in accordance with a key format. The key format may include a plurality of characters including, for example, fifty characters or more that may or may not be case sensitive. A first portion of the characters (e.g., the first six characters) may be reserved as a partition for identifying a recipient of the UUEK 524. The partition, for example, may include a partner partition 506, a service provider partition 504, and/or any other member partition. By way of example, an UUEK 524 may be issued in response to a request from an authorized member, such as an affiliated partner and/or service provider.

In addition, or alternatively, at least one character (e.g., a seventh character) of the key format may identify a format of the UUEK 524. At least another character (e.g., an eighth character) may identify a type of UUEK 524. In some examples, a second portion of the characters may identify an exchange identifier 510 (e.g., a group of twenty-two characters following the eighth character). A third portion of characters may be reserved (e.g., a group of twenty characters following the first portion of characters). An example representation is provided below:

pppppppFiGGGGGGGGGGGGGGGGGGGGGG-
Grrrrrrrrrrrrrrrrrr where p represents partition characters, F represents a format character, i represents an identifier type character, G represents the exchange identifier 510, and r represents reserved characters. The key format allows for 9.8×10 to the 84 unique permutations, which is more than the number of atoms in the known observable universe. This enables the generation and distribution of new UUEKs 524 on-demand without compromising the security of underlying data to which the UUEKs 524 may be mapped, such as identifiers for a user, an instrument, and/or any other potentially sensitive information.

As described herein, the unique sequences of identifiers and mapping schemes between the identifiers may facilitate a credential-less value exchange system for enrolled and/or unenrolled entities. In some examples, one or more of the identifiers may be generated through a registration or enrollment process configured to establish a cross-entity relationship between a user, partner, and service provider entities. An example process for establishing a cross-entity relationship will now further be described with reference to FIGS. 6A-C.

V. EXAMPLE SYSTEM OPERATIONS

FIGS. 6A-C provide process flows for establishing a cross-entity relationship in accordance with one or more embodiments of the present disclosure. The process flows illustrate one or more stages of an enrollment process 600 for enrolling a user and/or a service provider instrument with an exchange platform to facilitate a credential-less value exchange between a partner platform and a service provider platform. FIGS. 6A-C illustrate an example process 600 for explanatory purposes. Although the example process 600 depicts a particular sequence of steps/operations, the sequence may be altered without departing from the scope of the present disclosure. For example, some of the steps/operations depicted may be performed in parallel or in a different sequence that does not materially impact the function of the process 600. In other examples, different components of an example device or system that implements the process 600 may perform functions at substantially the same time or in a specific sequence.

Various embodiments of the process 600 address technical challenges related to the data security and efficiency of network-based exchanges in a value exchange between one or more computing entities. Traditional systems address these challenges using enrollment mechanisms that require a user to expose sensitive and persistent credentials to a third-party enrollment service. These traditional enrollment services then validate a user's account ownership and provide the persistent credentials to a partner platform for storage and subsequent processing. By doing so, user credentials are transmitted and exposed to multiple different entities during the course of traditional enrollment processes ultimately increasing the risk of exposure to malicious parties during and after network communications. Various embodiments of the process 600 provide improved network communication, data encryption, and data management techniques for enabling a credential-less exchange enrollment capability that reduces the data security risks imposed by traditional processes.

One or more embodiments of the process 600 may be implemented by one or more computing devices, entities, and/or systems described herein. For example, via the various steps/operations of the process 600, the exchange platform 102 may leverage the credential-less enrollment techniques to overcome the various limitations with traditional enrollment mechanisms by enrolling a service provider instrument with a partner platform without access to persistent credentials of the service provider instrument. By doing so, sensitive information underlying a service provider instrument for engaging in a value exchange is never exposed to potentially malicious parties or a partner platform that may be susceptible to network-based attacks. For instance, unlike traditional techniques the exchange platform 102 never receives identifiable or operable account information for the user, whereas a service provider that manages the account is engaged in the enrollment process rather than being disintermediated by a potentially insecure enrollment service. This, in turn, removes the need to implement resource data governance standards across each device involved in an enrollment process, ultimately resulting in improved computing resource utilization, while enhancing network and data security.

FIG. 6A is a flowchart showing an example of a first stage of an enrollment process 600 for enrolling a user with an exchange platform without exposing persistent credentials associated with the user and/or a service provider instrument. The flowchart depicts communication techniques to overcome various limitations of traditional enrollment systems by circumventing traditional systems' reliance on sensitive and persistent credentials. The communication techniques may be implemented by one or more computing devices, entities, and/or systems described herein, such as the exchange platform to establish a secure communication session with a user through a partner application.

In some embodiments, the process 600 includes, at step/operation 602, establishing an enrollment session for a user and a partner platform. For example, the enrollment process 600 may begin on a partner application (e.g., a partner website, user application, etc.) at which point the partner platform may allow a user to enroll a partner account on the partner application with the exchange platform to facilitate access to a service provider instrument. The partner platform may enable the enrollment of the user by initiating an enrollment session with the exchange platform.

For example, a user may access the partner application through a portal, such as a browser, web application, and/or the like, via a client device, as described herein. The user's browser, web application, mobile application, and/or the like may fetch a platform connect widget from the content delivery network (CDN) and issue a communication session request to the partner platform to establish the enrollment session. In response to the request, the partner platform may generate (e.g., using one or more exchange interfaces, etc.) a communication session request for the exchange platform (e.g., a partner service thereof). The communication session request may include an API request, provided through the partner interface, to initiate an enrollment widget for establishing an enrollment session for the user.

In some embodiments, the communication session request includes one or more enrollment attributes, such as user data, user identifiers, user hashes, time stamps, device identifiers, partner identifiers, and/or the like. As described herein, some techniques of the present disclosure enable a computing entity to identify a service provider instrument using identifiers without including persistent credentials of the service provider instrument with the communication session request. For instance, the partner platform may be configured to obtain user data for the user (e.g., through user input to a user interface screen, pre-recorded data from a partner account, etc.) and provide the user data to the exchange platform to begin the enrollment process. In some examples, the user data may be provided by the partner platform (e.g., through one or more API calls of the partner interface, etc.) with the communication session request to the exchange platform (e.g., a partner service thereof) to initialize a widget session. In some examples, the user data may be encrypted, hashed, and/or the like before transmission to the exchange platform. In some examples, the user data may include one or more user attributes as described herein.

In some embodiments, the exchange platform (e.g., a partner service thereof) receives, using the partner interface, the communication session request to initialize the enrollment session at the client device of the user. In some examples, the communication session request may include user data for the user. In addition, or alternatively, the enrollment initialization request may include one or more user attributes for the user. In some examples, the user attributes may be encrypted and/or hashed as described herein.

In some embodiments, the process 600 includes, at step/operation 604, setting user and partner data. For example, the exchange platform (e.g., the connect service, partner service, etc. thereof) may identify and/or generate user and/or partner data from the data provided in the communication session request. In some examples, the user data may include one or more user attributes. In some examples, the user data may include one or more encrypted and/or hashed user attributes. In some examples, the partner data may include a shared identifier between the exchange platform and the partner platform, such as a partner partition as described herein.

In some embodiments, the process 600 includes, at step/operation 606, generating a session identifier for the enrollment session. For example, the exchange platform (e.g., a connect service, partner service, etc. thereof) may generate a session identifier for a communication session between a partner platform and the exchange platform to track communications exchanged during the enrollment session. The session identifier, for example, may include a unique number, string of characters, and/or the like for authenticating messages exchanged during the course of an enrollment session. The exchange platform may utilize a connect service and/or the partner service to establish the enrollment session. For example, in response to the enrollment initialization request, a partner service may call another service, such as the connect service, to establish a communication session that may be used by a client-side widget to provide an interface between a user and the partner service to complete a user enrollment. The connect service may generate the session identifier and return the session identifier to the partner service. The partner service may return the session identifier to the partner platform, which may utilize the session identifier to initialize a client-side widget through an instance of the partner application on a client device. Once the partner application receives the session identifier, the partner application may start up (e.g., execute, initialize, etc.) the client-side widget. The user may then interact with the widget to complete the enrollment process 600.

In some embodiments, the process 600 includes, at step/operation 608, determining and providing a member list for the user. The member list may be a service provider list. For example, the exchange platform (e.g., the connect service, partner service, etc. thereof) may determine the service provider list for the user from a network of service providers that are affiliated with (e.g., registered with, etc.) the exchange platform. In some examples, the service provider list may include each service provider platform affiliated with the exchange platform. In addition, or alternatively, the service provider list may include a subset of the affiliated service provider platforms that is tailored to the user.

For example, the exchange platform may determine one or more service provider platforms based at least in part on the user attributes for the enrollment session and tailor the service provider list to the one or more service provider platforms. By way of example, the exchange platform may include a plurality of system user data objects and/or system instrument data objects, as described herein. In some examples, the exchange platform may identify one or more system user data objects corresponding to the user based on the user attributes. In some examples, each system user data object may identify a service provider platform affiliated with the user. In this manner, the exchange platform may determine one or more service providers affiliated with the user based on the one or more system user data objects.

In addition, or alternatively, the exchange platform (e.g., one or more service provider services thereof) may provide a presence request for user presence data (e.g., via a service provider interface) from each of the service provider platforms in the network of member platforms. The user presence request may include one or more user attributes (e.g., encrypted attributes, hashed attributes, etc.) for the user that may be leveraged by the service provider platforms to determine whether a user has an instrument with the service provider platforms. In response to the request, the exchange platform (e.g., one or more service provider services thereof) may receive presence data from one or more of the service provider platforms that is indicative of the presence of an instrument with the respective service provider platforms. The exchange platform (e.g., partner service thereof) may determine the one or more service providers based at least in part on the presence data.

In some examples, the exchange platform (e.g., the connect service, partner service, etc. thereof) may initiate, using the partner interface and via an enrollment user interface provided by a partner application, the presentation of a pre-enrollment screen based at least in part on the one or more service providers. The client device, for example, may be configured to access a partner application that is hosted by the partner platform. The enrollment user interface may be presented to the user on the client device through a widget within the partner application. The widget can be internally defined by the partner or can be provided by the exchange platform. The pre-enrollment screen may present a plurality of selectable icons indicative of the service provider list.

Next, the enrollment process 600 may proceed to a second stage, in which an instrument identifier corresponding to the user is identified through interactions between the exchange platform, the user, and the service provider platform, as described in further detail with reference to FIG. 6B.

Referring now to FIG. 6B, FIG. 6B is a flowchart showing an example of a second stage of an enrollment process 600 for enrolling a service provider instrument with a partner platform without exposing persistent credentials associated with the user and/or a service provider instrument. The flowchart depicts communication techniques to overcome various limitations of traditional enrollment systems by circumventing traditional systems' reliance on persistent credentials, such as a card number, and/or the like, provided by a user. The communication techniques may be implemented by one or more computing devices, entities, and/or systems described herein, such as the exchange platform to establish a connection between a user, a partner platform, and a service provider instrument.

In some embodiments, the process 600 includes, at step/operation 610, determining and providing a service provider instrument list for a user. The service provider instrument list may be determined based at least in part on a selection of a service provider from the pre-enrollment screen. For instance, in some examples, the exchange platform (e.g., the connect service, partner service, etc. thereof) may receive, using the partner interface, pre-selection data indicative of a selection of a particular service provider from the one or more service providers presented by the pre-enrollment screen. For instance, the widget may receive the pre-selection data from the partner application and provide an instrument registration request (e.g., via the partner interface) to the exchange platform (e.g., the connect service, partner service, etc. thereof). The instrument registration request may include the session identifier and/or a service provider identifier indicative of a selected service provider.

Responsive to the request, the exchange platform (e.g., connect service, partner service, etc. thereof) may receive service provider-instrument data based at least in part on the pre-selection data. The service provider-instrument data may be indicative of the one or more service provider instruments for the user that are facilitated by the selected service provider platform. For example, the service provider-instrument data may include one or more system instrument identifiers and/or corresponding instrument representations from one or more instrument data objects that correspond to the service provider and the user. Each of the instrument data objects, for example, may include a system user identifier that corresponds to the user.

In addition, or alternatively, the exchange platform (e.g., one or more service provider services thereof) may provide an instrument request for the service provider-instrument data (e.g., via a service provider interface) from the selected service provider platform. The instrument request, for example, may include a user reference that corresponds to a member user identifier of the service provider platform. In response to the request, the service provider platform may identify one or more member instrument data objects that include the member user identifier, identify one or more instrument references corresponding to the one or more member instrument data objects, and provide service provider-instrument data to the exchange platform that is indicative of the one or more instrument references and/or one or more corresponding instrument representations.

The exchange platform (e.g., connect service, partner service, etc. thereof) may initiate, using the partner interface and via the enrollment user interface, the presentation of an instrument enrollment screen via the client device of the user based at least in part on the service provider-instrument data. The instrument enrollment screen may be internally defined by the partner and/or be provided by the exchange platform. The instrument enrollment screen, for example, may be indicative of one or more service provider instruments associated with the user and the selected service provider. By way of example, the instrument enrollment screen may be indicative of a respective instrument representation for each of the one or more service provider instruments. In some examples, for instance when the user is only affiliated with a single service provider instrument, the instrument enrollment screen may include a confirmation prompt to confirm the user's intention to enroll the service provider instrument.

In some embodiments, the process 600 includes, at step/operation 612, receiving selection data. The selection data, for example, may be indicative of a selection of a service provider instrument from the enrollment user interface. By way of example, the selection data may identify a service provider instrument from the service provider instrument list affiliated with the user. In addition, or alternatively, the selection data may be indicative of a confirmation of a single service provider instrument that is affiliated with the user.

For example, the exchange platform may receive, using the partner interface, a register instrument with account request from the client-side widget. The request may include selection data and/or the session identifier. The selection data may be indicative of a selection of a service provider instrument from the enrollment user interface. For example, the selection data may be indicative of an instrument representation (e.g., last four digits of an account, an account nickname, etc.) for a selected service provider instrument. In some examples, the selection data may include at least one of an instrument type, a currency type (e.g., in a financial value system), and/or an instrument identifier (e.g., instrument representation, etc.) corresponding to the selection.

In some embodiments, the client-side widget may be configured to authenticate the user before initiating the register instrument with account request. For example, the client-side widget may be configured to generate a user verification prompt based at least in part on the user data. The user verification prompt is indicative of a confirmation request for at least one portion of the user data. In some examples, the widget may be configured to present the user verification prompt to the user. In some embodiments, the exchange platform may initiate, using the partner interface, the presentation of the user verification prompt. In response to user input indicative of a confirmation of at least a portion (e.g., one or more user attributes, etc.) of the user data, the widget may provide the register instrument with account request to the exchange platform.

In some embodiments, the process 600 includes, at step/operation 614, generating a matching code. In some examples, the exchange platform (e.g., the connect service, partner service, etc. thereof) may generate the matching code. In some examples, the matching code may be generated in response to the user input indicative of a confirmation of the at one portion of the user data and/or the register instrument with account request indicative of the confirmation. The exchange platform (e.g., connect service, partner service, etc. thereof) may generate the matching code for authenticating the user.

In some embodiments, the matching code is a session-unique identifier for authorizing an enrollment session between one or more entities. The matching code, for example, may include a sequence of numeric, alpha-numeric, and/or the like characters that may be provided to multiple entities to ensure that each of the entities is involved in the same communication sequence. By way of example, a matching code may include a sequence of one or more distinct characters of a dynamic length (e.g., six, eight characters, etc.) that may be generated by the exchange platform, provided to a service provider platform, and then received from a partner platform to ensure that the exchange platform, the service provider platform, and the partner platform are each interacting with the same end user (e.g., by comparing a received matching code to a generated matching code as described herein). The one or more distinct characters may include one or more alpha-numeric, emoji, kanji, wingdings, and/or the like.

In some embodiments, the process 600 includes, at step/operation 616, providing an enrollment request with the matching code to the service provider platform corresponding to the service provider instrument. For example, the exchange platform (e.g., a service provider service, etc. thereof) may provide, using the service provider interface, an enrollment request to a service provider platform corresponding to the service provider instrument. The enrollment request may include service provider enrollment data indicative of the matching code, one or more user identifiers for the user, and/or one or more instrument identifiers for the service provider instrument. In response to the enrollment request, the service provider platform may verify the service provider instrument using the one or more identifiers.

The service provider enrollment data, for example, may include one or more identifiers for referencing the service provider instrument without using the persistent credentials for the service provider instrument (e.g., card number, account number, etc.) in communications between the exchange platform, the service provider platform, and/or the partner platform. The one or more identifiers, for example, may include various combinations of user identifiers and/or instrument identifiers to validate a user and/or instrument through one or more redundancy checks. For example, the user identifiers for the user may include a user reference for the service provider platform and/or a user key from the exchange platform that corresponds to the user reference. As another example, the instrument identifiers for the service provider instrument may include an instrument reference for the service provider platform and/or an instrument key from the exchange platform that corresponds to the instrument reference.

The service provider enrollment data may include any combination of references, keys, and/or identifiers described herein. In one example, the service provider enrollment data may include one of the instrument reference, instrument key, user reference, and/or user key. In addition, or alternatively, the service provider enrollment data may include a combination of the corresponding instrument reference, instrument key, user reference, and user key for built in redundancies. In some examples, a combination of identifiers may be specified by an interface call. The combination may be service provider specific and/or be dynamically changed according to a communication scheme. In this way, the specific combination of identifiers provided in an enrollment request may be leveraged as an additional verification check to ensure that the enrollment request is received from an affiliated platform, such as the exchange platform.

The service provider may compare the identifiers from the enrollment request to one or more member data objects (e.g., a member instrument data object, a member user data object, etc.) to identify a service provider instrument corresponding to the enrollment request without exposing the persistent credentials of the service provider instrument.

In some embodiments, the process 600 includes, at step/operation 618, receiving a matching code from the partner platform. For example, the exchange platform may receive, using the partner API, an authentication message that includes the matching code and/or the session identifier. The authentication message may be received from the partner platform in response to user input to the enrollment user interface.

The exchange platform may compare the matching code to the previously generated matching code to authenticate the user. For example, the service provider platform may be configured to provide the matching code to the user through one or more preexisting communication protocols (e.g., via a service provider application, a registered phone number, an email address, etc.) between the service provider platform and the user. In the event that the exchange platform receives the matching code from a partner platform, the exchange platform may verify that the user interacting with the partner platform is an authorized user of the service provider.

In some examples, the exchange platform may initiate, using the partner interface and via the enrollment user interface, a presentation of an authentication user screen. At substantially the same time, the service provider platform may provide the matching code to the user (e.g., via the client device, and/or other pre-configured means). The user may enter the matching code (e.g., received from the service provider platform) through the authentication user screen and the partner platform may forward the matching code to the exchange platform. The exchange platform may receive, using the partner interface, the authentication message based at least in part on the user input to the authentication user screen.

In some embodiments, the exchange platform authenticates the enrollment session in response to the authentication of the user based at least in part on the matching code. Upon successful enrollment, control is passed back to the partner application running on the client device, which requests an UUEK, as described in further detail with reference to FIG. 6C.

Referring now to FIG. 6C, FIG. 6C is a flowchart showing an example of a third stage of an enrollment process 600 for issuing an UUEK for facilitating a credential-less exchange of value. The flowchart depicts communication techniques to overcome various limitations of traditional enrollment systems by circumventing traditional systems' reliance on instrument references, such as a card number, and/or the like, provided by a user. The communication techniques may be implemented by one or more computing devices, entities, and/or systems described herein, such as the exchange platform to establish a user-instrument record for enrolling a user with the exchange platform.

In some embodiments, the process 600 includes, at step/operation 620, validating the enrollment session based at least in part on a session identifier. For example, the exchange platform may receive, via the partner interface, a session exchange request for exchanging the session identifier for an UUEK. The session exchange request may include the session identifier and a member instrument reference for the service provider instrument. The member instrument reference may include a partner specific reference for the service provider instrument. The exchange platform (e.g., partner service thereof) may receive the session exchange request, validate (e.g., via the connect service, partner service, etc. thereof) the session identifier by comparing the session identifier to the previously generated session identifier, and, in response to match, validate the enrollment session.

In some embodiments, the process 600 includes, at step/operation 622, generating an UUEK. For example, the exchange platform may generate an UUEK in response to a validation of the enrollment session. By way of example, the exchange platform may generate an UUEK that corresponds to the user, the service provider instrument, and the partner platform. The exchange platform may store the UUEK in a partner-specific exchange data object that associates the UUEK with an exchange identifier, an instrument key, and the partner-specific instrument reference, as described herein.

In some embodiments, the process 600 includes, at step/operation 624, providing the UUEK to the partner platform. For example, the exchange platform may provide, using the partner interface, data indicative of the UUEK to the partner platform. In some examples, the partner platform may provide the UUEK and/or a representation thereof to the user (e.g., for storage in virtual wallet, etc.). By way of example, the UUEK may be represented in one or more different forms, such as a machine readable optical image (e.g., barcode, quick response code, etc.), a keyword, a virtual widget, and/or the like.

Figure 7A:
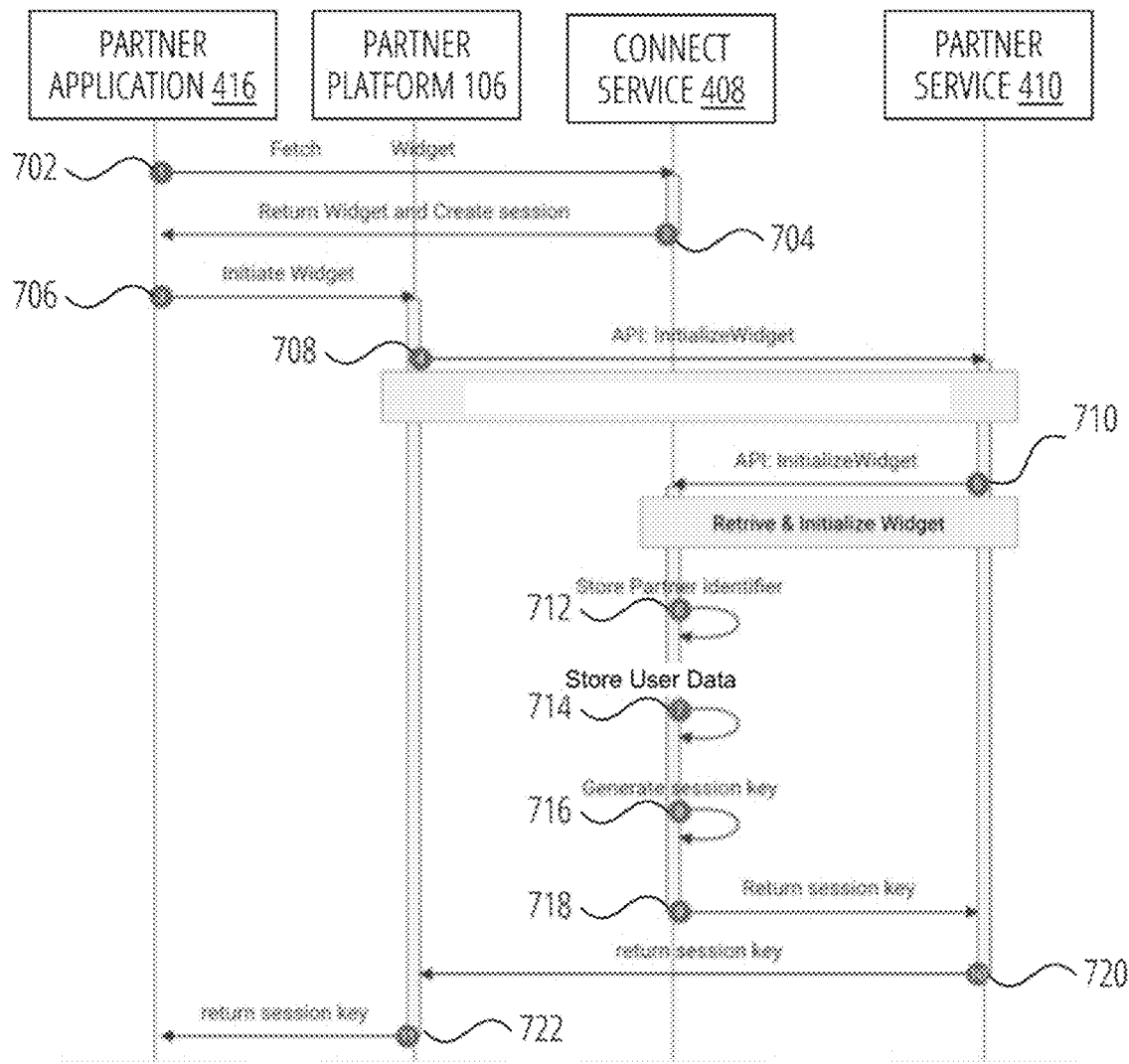
Figure 7B:
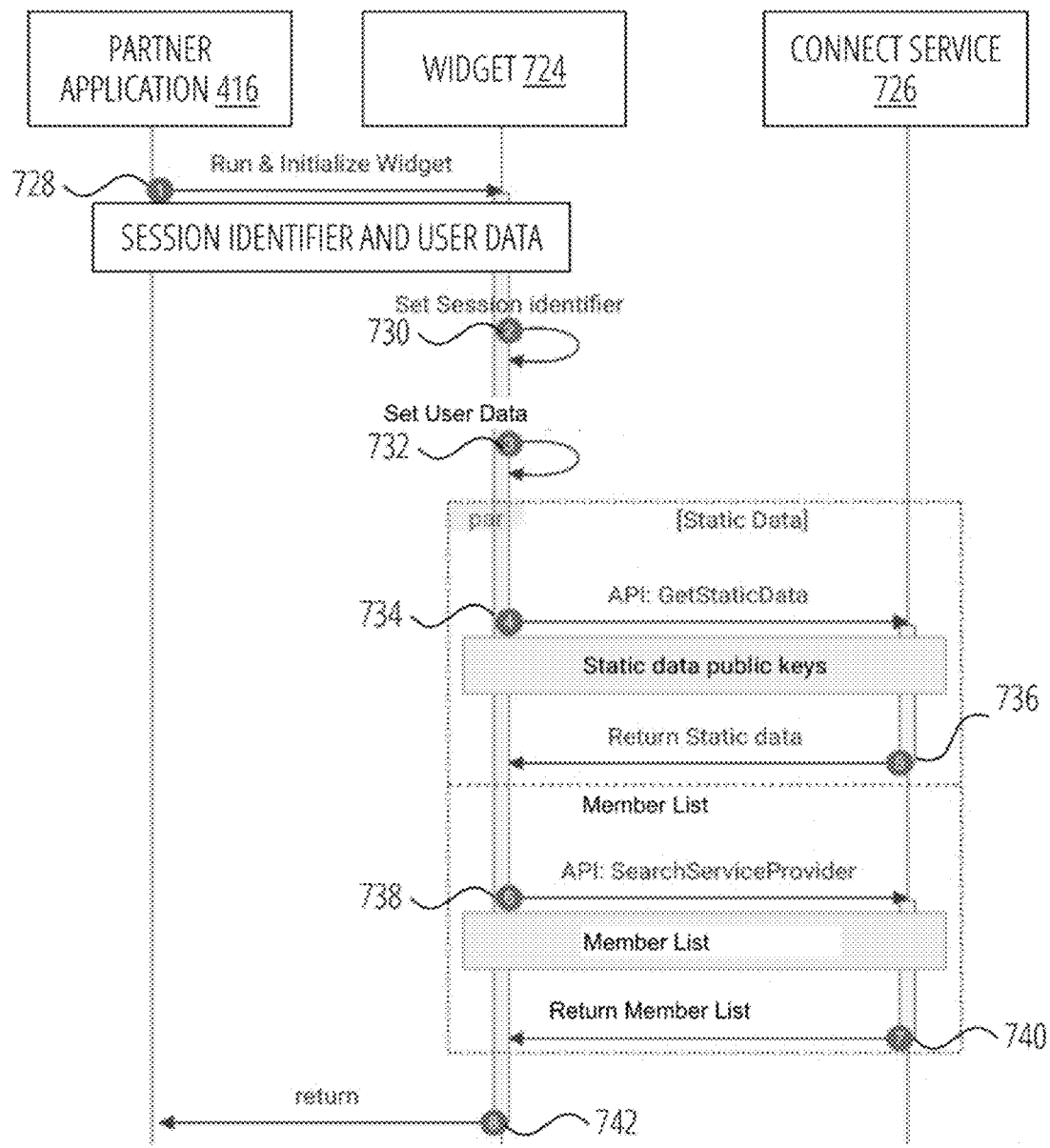

FIGS. 7A-D provide message flow diagrams illustrating steps/operations for establishing a cross-entity relationship in relation to FIGS. 6A-C. As will be recognized, these may be executed and carried out with the corresponding steps/operations of FIGS. 6A-C. In general, the steps/operations for establishing a secure communication session with a user through a partner application as illustrated in FIGS. 7A-B may be applicable and/or be related to the step/operations of FIG. 6A. For example, the steps/operations illustrated in FIGS. 7A-B may correspond to and/or be related to certain operations of the first stage of the enrollment process 600 for enrolling a service provider instrument with a partner platform without exposing persistent credentials associated with the user and/or a service provider instrument.

At step/operation 702, a partner application 416 fetches a widget (e.g., a set of instructions, such as a javascript widget, etc.) from the connect service 408. At step/operation 704, the connect service 408 returns the widget and creates a session. In various embodiments, step/operation 704 is performed responsive to step/operation 702.

At step/operation 706, the partner application 416 initiates the widget using the partner platform 420 (e.g., a host, etc.). At step/operation 708, the partner platform 420 initializes the widget by calling, using a partner interface (e.g., an Initialize-widget call, etc.), a widget initialization function of the partner service 410. In some examples, the widget initialization call may include user data, such as one or more user attributes. At step/operation 710, the partner service 410 retrieves and initializes the widget, using the partner interface (e.g., an Initialize-widget call, etc.), by calling the connect service 408. In various embodiments, step/operation 710 is performed responsive to step/operation 708.

At step/operation 712, the connect service 408 stores a partner identifier for the partner corresponding to the partner platform 420. At step/operation 714, the connect service 408 stores the user data for the user. At step/operation 716, the connect service 408 generates a session identifier for identifying the communication session between the partner and exchange platform. At step/operation 718, the connect service 408 provides the session identifier to the partner service 410. At step/operation 720, the partner service 410 returns the session identifier to the partner platform 420. And, at step/operation 722, the partner platform 420 returns the session identifier to the partner application 416. In various embodiments, upon execution of step/operation 722, a communication session may be initialized.

Turning to FIG. 7B, at step/operation 728, the partner application 416 executes the widget 724 and hands over control to the widget 724 to continue the enrollment process. The widget 724 is provided with the session identifier and the user data. At step/operation 730, the widget 724 sets the session identifier. At step/operation 732, the widget 724 sets the user data. At step/operation 734, the widget 724 requests, using the partner interface, public keys from the connect service 408. At step/operation 736, the connect service 408 returns the public keys to the widget 724. At step/operation 738, the widget 724 requests, using the partner interface, a service provider list from the connect service 408. And, at step/operation 740, the connect service 408 returns the service provider list. In some examples, at step/operation 742, the widget 724 returns the service provider list to the partner application 416 for presentation to a user (e.g., via a client device).

Figure 7C:
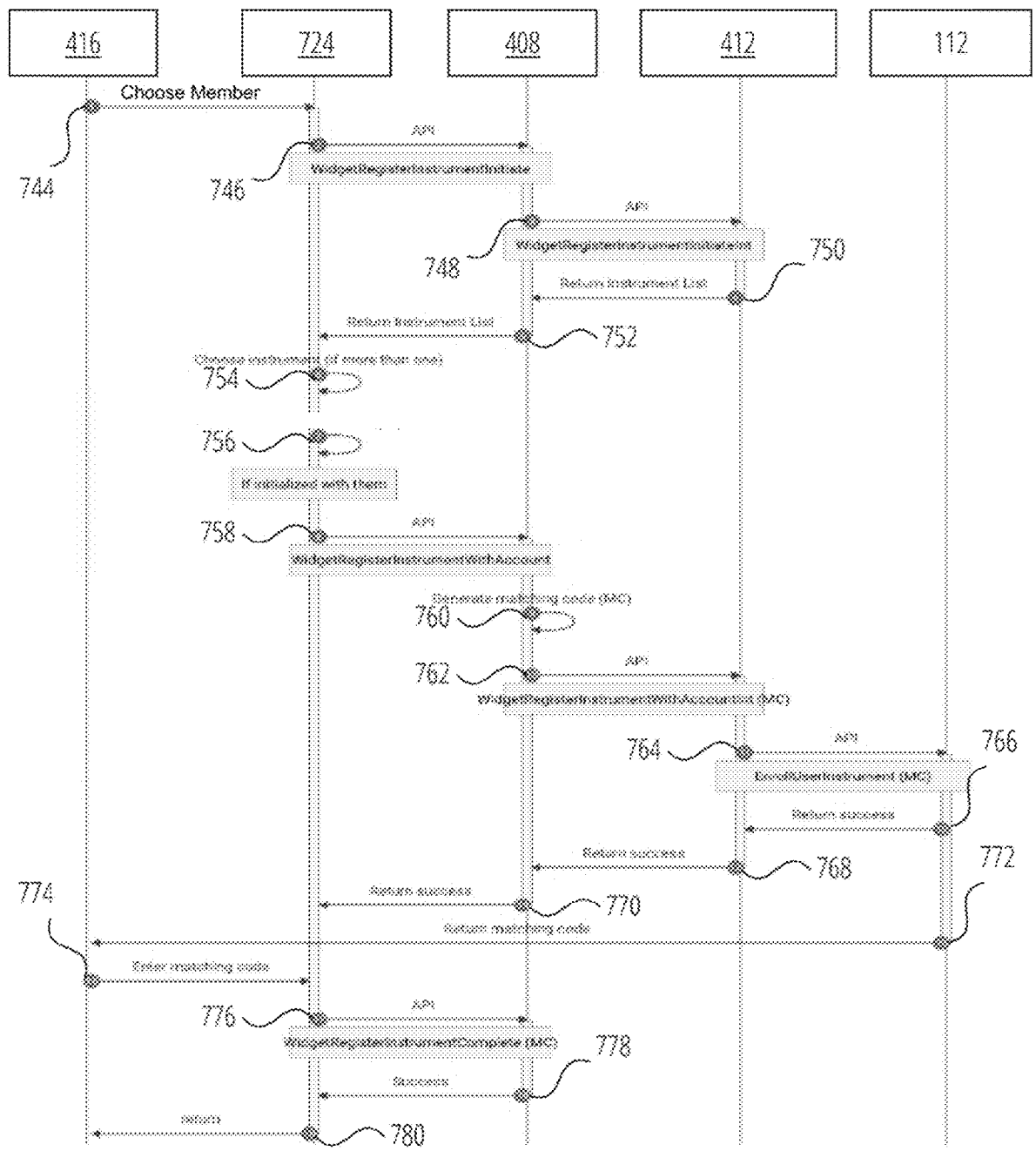

Turning to FIG. 7C, the enrollment process may proceed to a second stage, illustrated by the step/operations of FIG. 7C, after establishing a secure communication session with a partner application. In general, the steps/operations illustrated in FIG. 7C may be applicable and/or be related to the step/operations of FIG. 6B. For example, the steps/operations illustrated in FIG. 7C may correspond to and/or be related to certain operations of the second stage of the enrollment process 600 for enrolling a service provider instrument with a partner platform without exposing persistent credentials associated with the user and/or a service provider instrument.

At step/operation 744, the partner application 416 receives input indicative of a service provider from the service provider list and transmits a service provider identifier to the widget 724. At step/operation 746, the widget 724 transmits, using the partner interface (e.g., a widget register instrument initiate call, etc.), a request to the connect service 408 to initiate the registration of a service provider instrument for the service provider platform. The request may include the service provider identifier (e.g., a service provider partition, etc.). At step/operation 748, the connect service 408 requests, using the partner interface (e.g., a widget register instrument initiate call, etc.), an instrument list corresponding to the user and service provider. At step/operation 750, the service provider service 412 returns an instrument list to the connect service 408 At step/ operation 752, the connect service 408 returns the instrument list to the widget 724, which may provide a pre-enrollment screen indicative of the instrument list (e.g., one or more instrument representations thereof) to a user.

At step/operation 754, the widget 724 receives input indicative of a service provider instrument (e.g., an instrument representation, etc.). At step/operation 756, the widget 724 confirms user data with the user (e.g., through one or more user verification screens, etc.). At step/operation 758, the widget 724 provides, using the partner interface (e.g., a widget registration instrument with account call, etc.), a request to register the service provider instrument to the connect service 408. In various embodiments, step/operation 758 is performed responsive to a confirmation of user data at step/operation 756.

At step/operation 760, the connect service 408 generates a matching code. At step/operation 762, the connect service 408 provides, using the partner interface (e.g., a widget registration instrument with account call, etc.), a request to enroll the service provider instrument to the service provider service 412. The request may include the matching code and the session identifier. At step/operation 764, the service provider service 412 provides, using the service provider interface (e.g., an enroll user instrument call, etc.), a request to enroll the service provider instrument to the service provider platform 440. The request may include an instrument reference, a user reference, a user key, an instrument key, and/or the matching code. The service provider platform 440 may enroll the service provider instrument and, at step/operation 766, provide an enrollment success response, using the service provider interface, to the service provider service 412. At step/operation 768, the service provider service 412 provides data indicative of the enrollment success response to the connect service 408. The connect service 408, at step/operation 770, provides data indicative of the enrollment success response to the widget 724.

Meanwhile, at step/operation 772, the service provider platform 440 provides, using one or more preexisting communication channels, the matching code to the user. The user may access the matching code and, at step/operation 774, enter the matching code to a verification interface presented by the widget 724.

At step/operation 776, the widget 724 provides, using the partner interface, a registration complete response to the connect service 408. In various embodiments, step/operation 776 is performed responsive to a confirmation of a matching code provided at step/operation 774.

At step/operation 778, the connect service 408 provides a response to the widget 724 indicating a successful registration. At step/operation 780, the widget 724 provides data indicative of the response to the partner application 416.

Figure 7D:
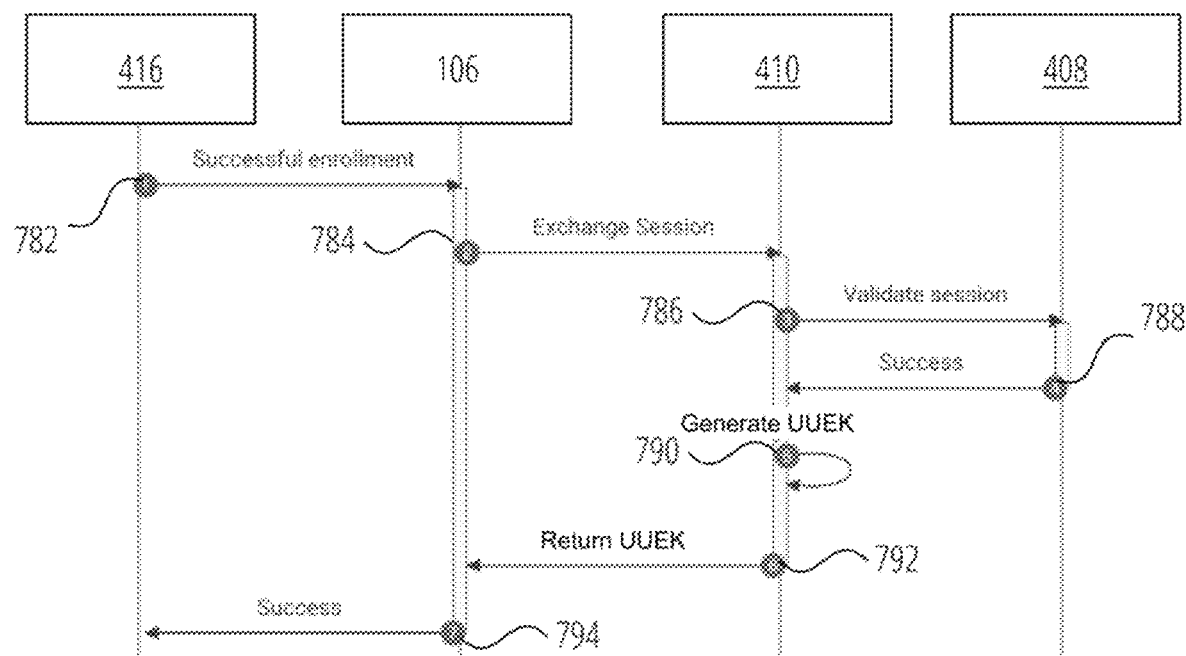
Figure 8A:
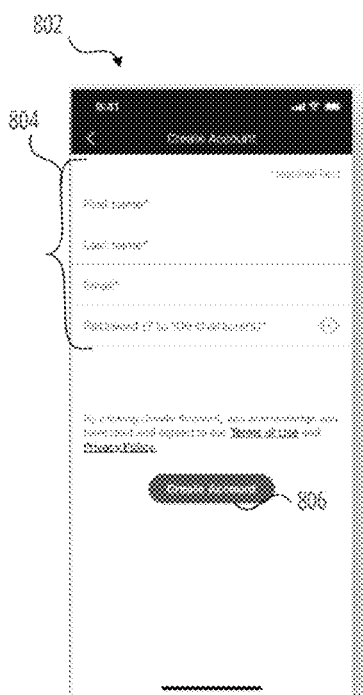
Figure 8B:
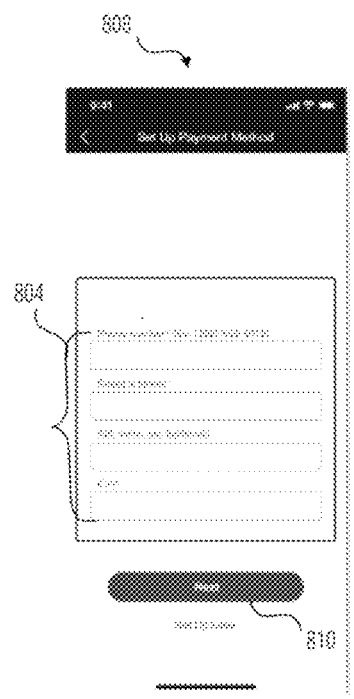
Figure 8C:
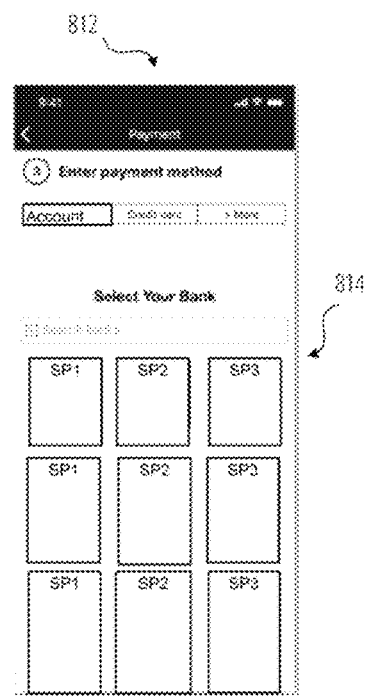
Figure 8D:
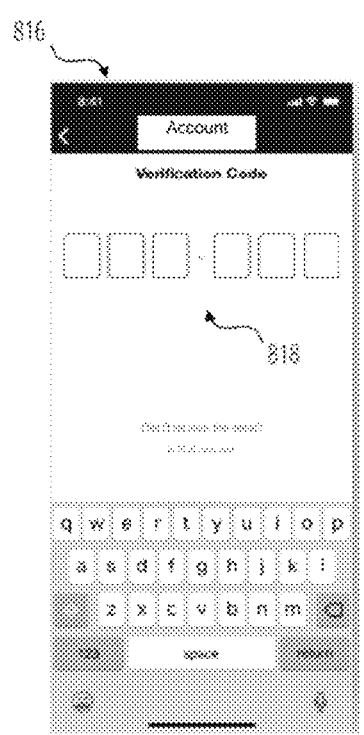
Figure 8E:
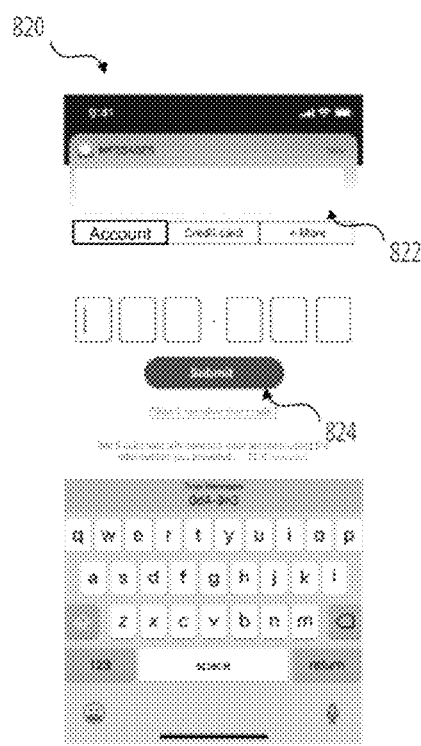
Figure 8F:
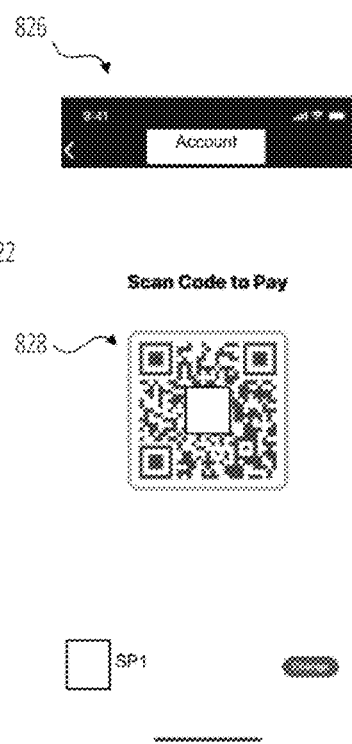

Turning to FIG. 7D, the enrollment process may proceed to a third stage, illustrated by the steps/operations of FIG. 7D, after authorizing the user based at least in part on the confirmation of the matching code as described above. In general, the steps/operations illustrated in FIG. 7D may be applicable and/or be related to the step/operations of FIG. 6C. For example, the steps/operations illustrated in FIG. 7D may correspond to and/or be related to certain operations of the third stage of the enrollment process 600 for enrolling a service provider instrument with a partner platform without exposing persistent credentials associated with the user and/or a service provider instrument.

At step/operation 782, the partner application 416 provides data indicative of a successful enrollment to the partner platform 420. At step/operation 784, the partner platform 420 provides a key request, using the partner interface, to the partner service 410. The partner service 410, at step/operation 786, validates the communication session by providing the session identifier to the connect service 408. The connect service 408 compares the session identifier to the identifier issued to initiate the communication session and, if the identifiers match, at step/operation 788, provides data indicative of the validated session to the partner service 410.

At step/operation 790, the partner service 410 generates a UUEK for the partner and exchanges the session identifier with a UUEK. At step/operation 792, the partner service 410 provides, using the partner interface, the UUEK to the partner platform 420. At step/operation 794, the partner platform 420 may provide an indication of the successful enrollment to the partner application 416. In some examples, the indication of successful enrollment may include a UUEK representation, such as a barcode, QR code, and/or the like for representing the UUEK to a user.

Having thus described various operations, processes, methods, functions, and/or the like for enrolling a user for credential-less transactions, various user interface screens for controlling, initiating, executing, and/or the like such steps/operations are provided and described. In various embodiments, the user interface screens provided and described in the present disclosure are configured to be provided via a user interface of a client device 104.

FIGS. 8A-F provide an example user interface flow configured for a client device 104. The user interface flow may include a plurality of user interface screens that may be configured to guide a user through a credential-less enrollment process to facilitate a credential-less exchange between a partner platform and a service provider platform. In some examples, these transactions may be managed through a user account with the partner platform. For example, the user interface screen 802 of FIG. 8A includes an account set-up screen for entering user attributes 804 for the user account. The user interface screen 802 may include a selectable account creation icon 806 for initiating the account creation process. In addition, or alternatively, a user may enroll with the partner platform through an exchange screen. For example, the user interface screen 808 of FIG. 8B includes an enrollment set-up screen for entering one or more user attributes 804 through a widget executed by the partner application. The user interface screen 808 of FIG. 8B may include a selectable enrollment navigation 810 for proceeding to the next step of the enrollment process.

The step of the enrollment process may include selecting a service provider for which the user has a service provider instrument that may be enrolled with the partner platform. The user interface screen 812 of FIG. 8C may facilitate the selection of the service provider by providing a service provider list 814 of selectable icons. In some examples, the service provider list 814 may be automatically matched to the user attributes (e.g., provided through one or more previous user interface screens) available to the user. The service provider list 814, for example, may be tailored to the user and, in some examples, may be proactively limited to service providers for which the user has an affiliation. As shown by the user interface screen 812, the service providers may include financial institutions, such as banks, and/or the like, for a financial-based value exchange. This is provided as one example only. As described herein, the techniques of the present disclosure may be applicable to any value exchange system.

Upon selection of the service provider, the user may be directed to another user interface screen (not illustrated) to select a service provider instrument for the service provider.

Once selected, the exchange platform may execute an enrollment process to enroll the service provider instrument with the partner platform. During the enrollment process, the user may be transitioned to the user interface screen 816 of FIG. 8D which may include a verification prompt 818 for entering a matching code. As shown, by the user interface screen 820 of FIG. 8E, the matching code may be automatically provided to the user through a message 822 from a service provider platform. The user may answer the verification prompt 818 by entering the matching code and select the submission icon 824 to complete the enrollment process. The next screen, user interface screen 826 of FIG. 8F, may display an UUEK representation 828 of an UUEK for the user. The UUEK representation 828, for example, may include a scannable representation (e.g., a barcode, QR code, non-fungible token, near-field communication sequence, etc.) of an UUEK. The scannable representation may be saved to a partner account of the partner platform to enable the user to execute a value-based transaction using the service provider instrument without referencing persistent credentials of the service provider instrument.

FIG. 9 provides a process flow for facilitating a credential-less exchange of value in accordance with one or more embodiments of the present disclosure. The process flow depicts a communication and data encryption process 900 for leveraging an UUEK to securely authorize an exchange in a value agnostic exchange. The process 900 may be leveraged to overcome various limitations of traditional exchange systems that expose sensitive and persistent credentials to multiple third parties, as described herein. The process 900 may be implemented by one or more computing devices, entities, and/or systems described herein. For example, via the various steps/operations of the process 900, the exchange platform may leverage the communication and data encryption techniques to overcome the various limitations with traditional mechanisms of exchange by eliminating reliance on static, sensitive credentials.

FIG. 9 illustrates an example process 900 for explanatory purposes. Although the example process 900 depicts a particular sequence of steps/operations, the sequence may be altered without departing from the scope of the present disclosure. For example, some of the steps/operations depicted may be performed in parallel or in a different sequence that does not materially impact the function of the process 900. In other examples, different components of an example device or system that implements the process 900 may perform functions at substantially the same time or in a specific sequence.

In some examples, the process 900 begins after the enrollment process 600 of FIGS. 6A-C, where a user and/or partner platform may receive an UUEK for facilitating a credential-less exchange of value. However, the process 900 may also be performed before the enrollment process 600. For example, the user may obtain an UUEK directly from a service provider platform instead of completing the enrollment process for a partner platform. In the event that an enrollment process 600 is completed, a value-based exchange may be facilitated by the partner platform using the partner interface and an UUEK specific to the partner platform, otherwise the value-based exchange may be facilitated by the partner platform using an UUEK specific to and provided by a service provider platform.

By way of example, when a user wishes to perform a value-based exchange with a partner at which the user has an enrolled partner account, the partner platform may look up the enrolled partner account and identify an issued UUEK for the user from the partner account for use in authorizing the value-based exchange. In the event that the user wishes to perform a value-based exchange with a partner at which the user does not have an enrolled partner account, the user may present a previously issued UUEK (e.g., issued to a service provider platform, etc.) to the partner platform (e.g., through a partner application, etc.) and the partner platform may use the UUEK for authorizing the value-based exchange.

The partner platform may generate an exchange request data object for executing the value-based exchange based at least in part on the UUEK for the particular use case (e.g., a partner UUEK when the user has an enrolled account, a service provider UUEK when the user does not have an enrolled account, etc.). The exchange request data object may include request data that identifies the UUEK and transaction attributes for the requested value-based exchange. The process 900 may begin in the event that the partner platform issues an exchange request based on the exchange request data object.

In some embodiments, the process 900 includes, at step/operation 902, receiving an exchange request with an UUEK. For example, the exchange platform (e.g., a partner service, etc. thereof) may receive, using a partner interface, an exchange request for executing a value-based exchange. The exchange request may be indicative of the UUEK and/or one or more transaction attributes.

The transaction attributes may be indicative of one or more characteristics of the requested exchange. For example, the one or more transaction attributes may include at least one transaction attribute that is indicative of a transaction value (e.g., a basket amount, etc.). The transaction value, for example, may include a summation of one or more line items in a financial exchange including one or more modifiers, such as taxes, discounts, and/or the like. Staying with a financial-based value system example, in some examples, the transaction attributes may include (i) an order number, (ii) one or more line item attributes including a sequence, a line item group, a product code, a description, a quantity, a unit—item, gram, kilogram, etc., a unit amount, a unit tax amount, a line amount (e.g., amount of the line item), a line tax amount, etc., and/or (iii) one or more line item adjustments including a sequence, an adjustment type (e.g., manufactures discount, a store discount, a return, a payment cash, a payment gift card, payment other, etc.,), a product code, a description, a quantity, a unit—item, gram, kilogram, etc., a unit amount, a unit tax amount, a line amount (e.g., amount of the line item), a line tax amount, and/or the like.

In addition, or alternatively, the transaction attributes may include a request approval type (e.g., full or partial), a partner transaction reference (e.g., the partner platform's reference for the transaction), a channel (e.g., a type of money exchange for a financial value system, such as a push or pull value transfer, a real time payment, etc.), a currency (e.g., for financial value systems, etc.), an organization key (e.g., a platform identifier for a partner organization), an organization category (e.g., airline, apparel, etc.), an establishment key (e.g., a platform identifier for a retail location, etc.), a clerk identifier, and/or any other traceable information for a value-based exchange.

In some embodiments, the process 900 includes, at step/operation 904, verifying the UUEK. For example, the exchange platform (e.g., a partner service thereof) may look up the UUEK to identify a matching identifier from a platform data vault 414. For example, the UUEK may include an exchange identifier that corresponds to an exchange data object. The exchange platform may identify the exchange identifier based at least in part on the UUEK and leverage the exchange identifier to identify a corresponding exchange data object.

As described herein, an UUEK may correspond to a partner platform and/or a service provider platform. By way of example, the UUEK may include a partner partition that identifies a partner platform in the event that the UUEK was issued to a partner platform. In such a case, the UUEK includes an exchange identifier that corresponds to a partner-exchange data object. As another example, the UUEK may include a service provider partition that identifies a service provider platform in the event that the UUEK was issued to a service provider platform. In such a case, the UUEK includes an exchange identifier that corresponds to a service provider-exchange data object. In some examples, the exchange platform may process a UUEK based on the entity partition.

In some embodiments, the exchange platform (e.g., a partner service, etc. thereof) receives a UUEK that includes a partner partition identifying a partner platform. The exchange platform may identify a partner-specific exchange data object using the exchange identifier. The partner-specific exchange data object may include an instrument key corresponding to a service provider instrument of a member platform. The exchange platform may identify a system instrument data object based on the instrument key. For instance, the exchange platform may identify a member platform based on an entity partition of the instrument key and provide the instrument key to a service (e.g., a service provider service, etc.) that corresponds to the member platform. The service may identify the system instrument data object based on the instrument key. The system instrument data object may then be leveraged to identify one or more identifiers (e.g., user identifiers, instrument identifiers, etc.) for processing the exchange request.

In some embodiments, the exchange platform (e.g., a partner service, etc. thereof) receives a UUEK that includes a service provider partition identifying a service provider platform. The exchange platform (e.g., a partner service, etc. thereof) may determine that a partner-specific exchange data object is unavailable. In response to this determination, the exchange platform may identify a member platform based on the service provider partition and provide the UUEK to a service (e.g., a service provider service, etc.) that corresponds to the member platform. The service may identify a service provider-specific exchange data object based at least in part on the exchange identifier of the UUEK. The service provider-specific exchange data object may be leveraged to identify the system instrument data object based on the member platform and the exchange identifier. The system instrument data object may then be leveraged to identify one or more identifiers (e.g., user identifiers, instrument identifiers, etc.) for processing the exchange request.

In some examples, the exchange platform may perform one or more verification actions for the UUEK. For instance, the exchange data object may include one or more exchange attributes that are indicative of an expiration status. In some examples, the expiration status may be indicative of (i) whether the UUEK has been previously used to authorize a value-based exchange and/or (ii) a valid time period in which the UUEK may be valid. The verification action may include identifying the expiration status corresponding to the UUEK and verifying the UUEK based at least in part on the expiration status. By way of example, the exchange platform may verify the UUEK in the event that the expiration status indicates (i) that the UUEK has not been previously used to authorize a value-based exchange and/or (ii) that the UUEK has been presented within the valid time period.

In some examples, the verification action may include verifying that the sender of the UUEK is affiliated with the origin entity to which the UUEK was issued. In some examples, the UUEK may include an entity partition that is indicative of the origin entity (e.g., member platform, such as a partner or service provider platform) to which the UUEK was issued. The exchange platform may leverage the entity partition of the UUEK to determine an entity (e.g., an origin entity) that corresponds to UUEK. In some examples, the verification action may include verifying that the sender of the exchange request matches and/or is affiliated with the origin entity of the UUEK. In response to a determination that the sender is the origin entity, the exchange platform may verify the UUEK.

In the event that the UUEK is verified, the process 900 may proceed to step/operation 906. Otherwise, the process 900 may proceed to step/operation 914, where the exchange platform provides, using the partner interface, an error response to the partner platform.

In some embodiments, the process 900 includes, at step/operation 906, requesting an exchange authorization from a member platform. For example, the exchange platform (e.g., a service provider service thereof) may request the exchange approval from a service provider platform of a service provider instrument correlated to the UUEK. In some examples, the exchange platform (e.g., a partner service thereof) may identify the member platform based at least in part on the UUEK (e.g., the entity partition thereof). In addition, or alternatively, the exchange platform (e.g., a service provider service thereof) may identify the service provider instrument based at least in part on the UUEK (e.g., the exchange identifier).

The exchange platform (e.g., a service provider service thereof) may provide, using the service provider interface, an exchange authorization request to the member platform. The exchange authorization request may be indicative of at least one of the one or more transaction attributes and/or an instrument identifier for the service provider instrument. By way of example, the exchange platform may generate the exchange authorization request based on a system instrument data object identified from one or more aspects of the UUEK. The exchange authorization request may include an instrument key and/or an instrument reference from the system instrument data object.

In some examples, the exchange authorization request may be indicative of a user identifier associated with the service provider instrument. By way of example, the exchange platform may generate the exchange authorization request based on a system user data object identified from one or more aspects of the UUEK. In some examples, the system user data object may be identified based on a user identifier (e.g., system user identifier) of the exchange data object. In addition, or alternatively, the system user data object may be identified based on a user identifier (e.g., system user identifier) of the system instrument data object. In some examples, the exchange authorization request may include a user key and/or user reference from the system user data object.

In addition, or alternatively, the transaction authorization request may be indicative of a transaction identifier. By way of example, the exchange platform may generate a transaction identifier for representing the value-based exchange and provide the transaction identifier to the member platform.

In some embodiments, the process 900 includes, at step/operation 908, receiving an exchange authorization response. For example, the exchange platform (e.g., a service provider service thereof) may receive, using the service provider interface, an exchange authorization response that is indicative of at least one of a transaction approval and/or a transaction denial. In some embodiments, the exchange authorization response is based at least in part on a comparison between the transaction value and an asset availability of a service provider instrument. For example, responsive to receiving an exchange authorization request, a member platform may be configured to compare the transaction value to an asset availability of an identified service provider instrument. A value-based exchange may be authorized (e.g., resulting in a transaction approval, etc.) in the event that the asset availability exceeds the transaction value, otherwise the exchange may be denied (e.g., resulting in a transaction denial).

In some examples, the exchange authorization response may be indicative of one or more response attributes. The response attributes may include one or more error codes and/or the like for characterizing the exchange authorization response.

The exchange platform may generate a transaction record for the value-based exchange based at least in part on the exchange authorization request and/or the exchange authorization response. In some examples, the transaction record may be indicative of the transaction identifier, the one or more transaction attributes, one or more response attributes, the exchange authorization response, one or more instrument and/or user identifiers, and/or any other data related to the value-based exchange. In some examples, the exchange platform may store the transaction record in the platform data vault in association with the one or more instrument and/or user identifiers.

In some embodiments, the process 900 includes, at step/operation 910, optionally generating a replacement UUEK. For example, the exchange platform may automatically generate a replacement UUEK to replace the received UUEK.

In some examples, this may include (i) invalidating the received UUEK for future authorization requests and/or (ii) generating the replacement UUEK. For instance, the exchange platform may modify an expiration status of the UUEK to invalidate the UUEK for subsequent value exchanges. In addition, or alternatively, the exchange platform may move, delete, and/or otherwise modify the exchange data object corresponding to the UUEK to invalidate the UUEK. The replacement UUEK may include a new unique exchange identifier (e.g., a different universally unique identifier) that corresponds to a service provider instrument to replace the invalidated exchange identifier. In this manner, an UUEK may be continuously modified and changed as a user completes exchanges across different platforms, thereby limiting user and platform exposure to malicious parties.

In some embodiments, the process 900 includes, at step/operation 912, providing an exchange response to a member platform. For example, the exchange platform (e.g., a partner service thereof) may provide, using the partner interface, an exchange response to a member platform, such as a partner platform, etc. The exchange response may be based at least in part on the exchange authorization response. For instance, the exchange response may be indicative of the transaction approval and/or the transaction denial. In some examples, the exchange response may be indicative of a replacement UUEK (if generated), one or more transaction attributes, a transaction identifier, and/or one or more response attributes. In some examples, the member platform may be configured to replace the UUEK with the replacement UUEK. For instance, the exchange response may be provided to a partner platform. The partner platform may receive the exchange response and replace the UUEK with the replacement UUEK.

FIGS. 10 and 11 provide message flow diagrams illustrating steps/operations in relation to FIG. 9 for facilitating a credential-less exchange of value in accordance with one or more embodiments of the present disclosure. As will be recognized, these may be executed and carried out with the corresponding steps/operations of FIG. 9. FIG. 10, for example, may illustrate a first message flow for facilitating a credential-less exchange through an enrolled partner account, whereas FIG. 11 may illustrate a second message flow for facilitating a credential-less transaction without an enrolled partner account.

In the first message flow, at step/operation 1004, the user initiates a transaction through an enrolled partner account. At step/operation 1006, the partner platform 420 retrieves an UUEK for the user to execute the transaction on the user's behalf. At step/operation 1008, the partner platform 420 provides an exchange request, using a partner interface, to at least one of a plurality of partner services 410 of the exchange platform that corresponds to the partner platform 420. The exchange request may be indicative of the UUEK and/or one or more transaction attributes for a value-based exchange.

At step/operation 1010, the partner service 410 looks up the partner-specific transaction token (e.g., in a partner-specific data store, such as a portion of the platform data vault, etc.) to determine a member platform corresponding to the UUEK (e.g., via a mapping to a service provider partition, etc.). At step/operation 1012, the partner service 410 provides data indicative of the exchange request to the service provider service 412 of the exchange platform that corresponds to the member platform.

At step/operation 1014, the service provider service 412 verifies the UUEK (and/or an exchange identifier thereof). At step/operation 1016, the service provider service 412 provides, using the service provider interface, an exchange authorization request to the service provider platform 440. The exchange authorization request may include one or more keys (e.g., user key, instrument key, etc.), references (e.g., instrument reference, user reference, etc.), and/or one or more transaction attributes.

At step/operation 1018, the service provider platform 440 approves the transaction and provides an exchange authorization response, using the service provider interface, to the service provider service 412. At step/operation 1020, the service provider service 412 records the value-based exchange in association with the one or more keys (e.g., user key, instrument key, etc.), references (e.g., instrument reference, user reference, etc.), and/or the like. At step/operation 1022, the service provider service 412 provides the exchange authorization response to the partner service 410. The partner service 410, at step/operation 1024, provides, using the partner interface, an exchange response to the partner platform 420.

In the second message flow, at step/operation 1102, the user 1002 initiates a transaction by presenting a UUEK (and/or a UUEK representation thereof) to a partner platform 420. At step/operation 1104, the partner platform 420 provides an exchange request, using a partner interface, to a partner service 410 of the exchange platform that corresponds to the partner platform 420. The exchange request may identify the UUEK and/or one or more transaction attributes for a value-based exchange.

At step/operation 1106, the partner service 410 looks up the exchange identifier (e.g., in a partner-specific data store, such as a portion of the platform data vault, etc.) to determine whether an exchange data object exists. In the event that it does not exist, at step/operation 1108, the partner service 410 provides the UUEK to a service provider service 412 of the exchange platform that corresponds to a service provider platform identified from the UUEK.

At step/operation 1110, the service provider service 412 verifies the exchange identifier of the UUEK. At step/operation 1112, the service provider service 412 provides, using the service provider interface, an exchange authorization request to the service provider platform 440. The exchange authorization request may include one or more keys (e.g., user key, instrument key, etc.), references (e.g., instrument reference, user reference, etc.), and/or one or more transaction attributes.

At step/operation 1114, the service provider platform 440 approves the exchange and provides an exchange authorization response, using the service provider interface, to the service provider service 412. At step/operation 1116, the service provider service 412 records the transaction in association with the one or more keys (e.g., user key, instrument key, etc.), references (e.g., instrument reference, user reference, etc.), etc. At step/operation 1118, the service provider service 412 provides the exchange authorization response indicative of the response to the partner service 410. The partner service 410, at step/operation 1120, provides, using the partner interface, an exchange response to the partner platform 420.

Having thus described various operations, processes, methods, functions, and/or the like for handling an exchange on behalf of a user, various user interface screens for controlling, initiating, executing, and/or the like such steps/operations are provided and described. In various embodiments, the user interface screens provided and described in the present disclosure are configured to be provided via a user interface of a client device 104.

Figures 12A, 12B, 12C, 12D:
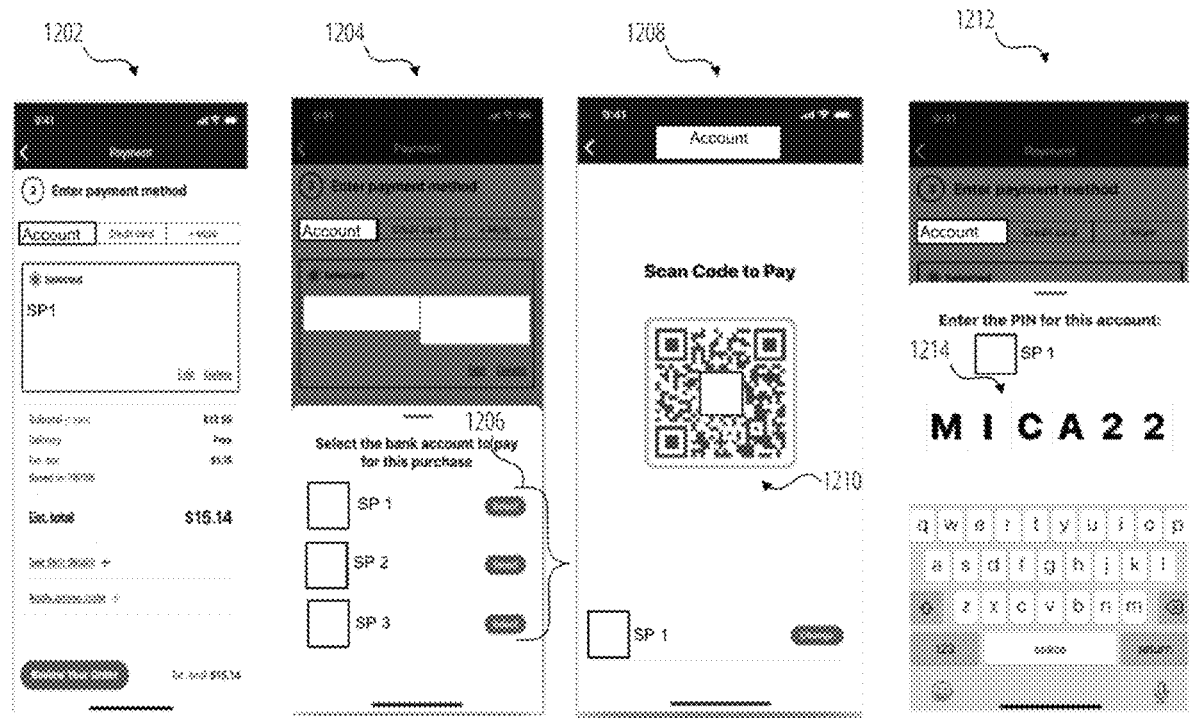

FIGS. 12A-D provide an example user interface flow configured for a client device 104. The user interfaces may be configured to guide a user through a credential-less exchange process to facilitate a value-based exchange between one or more member platforms without exposing sensitive and persistent credentials for a service provider instrument that is used to execute the value-based exchange. The credential-less exchange process may begin when the user selects a payment method from a partner application's transaction processing screen 1202, as shown by FIG. 12A. Upon selection of a payment method facilitated by the exchange platform, the user may be transitioned to an instrument selection screen 1204, as shown by FIG. 12B. The instrument selection screen 1204 may include a plurality of selectable instrument icons 1206 that may each be affiliated with an UUEK issued by the exchange platform using various techniques described herein. The user may execute the exchange by selecting one or more of the selectable instrument icons 1206.

In some examples, in response to the selection, a scanning screen 1208 may be provided for an in-store transaction. The scanning screen 1208 may present a scannable UUEK representation 1210 corresponding to an UUEK. The user may scan the scannable UUEK representation 1210 to complete the value-based exchange. In addition, or alternatively, in an online setting, the user may be transitioned to a verification user screen 1212 to supply a personal identification number (PIN) associated with a service provider instrument. The user may enter the PIN to complete the transaction.

VI. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:
   initiating, by one or more processors and using a partner interface, the presentation of an enrollment user interface via a client device of a user, wherein the enrollment user interface comprises an instrument enrollment screen that is indicative of one or more service provider instruments associated with the user;
   receiving, by the one or more processors and using the partner interface, selection data indicative of a selection of a service provider instrument from the enrollment user interface;
   generating, by the one or more processors, a matching code for authenticating the user;
   providing, by the one or more processors and using a service provider interface, an enrollment request to a service provider platform corresponding to the service provider instrument, wherein the enrollment request comprises service provider enrollment data indicative of the matching code, a user identifier for the user, and an instrument identifier for the service provider instrument;
   receiving, by the one or more processors and using the partner interface, an authentication message comprising the matching code; and
   in response to an authentication of the user based on the matching code,
   (i) generating, by the one or more processors, an UUEK for the user, wherein the UUEK corresponds to the user, the service provider instrument, and a partner platform; and
   (ii) providing, by the one or more processors and using the partner interface, the UUEK to the partner platform.

2. The computer-implemented method of claim 1, wherein the user identifier for the user comprises a user reference for the service provider platform and a user key corresponding to the user reference.

3. The computer-implemented method of claim 1, wherein the instrument identifier for the service provider instrument comprises an instrument reference for the service provider platform and an instrument key corresponding to the instrument reference.

4. The computer-implemented method of claim 3, wherein the selection data is indicative of an instrument representation that corresponds to the instrument reference.

5. The computer-implemented method of claim 1, wherein initiating the presentation of the enrollment user interface comprises:

initiating, using the partner interface and via the enrollment user interface, the presentation of a pre-enrollment screen indicative of one or more service providers associated with an exchange platform;

receiving, using the partner interface, pre-selection data indicative of a selection of a particular service provider from the one or more service providers;

receiving service provider-instrument data based at least in part on the pre-selection data, wherein the service provider-instrument data is indicative of the one or more service provider instruments for the user; and initiating, using the partner interface and via the enrollment user interface, the presentation of the instrument enrollment screen based at least in part on the service provider-instrument data, wherein the instrument enrollment screen is indicative of a respective instrument representation for each of the one or more service provider instruments.

6. The computer-implemented method of claim 5, wherein initiating the presentation of the pre-enrollment screen comprises:

receiving, through the partner interface, a communication session request for the user, wherein the communication session request comprises one or more user attributes;

generating a session identifier for a communication session between the partner platform and the exchange platform;

determining the one or more service providers based at least in part on the one or more user attributes; and initiating, using the partner interface and via the enrollment user interface, the presentation of the pre-enrollment screen based at least in part on the one or more service providers.

7. The computer-implemented method of claim 1, wherein the matching code comprises a sequence of one or more distinct characters.

8. The computer-implemented method of claim 1, wherein the client device is configured to access a partner application that is hosted by the partner platform, and the enrollment user interface is presented to the user using the partner application.

9. The computer-implemented method of claim 1, wherein the service provider platform is configured to provide the matching code to the user, and wherein receiving the authentication message comprises:

initiating, using the partner interface and via the enrollment user interface, a presentation of an authentication user screen; and receiving, using the partner interface, the authentication message based at least in part on user input to the authentication user screen.

10. A computing system comprising memory and one or more processors communicatively coupled to the memory, the one or more processors configured to:

initiate, using a partner interface, the presentation of an enrollment user interface via a client device of a user, wherein the enrollment user interface comprises an instrument enrollment screen that is indicative of one or more service provider instruments associated with the user;

receive, using the partner interface, selection data indicative of a selection of a service provider instrument from the enrollment user interface;

generate a matching code for authenticating the user;

provide, using a service provider interface, an enrollment request to a service provider platform corresponding to the service provider instrument, wherein the enrollment request comprises service provider enrollment data indicative of the matching code, a user identifier for the user, and an instrument identifier for the service provider instrument;

receive, using the partner interface, an authentication message comprising the matching code; and in response to an authentication of the user based on the matching code,
(i) generate an UUEK for the user, wherein the UUEK corresponds to the user, the service provider instrument, and a partner platform; and
(ii) provide, using the partner interface, the UUEK to the partner platform.

11. The computing system of claim 10, wherein the user identifier for the user comprises a user reference for the service provider platform and a user key corresponding to the user reference.

12. The computing system of claim 10, wherein the instrument identifier for the service provider instrument comprises an instrument reference for the service provider platform and an instrument key corresponding to the instrument reference.

13. The computing system of claim 12, wherein the selection data is indicative of an instrument representation that corresponds to the instrument reference.

14. The computing system of claim 10, wherein initiating the presentation of the enrollment user interface comprises:

initiating, using the partner interface and via the enrollment user interface, the presentation of a pre-enrollment screen indicative of one or more service providers associated with an exchange platform;

receiving, using the partner interface, pre-selection data indicative of a selection of a particular service provider from the one or more service providers;

receiving service provider-instrument data based at least in part on the pre-selection data, wherein the service provider-instrument data is indicative of the one or more service provider instruments for the user; and initiating, using the partner interface and via the enrollment user interface, the presentation of the instrument enrollment screen based at least in part on the service provider-instrument data, wherein the instrument enrollment screen is indicative of a respective instrument representation for each of the one or more service provider instruments.

15. The computing system of claim 14, wherein initiating the presentation of the pre-enrollment screen comprises:

receiving, through the partner interface, a communication session request for the user, wherein the communication session request comprises one or more user attributes;

generating a session identifier for a communication session between the partner platform and the exchange platform;

determining the one or more service providers based at least in part on the one or more user attributes; and initiating, using the partner interface and via the enrollment user interface, the presentation of the pre-enrollment screen based at least in part on the one or more service providers.

16. The computing system of claim 10, wherein the matching code comprises a sequence of one or more distinct characters.

17. The computing system of claim 10, wherein the client device is configured to access a partner application that is hosted by the partner platform, and the enrollment user interface is presented to the user using the partner application.

18. One or more non-transitory computer-readable storage media including instructions that, when executed by one or more processors, cause the one or more processors to:
   initiate, using a partner interface, the presentation of an enrollment user interface via a client device of a user, wherein the enrollment user interface comprises an instrument enrollment screen that is indicative of one or more service provider instruments associated with the user;
   receive, using the partner interface, selection data indicative of a selection of a service provider instrument from the enrollment user interface;
   generate a matching code for authenticating the user;
   provide, using a service provider interface, an enrollment request to a service provider platform corresponding to the service provider instrument, wherein the enrollment request comprises service provider enrollment data indicative of the matching code, a user identifier for the user, and an instrument identifier for the service provider instrument;
   receive, using the partner interface, an authentication message comprising the matching code; and
   in response to an authentication of the user based on the matching code,
      (i) generate an UUEK for the user, wherein the UUEK corresponds to the user, the service provider instrument, and a partner platform; and
      (ii) provide, using the partner interface, the UUEK to the partner platform.

19. The one or more non-transitory computer-readable storage media of claim 18, wherein the client device is configured to access a partner application that is hosted by the partner platform, and the enrollment user interface is presented to the user using the partner application.

20. The one or more non-transitory computer-readable storage media of claim 18, wherein the service provider platform is configured to provide the matching code to the user, and wherein receiving the authentication message comprises:
   initiating, using the partner interface and via the enrollment user interface, a presentation of an authentication user screen; and
   receiving, using the partner interface, the authentication message based at least in part on user input to the authentication user screen.

* * * * *